US011451946B2

(12) United States Patent
Zhao et al.

(10) Patent No.: US 11,451,946 B2
(45) Date of Patent: Sep. 20, 2022

(54) METHOD FOR ESTABLISHING WIRELESS COMMUNICATION CONNECTION, AND DEVICE

(71) Applicant: Huawei Technologies Co., Ltd., Shenzhen (CN)

(72) Inventors: Peng Zhao, Xi'an (CN); Yongpan Xu, Xi'an (CN); Guangze Zhu, Xi'an (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 283 days.

(21) Appl. No.: 16/624,683

(22) PCT Filed: Jun. 30, 2017

(86) PCT No.: PCT/CN2017/091187
§ 371 (c)(1),
(2) Date: Dec. 19, 2019

(87) PCT Pub. No.: WO2019/000411
PCT Pub. Date: Jan. 3, 2019

(65) Prior Publication Data
US 2020/0112845 A1 Apr. 9, 2020

(51) Int. Cl.
*H04W 4/80* (2018.01)
*H04W 76/14* (2018.01)
*H04W 76/11* (2018.01)
*H04W 52/02* (2009.01)

(52) U.S. Cl.
CPC ......... *H04W 4/80* (2018.02); *H04W 52/0254* (2013.01); *H04W 52/0277* (2013.01); *H04W 76/11* (2018.02); *H04W 76/14* (2018.02)

(58) Field of Classification Search
None
See application file for complete search history.

(56) References Cited

U.S. PATENT DOCUMENTS

| 2013/0308512 | A1* | 11/2013 | Jeong | ................ | H04W 52/0225 |
| | | | | | 370/311 |
| 2013/0336218 | A1 | 12/2013 | Gupta | | |
| 2016/0174021 | A1* | 6/2016 | Lim | ................ | H04W 4/80 |
| | | | | | 370/310 |
| 2016/0337717 | A1* | 11/2016 | Ye | ................ | H04N 21/44224 |

(Continued)

FOREIGN PATENT DOCUMENTS

| CN | 103581876 A | 2/2014 |
| CN | 104540090 A | 4/2015 |
| CN | 104581879 A | 4/2015 |

(Continued)

*Primary Examiner* — Gregory B Sefcheck
*Assistant Examiner* — Srinivasa R Reddivalam
(74) *Attorney, Agent, or Firm* — Conley Rose, P.C.

(57) ABSTRACT

A method includes a first device and sends a network scanning request to a second device over a short-range wireless communication connection between the first device and the second device; the first device receives a scanning result that is of at least one first wireless signal and that is sent by the second device; and the first device sends a wireless connection request to at least one third device based on a wireless signal scanning result to establish a wireless connection to the at least one third device, where the wireless signal scanning result includes the scanning result of the at least one first wireless signal.

20 Claims, 57 Drawing Sheets

(56) References Cited

U.S. PATENT DOCUMENTS

2018/0035447 A1\*  2/2018  Kim .................. H04W 72/1278
2018/0041453 A1\*  2/2018  Zhe ........................ H04W 4/12

FOREIGN PATENT DOCUMENTS

| CN | 104581902 A | 4/2015 |
|---|---|---|
| CN | 104683938 A | 6/2015 |
| CN | 104812094 A | 7/2015 |
| CN | 104853410 A | 8/2015 |
| CN | 105577527 A | 5/2016 |
| CN | 105873185 A | 8/2016 |
| CN | 107613481 A | 1/2018 |
| CN | 109195143 A | 1/2019 |
| EP | 3185640 A1 | 6/2017 |
| WO | 2015099751 A1 | 7/2015 |

\* cited by examiner

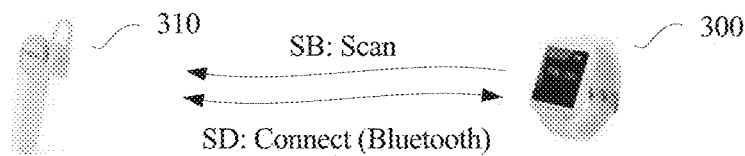
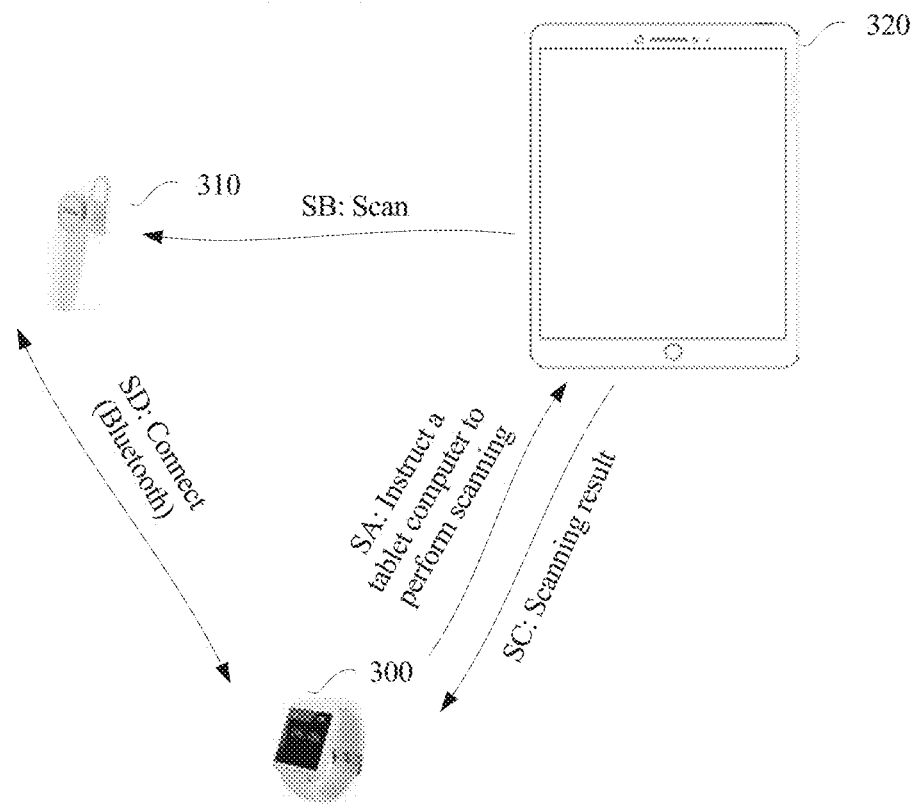
FIG. 3A
FIG. 3B

METHOD FOR ESTABLISHING WIRELESS COMMUNICATION CONNECTION, AND DEVICE

CROSS-REFERENCE TO RELATED APPLICATIONS

This application is a national stage of International Patent Application No. PCT/CN2017/091187, filed Jun. 30, 2017, which is hereby incorporated by reference in its entirety.

TECHNICAL FIELD

This application relates to the field of communications technologies, and in particular, to a method for establishing a wireless communication connection and a device.

BACKGROUND

With the development of electronic technologies, a growing quantity of smart electronic devices (for example, a Bluetooth watch, a Bluetooth headset, a tablet computer, a smart home device, and a vehicle-mounted device) gradually enter people's life, to facilitate working and learning of the people.

In addition, the foregoing smart electronic devices have increasingly more functions. For example, a SIM card can be installed in the Bluetooth watch and the tablet computer, so that the Bluetooth watch and the tablet computer access an operator network and provide a voice communication service and a data service for a user. The Bluetooth watch, the smart home device, and the vehicle-mounted device each can access a wireless fidelity (Wireless Fidelity, WiFi) network or establish a Bluetooth connection to another device.

However, wearable devices (for example, a Bluetooth watch and a Bluetooth headset) generally have a relatively small battery with a limited power storage capability. When the device accesses the Wi-Fi network, establishes the Bluetooth connection, or accesses the operator network, relatively high power is consumed during network search. Therefore, after the wearable device successfully accesses the Wi-Fi network, establishes the Bluetooth connection, or accesses the operator network, a battery life of the wearable device decreases greatly, and this affects user experience.

SUMMARY

This application provides a method for establishing a wireless communication connection and a device, to reduce power consumed when a device establishes a wireless communication connection, and prolong a battery life of the device.

To achieve the foregoing objective, the following technical solutions are used in this application.

According to a first aspect, this application provides a method for establishing a wireless communication connection, where the method includes: sending, by a first device, a network scanning request to a second device over a short-range wireless communication connection between the first device and the second device, where the network scanning request is used to instruct the second device to scan at least one first wireless signal; receiving, by the first device, a scanning result that is of the at least one first wireless signal and that is sent by the second device; and sending a wireless connection request to at least one third device based on a wireless signal scanning result, to establish a wireless connection to the at least one third device, where the wireless signal scanning result includes the scanning result of the at least one first wireless signal.

In this application, the first device may send the network scanning request to the second device, to instruct the second device to help the first device scan the at least one first wireless signal. In this case, the first device does not need to scan the at least one first wireless signal, and only needs to receive the scanning result that is of the at least one first wireless signal and that is sent by the second device, to establish a wireless connection to the at least one third device based on the wireless signal scanning result. Because the first device does not need to scan a wireless signal, battery power that is of the first device and that is consumed by scanning the wireless signal (that is, searching for a network) can be avoided, that is, power consumed when the first device establishes a wireless communication connection can be reduced, and a battery life of the first device can be prolonged.

With reference to the first aspect, in a first possible implementation, the wireless signal scanning result includes not only the scanning result of the at least one first wireless signal, but also a scanning result obtained after the first device scans at least one second wireless signal. The "sending, by the first device, a wireless connection request to at least one third device based on a wireless signal scanning result" includes: sending, by the first device, the wireless connection request to the at least one third device based on the scanning result that is of the at least one first wireless signal and that is sent by the second device and the scanning result obtained after the first device scans the at least one second wireless signal. To be specific, the first device may send the wireless connection request to the at least one third device based on the scanning result that is of the at least one first wireless signal and that is sent by the second device, and may further send the wireless connection request to the at least one third device based on the scanning result obtained after the first device scans the at least one second wireless signal.

With reference to the first aspect or the first possible implementation, in a second possible implementation, after the first device obtains the wireless signal scanning result, before the first device sends the wireless connection request to the at least one third device, the method in this application may further include: displaying, by the first device, the wireless signal scanning result. The wireless signal scanning result includes the scanning result that is of the at least one first wireless signal and that is sent by the second device, or the wireless signal scanning result includes the scanning result that is of the at least one first wireless signal and that is sent by the second device and the scanning result obtained after the first device scans the at least one second wireless signal.

After the first device displays the wireless signal scanning result, a user may select, from the wireless signal scanning result displayed by the first device, a wireless signal to be connected by the first device, and the first device sends a wireless connection request to at least one third device that transmits the to-be-connected wireless signal. Specifically, the "sending, by the first device, a wireless connection request to at least one third device based on a wireless signal scanning result" specifically includes: detecting, by the first device, user selection for the wireless signal scanning result, and sending, by the first device, the wireless connection request to at least one third device corresponding to the detected user selection.

With reference to any one of the first aspect or the possible implementations, in a third possible implementation, to reduce power consumed when the first device establishes a wireless communication connection, and prolong a battery life of the first device, the first device may stop scanning the at least one first wireless signal, and the second device assists the first device in scanning the at least one first wireless signal. Specifically, before the first device sends the network scanning request to the second device, the method in this application further includes: stopping scanning, by the first device, the at least one first wireless signal, where in response to the step of stopping scanning the at least one first wireless signal, the first device may send the network scanning request to the second device over the short-range wireless communication connection.

With reference to the third possible implementation, in a fourth possible implementation, the stopping scanning, by the first device, the at least one first wireless signal includes: when remaining battery power of the first device is lower than a first preset threshold, stopping scanning, by the first device, the at least one first wireless signal; or in response to user input, stopping scanning, by the first device, the at least one first wireless signal.

With reference to the third possible implementation, in a fifth possible implementation, the stopping scanning, by the first device, the at least one first wireless signal includes: in response to user input, displaying, by the first device, a first interface, where the first interface is a display interface of a first application, and the first interface includes a wireless control option; and in response to user input for the wireless control option in the first interface, stopping scanning, by the first device, the at least one first wireless signal; or when remaining battery power of the first device is lower than a first preset threshold, displaying, by the first device, a first interface, where the first interface is a display interface of a first application, and the first interface includes a wireless control option; and in response to user input for the wireless control option in the first interface, stopping scanning, by the first device, the at least one first wireless signal.

With reference to the fifth possible implementation, in a sixth possible implementation, the first interface further includes at least one of a type indication option, a signal range option, and an object indication option, where the type indication option is used to set a type of a wireless device that transmits the at least one first wireless signal, the signal range option is used to set a frequency band range of the at least one first wireless signal, and the object indication option is used to set an identifier of the wireless device that transmits the at least one first wireless signal.

The user may set, by using the type indication option, the type of the wireless device that transmits the first wireless signal, so that the first device can instruct the second device to scan a wireless signal transmitted by a wireless device of a specific corresponding type. The user may set the frequency band range of the first wireless signal by using the signal range option, so that the first device can instruct the second device to scan a wireless signal in a specific frequency band range.

Optionally, in a seventh possible implementation of the first aspect, the network scanning request includes type indication information of the wireless device that transmits the at least one first wireless signal, where the type indication information is used to indicate that the wireless device is at least one of a Wi-Fi hotspot, a Bluetooth device, or a base station.

Optionally, in an eighth possible implementation of the first aspect, the network scanning request further includes signal range indication information of the at least one first wireless signal. When the type indication information indicates that the wireless device is a Wi-Fi hotspot, the signal range indication information is used to indicate the frequency band range of the at least one first wireless signal. When the type indication information indicates that the wireless device is a base station, the signal range indication information is used to indicate a network type of a network corresponding to the at least one first wireless signal. The network type includes at least a second generation mobile communications technology (The Second Generation mobile communication technology, 2G) network, a third generation mobile communications technology (The Third Generation mobile communication technology, 3G) network, a long term evolution (Long Term Evolution, LTE) network, and a fifth generation mobile communications technology (The Fifth Generation mobile communication technology, 5G) network.

Optionally, in a ninth possible implementation of the first aspect, the network scanning request further includes object indication information of the wireless device that transmits the at least one first wireless signal. When the type indication information indicates that the wireless device is a Wi-Fi hotspot, the object indication information includes a service set identifier (Service Set Identifier, SSID) of the wireless device. When the type indication information indicates that the wireless device is a base station, the object indication information includes an identifier of an operator to which the wireless device belongs. When the type indication information indicates that the wireless device is a Bluetooth device, the object indication information includes a Bluetooth identifier of the wireless device.

According to a second aspect, this application provides a method for establishing a wireless communication connection, where the method includes: receiving, by a second device over a short-range wireless communication connection between the second device and a first device, a network scanning request sent by the first device, where the network scanning request is used to instruct the second device to scan at least one first wireless signal; scanning, by the second device, the at least one first wireless signal to obtain a scanning result of the at least one first wireless signal; and sending, by the second device, the scanning result of the at least one first wireless signal to the first device over the short-range wireless communication connection between the second device and the first device, where the scanning result of the at least one first wireless signal is used by the first device to establish a wireless communication connection to at least one corresponding third device.

In this application, the second device may receive the network scanning request sent by the first device, and scan the at least one first wireless signal based on an instruction of the network scanning request. In this case, the first device does not need to scan the at least one first wireless signal, and only needs to receive the scanning result that is of the at least one first wireless signal and that is sent by the second device, to establish a wireless connection to the at least one third device based on a wireless signal scanning result. Because the first device does not need to scan a wireless signal, battery power that is of the first device and that is consumed by scanning the wireless signal (that is, searching for a network) can be avoided, that is, power consumed when the first device establishes a wireless communication connection can be reduced, and a battery life of the first device can be prolonged.

With reference to the second aspect, in a first possible implementation, due to limitations of an input function and a size of a display screen of the first device, the first device may be incapable of displaying or inconvenient to display a wireless signal scanning result. In this case, the first device may display the wireless signal scanning result by using the second device. Specifically, after the "scanning, by the second device, the at least one first wireless signal to obtain a scanning result of the at least one first wireless signal", the method in this application further includes: displaying, by the second device, the wireless signal scanning result, where the wireless signal scanning result includes the scanning result obtained after the second device scans the at least one first wireless signal; detecting, by the second device, user selection for the wireless signal scanning result; and instructing, by the second device based on a detected scanning result selected by a user, the first device to establish a wireless communication connection to at least one third device corresponding to the scanning result selected by the user.

With reference to the first possible implementation, in a second possible implementation, the wireless signal scanning result displayed by the second device may include not only the scanning result obtained after the second device scans the at least one first wireless signal, but also a scanning result that is of the at least one second wireless signal and that is sent by the first device. The method in this application may further include: receiving, by the second device, the scanning result that is of the at least one second wireless signal and that is sent by the first device.

With reference to any one of the second aspect or the possible implementations, in a third possible implementation, after the "sending, by the second device, the scanning result of the at least one first wireless signal to the first device", the method in this application further includes: receiving, by the second device, a first instruction sent by the first device, where the first instruction is used to instruct the second device to display a second interface; displaying, by the second device, the second interface, where the second interface is an information input interface used when the first device establishes a wireless communication connection to the at least one third device; and in response to user input in the second interface, sending, by the second device to the first device, information entered by the user in the second interface.

According to a third aspect, this application provides a first device, where the first device includes a sending module and a receiving module. The sending module is configured to send a network scanning request to a second device over a short-range wireless communication connection between the first device and the second device, where the network scanning request is used to instruct the second device to scan at least one first wireless signal. The receiving module is configured to receive a scanning result that is of the at least one first wireless signal and that is sent by the second device. The sending module is further configured to send a wireless connection request to at least one third device based on a wireless signal scanning result, to establish a wireless connection to the at least one third device, where the wireless signal scanning result includes the scanning result that is of the at least one first wireless signal and that is received by the receiving module.

With reference to the third aspect, in a first possible implementation, the first device further includes a scanning module. The scanning module is configured to scan at least one second wireless signal to obtain a scanning result of the at least one second wireless signal, where the wireless signal scanning result further includes the scanning result that is of the at least one second wireless signal and that is obtained by the scanning module. That "the sending module is configured to send a wireless connection request to at least one third device based on a wireless signal scanning result" specifically includes: the sending module is configured to send the wireless connection request to the at least one third device based on the scanning result that is of the at least one first wireless signal, that is sent by the second device, and that is received by the receiving module and the scanning result that is of the at least one second wireless signal and that is obtained by the scanning module through scanning.

With reference to the third aspect or the first possible implementation, in a second possible implementation, the first device may further include a display module and a detection module. The display module is configured to: before the sending module sends the wireless connection request to the at least one third device based on the wireless signal scanning result, display the wireless signal scanning result. The detection module is configured to detect user selection for the wireless signal scanning result displayed by the display module. The sending module is specifically configured to send the wireless connection request to at least one third device corresponding to the user selection detected by the detection module. For detailed descriptions of the wireless signal scanning result, refer to detailed descriptions in the second possible implementation of the first aspect. Details are not described again in this application.

With reference to any one of the third aspect or the possible implementations, in a third possible implementation, the first device further includes a control module. The control module is configured to: before the sending module sends the network scanning request to the second device over the short-range wireless communication connection between the first device and the second device, control the scanning module of the first device to stop scanning the at least one first wireless signal. In response to the step in which the control module controls the scanning module to stop scanning the at least one first wireless signal, the sending module sends the network scanning request to the second device over the short-range wireless communication connection.

With reference to the third possible implementation, in a fourth possible implementation, the control module is specifically configured to: when remaining battery power of the first device is lower than a first preset threshold, control the scanning module of the first device to stop scanning the at least one first wireless signal; or in response to user input, control the scanning module of the first device to stop scanning the at least one first wireless signal.

With reference to the third possible implementation, in a fifth possible implementation, the display module is configured to: in response to user input, display a first interface; and the control module is configured to: in response to user input for the wireless control option in the first interface displayed by the display module, stop scanning the at least one first wireless signal; or the display module is configured to: when remaining battery power of the first device is lower than a first preset threshold, display a first interface; and the control module is configured to: in response to user input for the wireless control option in the first interface displayed by the display module, stop scanning the at least one first wireless signal. The first interface is a display interface of a first application, and the first interface includes the wireless control option.

It should be noted that, for detailed descriptions of the first interface and the network scanning request in any possible implementation of the third aspect, refer to related content in a corresponding implementation of the first aspect. Details are not described again in this application.

According to a fourth aspect, this application provides a first device, where the first device includes a processor, a communications interface, a display, and a memory. The processor, the communications interface, the display, and the memory are connected to each other through a bus. The communications interface is configured to communicate with a second device over a short-range wireless communication connection. The display is configured to display a display interface generated by the processor. The memory is configured to store computer program code. The computer program code includes an instruction. When the processor executes the instruction, the first device performs the method for establishing a wireless communication connection according to any one of the first aspect or the possible implementations of the first aspect.

According to a fifth aspect, this application provides a computer storage medium, including a computer instruction, where when the computer instruction runs on a first device, the first device is enabled to perform the method for establishing a wireless communication connection according to any one of the first aspect or the possible implementations of the first aspect.

According to a sixth aspect, this application provides a second device, where the second device includes a receiving module, a scanning module, and a sending module. The receiving module is configured to receive, over a short-range wireless communication connection between the second device and a first device, a network scanning request sent by the first device. The scanning module is configured to scan the at least one first wireless signal indicated by the network scanning request received by the receiving module, to obtain a scanning result of the at least one first wireless signal. The sending module is configured to send, to the first device, the scanning result that is of the at least one first wireless signal and that is obtained by the scanning module, where the scanning result of the at least one first wireless signal is used by the first device to establish a wireless communication connection to at least one corresponding third device.

With reference to the sixth aspect, in a first possible implementation, the second device further includes a display module and a detection module. The display module is configured to: after the scanning module scans the at least one first wireless signal to obtain the scanning result of the at least one first wireless signal, display a wireless signal scanning result, where the wireless signal scanning result includes the scanning result obtained after the second device scans the at least one first wireless signal. The detection module is configured to detect user selection for the wireless signal scanning result. An instruction module is configured to instruct, based on a scanning result that is selected by a user and that is detected by the detection module, the first device to establish a wireless communication connection to at least one third device corresponding to the scanning result selected by the user.

With reference to the first possible implementation, in a second possible implementation, the receiving module is further configured to receive a scanning result that is of at least one second wireless signal and that is sent by the first device, where the wireless signal scanning result displayed by the display module further includes the scanning result that is of the at least one second wireless signal and that is sent by the first device.

With reference to any one of the foregoing possible implementations, in a third possible implementation, the receiving module is further configured to: after the sending module sends the scanning result of the at least one first wireless signal to the first device, receive a first instruction sent by the first device, where the first instruction is used to instruct the second device to display a second interface. The display module is further configured to display the second interface, where the second interface is an information input interface used when the first device establishes a wireless communication connection to the at least one third device. The sending module is further configured to: in response to user input in the second interface displayed by the display module, send, to the first device, information entered by the user in the second interface.

According to a seventh aspect, this application provides a second device, where the second device includes a processor, a communications interface, a display, and a memory. The processor, the communications interface, and the memory are connected to each other through a bus. The communications interface is configured to communicate with the second device over a short-range wireless communication connection. The display is configured to display a display interface generated by the processor. The memory is configured to store computer program code. The computer program code includes an instruction. When the processor executes the instruction, the second device performs the method for establishing a wireless communication connection according to any one of the second aspect or the possible implementations of the second aspect.

According to an eighth aspect, this application provides a computer storage medium, including a computer instruction, where when the computer instruction runs on a second device, the second device is enabled to perform the method for establishing a wireless communication connection according to any one of the second aspect or the possible implementations of the second aspect.

According to a ninth aspect, this application provides a computer program product, where when the computer program product runs on a computer, the computer is enabled to perform the method for establishing a wireless communication connection according to any one of the first aspect or the possible implementations of the first aspect, or is enabled to perform the method for establishing a wireless communication connection according to any one of the second aspect or the possible implementations of the second aspect.

It may be understood that, the first device in the third aspect and the fourth aspect, the second device in the sixth aspect and the seventh aspect, the computer storage medium in the fifth aspect and the eighth aspect, or the computer program product in the ninth aspect that are provided above are all configured to perform a corresponding method provided above. Therefore, for beneficial effects that can be achieved by these devices, refer to beneficial effects in a corresponding method provided above. Details are not described herein again.

DESCRIPTION OF DRAWINGS

FIG. 3A and FIG. 3B are a schematic diagram 3 of an example of an application scenario of a method for establishing a wireless communication connection according to an embodiment of the present invention;

FIG. 11 is a flowchart 7 of a method for establishing a wireless communication connection according to an embodiment of the present invention;

FIG. 14-3 and FIG. 14-4 are a schematic diagram 5 of an example of a display interface of a mobile phone according to an embodiment of the present invention;

FIG. 16-1 to FIG. 16-5 are a schematic diagram 6 of an example of a display interface of a smart band according to an embodiment of the present invention:

FIG. 17-1 to FIG. 17-3 are a schematic diagram 8 of an example of a display interface of a smart band according to an embodiment of the present invention:

FIG. 20-1 and FIG. 20-2 are a schematic diagram 9 of an example of a display interface of a smart band according to an embodiment of the present invention:

DESCRIPTION OF EMBODIMENTS

The terms "first" and "second" mentioned below are merely used for description, and shall not be understood as an indication or implication of relative importance or implicit indication of a quantity of indicated technical features. Therefore, a feature limited by "first" or "second" may explicitly or implicitly include one or more features. In the descriptions of the embodiments of the present invention, unless otherwise stated, "a plurality of" means two or more than two.

The embodiments of the present invention provide a method for establishing a wireless communication connection and a device. The method may be applied to the following process: A first device scans a wireless signal by using a second device, and then establishes a wireless connection to at least one third device based on a wireless signal scanning result. In the embodiments of the present invention, a short-range wireless communication connection may be established between the first device and the second device. The short-range wireless communication connection is a communication connection established by using a short-range wireless communications technology.

For example, the short-range wireless communication connection in the present invention may be a communication connection established by using the short-range wireless communications technology. The short-range wireless communication connection in the present invention may be a Bluetooth (Bluetooth, BT) connection or a wireless fidelity (Wireless Fidelity, WiFi) connection, or may be another short-range wireless communication connection, for example, an infrared connection, a near field communication (Near Field Communication, NFC) connection, an ultra-wideband connection, a ZigBee (ZigBee) connection, or a low-energy wireless connection such as a Bluetooth low energy (Bluetooth Low Energy, BLE) connection. This is not specifically limited in the embodiments of the present invention. The Wi-Fi connection may be a Wi-Fi direct connection, namely, a peer-to-peer connection between Wi-Fi devices.

In the embodiments of the present invention, the first device may be a Bluetooth headset, a smartwatch, a Bluetooth band, a smart home device, a personal digital assistant (personal digital assistant, PDA), a tablet computer, a mobile phone, a netbook, or the like. The second device may be a mobile phone, a tablet computer, a personal computer (Personal Computer, PC), a notebook computer, or the like. This is not limited in the embodiments of the present invention.

Figure 1A:
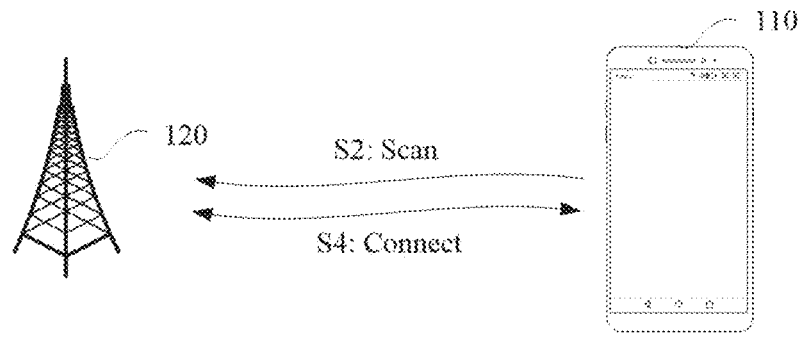
FIG. 1A and FIG. 1B are a schematic diagram 1 of an example of an application scenario of a method for establishing a wireless communication connection according to an embodiment of the present invention.
Figure 1B:
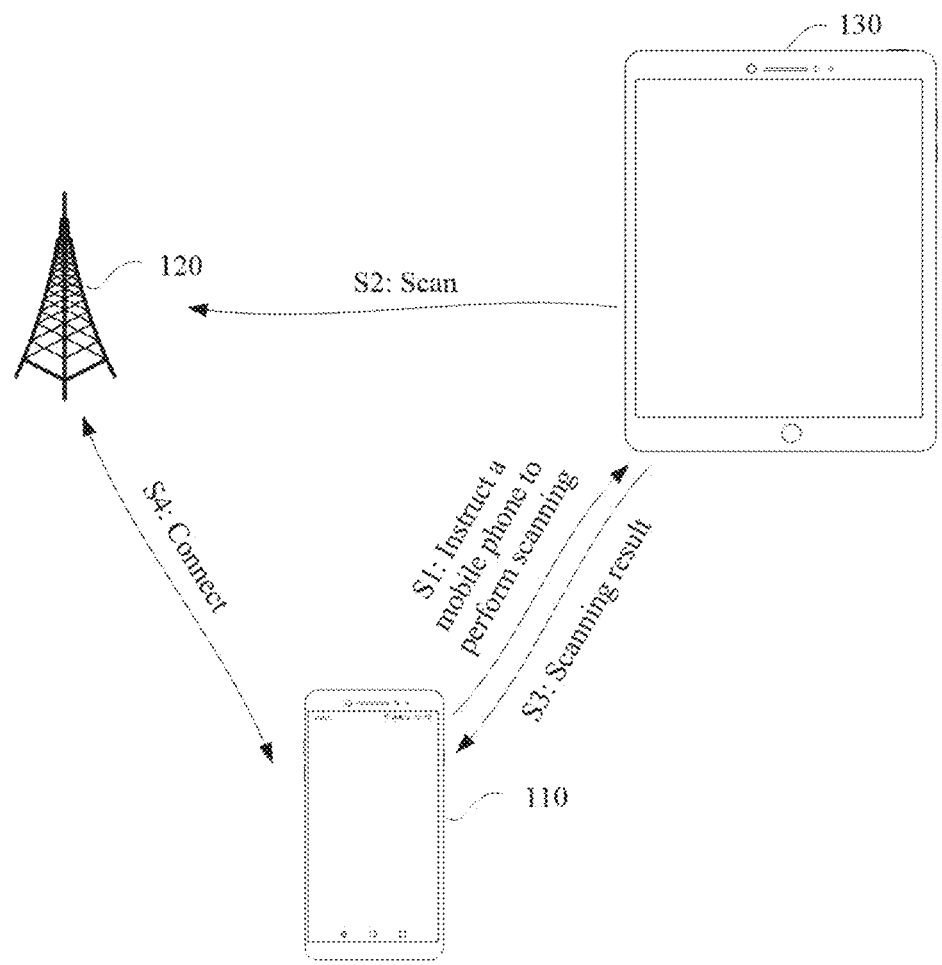

FIG. 1A and FIG. 1B are a schematic diagram of an example of a network architecture to which a method for establishing a wireless communication connection according to an embodiment of the present invention is applied.

Generally, as shown in FIG. 1A, a process in which a mobile phone 110 (namely, a first device) establishes a wireless connection to a base station 120 may include: performing, by the mobile phone 110, the following S2 and S4:

S2. Scan a wireless signal transmitted by a base station around the mobile phone 110, to obtain a scanning result.

S4. Establish a wireless connection to the base station 120 based on the scanning result.

However, a battery life is limited when remaining battery power of the mobile phone 110 is relatively low (for example, the remaining battery power of the mobile phone 110 is lower than a specific threshold), and power consumption is relatively high when the mobile phone 110 scans the wireless signal of the base station (that is, searches for a network). Therefore, when the mobile phone 110 scans the wireless signal of the base station, even if the mobile phone 110 establishes a wireless connection to the base station 120, the battery life of the mobile phone 110 decreases greatly, and this affects user experience.

To reduce power consumed when the mobile phone 110 establishes a wireless communication connection, and prolong the battery life of the mobile phone 110, as shown in FIG. 1B, the mobile phone 110 may instruct a tablet computer 130 (namely, a second device) to scan the wireless signal transmitted by the base station around the mobile phone 110 (that is, to perform S1). Subsequently, the tablet computer 130 may perform S2 and S3 (the tablet computer 130 sends a scanning result to the mobile phone 110). Then, the mobile phone 110 may perform S4 of establishing a wireless connection to the base station 120 based on the scanning result.

It can be learned from FIG. 1B that in this embodiment of the present invention, the second device (namely, the tablet computer 130) may assist the first device (the mobile phone 110) in scanning a wireless signal, so that power consumed when the mobile phone 110 establishes a wireless communication connection can be reduced.

It should be noted that the mobile phone 110 may include a card interface that is used to install a subscriber identity module (Subscriber Identity Module, SIM) card or another communication card (for example, an embedded universal integrated circuit card (embedded UICC, eUICC)) that can support communication with the base station. When the foregoing communication card is installed on the card interface of the mobile phone 110, the mobile phone 110 may scan the wireless signal transmitted by the base station around the mobile phone 110, and establish a connection to the base station.

The wireless signal transmitted by the base station in this embodiment of the present invention may be any one of a 2G signal, a 3G signal, an LTE signal, a 5G signal, and the like.

Figure 2A:
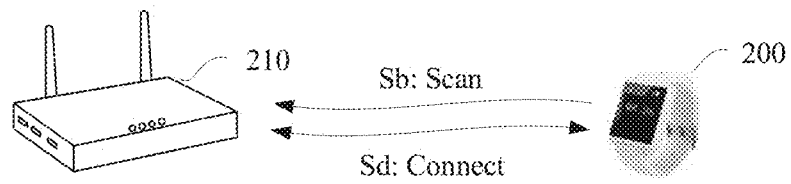
FIG. 2A and FIG. 2B are a schematic diagram 2 of an example of an application scenario of a method for establishing a wireless communication connection according to an embodiment of the present invention.

Optionally, the method in this embodiment of the present invention may be further applied to a process in which a wireless device scans and is connected to a Wi-Fi hotspot. Generally, as shown in FIG. 2A, a process in which a smartwatch 200 (namely, a first device) establishes a wireless connection to a wireless router 210 (namely, a Wi-Fi hotspot) may include: performing, by the smartwatch 200, the following Sb and Sd:

Sb. Scan a Wi-Fi wireless signal transmitted by a Wi-Fi hotspot around the smartwatch 200, to obtain a scanning result.

Sd. Establish a Wi-Fi wireless connection to the wireless router 210 based on the scanning result.

However, the smartwatch 200 has a relatively small battery with a limited power storage capability, and power consumption is relatively high when the smartwatch 200 scans the wireless signal of the Wi-Fi hotspot (that is, searches for a network). Therefore, after the smartwatch 200 scans the wireless signal of the Wi-Fi hotspot and the smartwatch 200 establishes a wireless connection to the wireless router 210 (namely, the Wi-Fi hotspot), a battery life of the smartwatch 200 decreases greatly. Consequently, the smartwatch 200 may be powered off, and this affects user experience.

Figure 2B:
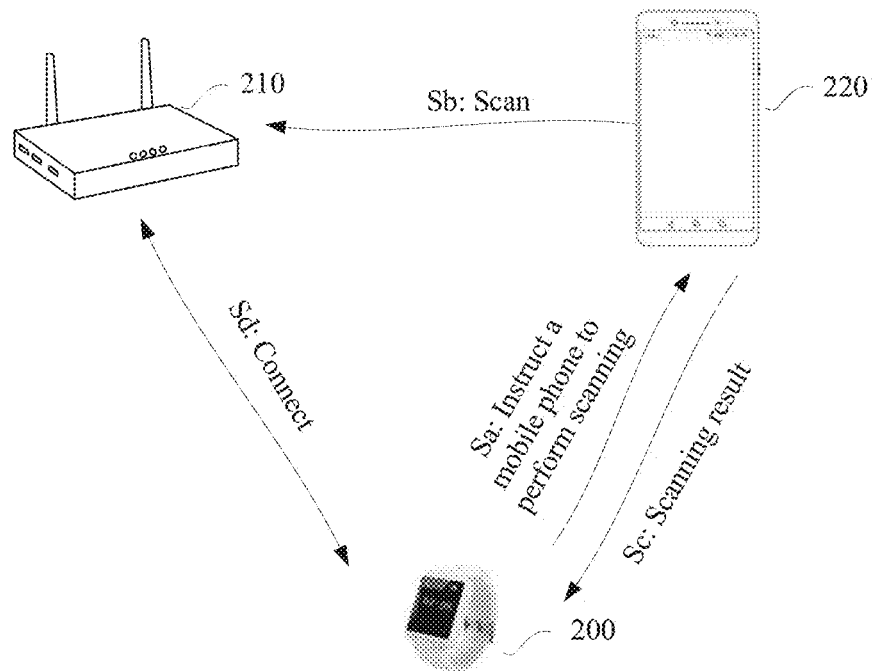

To reduce power consumed when the smartwatch 200 establishes a wireless communication connection, and prolong the battery life of the smartwatch 200, as shown in FIG. 2B, the smartwatch 200 may instruct a mobile phone 220 (namely, a second device) to scan the wireless signal transmitted by the Wi-Fi hotspot around the smartwatch 200 (that is, to perform Sa). Subsequently, the mobile phone 220 may perform Sb and Sc (the mobile phone 220 sends a scanning result to the smartwatch 200). Then, the smartwatch 200 may perform Sd of establishing a wireless connection to the wireless router 210 based on the scanning result.

It can be learned from FIG. 2B that in this embodiment of the present invention, the second device (namely, the mobile phone 220) may assist the first device (the smartwatch 200) in scanning a wireless signal, so that power consumed when the smartwatch 200 establishes a wireless communication connection can be reduced.

Optionally, the method in this embodiment of the present invention may be further applied to a process in which a wireless device scans a Bluetooth signal and establishes a Bluetooth connection to another device. For example, referring to FIG. 3A and FIG. 3B, when a smartwatch 300 (namely, a first device) establishes a Bluetooth connection to a Bluetooth headset 310, as shown in FIG. 3B, the smartwatch 300 may instruct a tablet computer 320 (namely, a second device) to scan a Bluetooth signal around the smartwatch 300 (that is, to perform SA). Subsequently, the tablet computer 320 may scan the Bluetooth signal around the smartwatch 300 (that is, perform SB), and send a scanning result to the smartwatch 300 (that is, perform SC). Then, the smartwatch 300 may establish a wireless connection to the Bluetooth headset 310 based on the scanning result (that is, perform SD).

It can be learned from FIG. 3B that in this embodiment of the present invention, the second device (namely, the tablet computer 320) may assist the first device (the smartwatch 300) in scanning a wireless signal, so that power consumed when the smartwatch 300 establishes a wireless communication connection can be reduced.

It should be noted that application scenarios of the method in this embodiment of the present invention include but are not limited to the scenarios shown in FIG. 1A, FIG. 1B to FIG. 3A, FIG. 3B. For example, the method in this embodiment of the present invention may be further applied to the following scenario: When a user uses two wireless devices (for example, a mobile phone a and a mobile phone b), to reduce power consumption of the mobile phone, one of the two mobile phones (for example, the mobile phone a, namely, a second device) may scan a wireless signal, and the other mobile phone (for example, the mobile phone b, namely, a first device) does not need to scan a wireless signal, and only needs to be connected, based on a scanning result obtained by the mobile phone a, to a wireless device that transmits the wireless signal and that is obtained through scanning.

It may be understood that the two wireless devices used by the user include but are not limited to the mobile phone a and the mobile phone b. The two wireless devices each may alternatively be another type of wireless device, for example, a mobile phone and a tablet computer, two tablet computers, or a mobile phone and a Bluetooth headset. This is not limited in this embodiment of the present invention.

Figure 4:
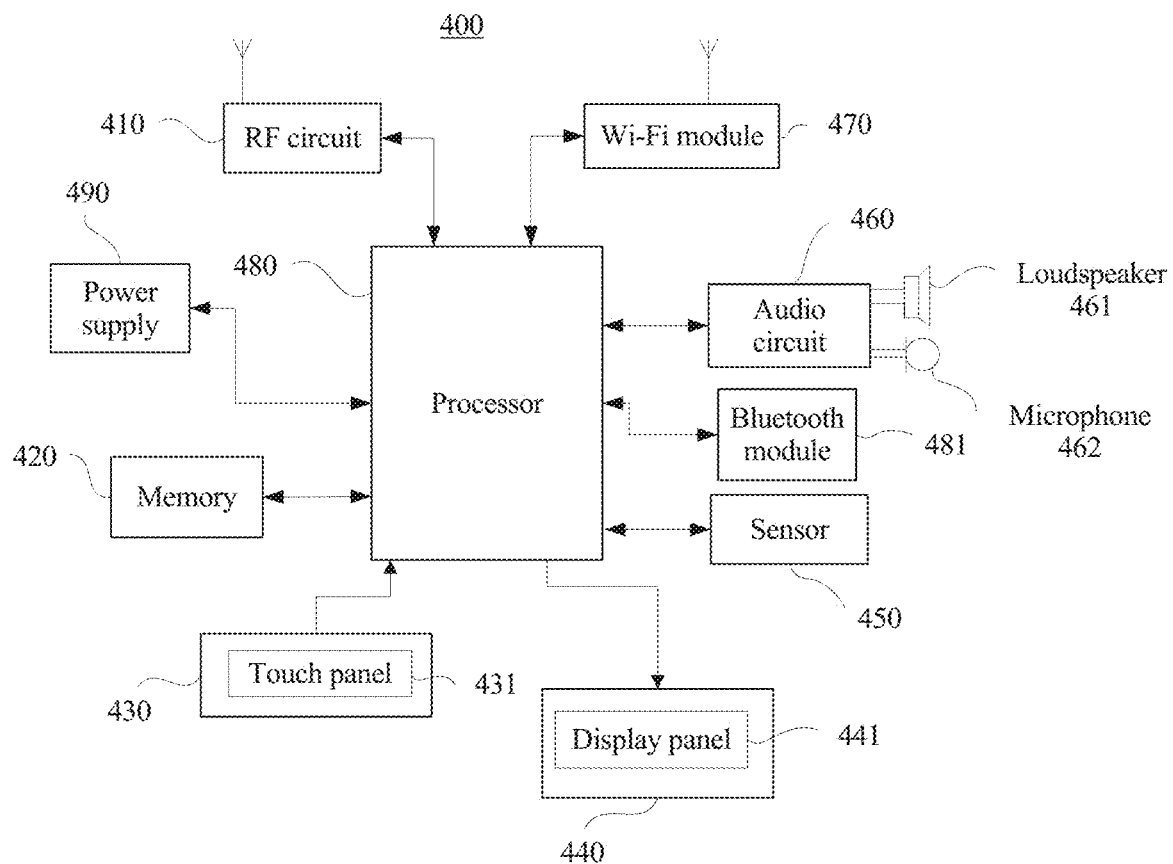
FIG. 4 is a schematic structural diagram of hardware of a mobile phone according to an embodiment of the present invention.

For example, the first device or the second device in this embodiment of the present invention may be a mobile phone 400 shown in FIG. 4. It should be understood that the mobile phone 400 in the figure is only an example of the first device or the second device, and the mobile phone 400 may have more or fewer components than those shown in the figure, combine two or more components, or have different component configurations. Components shown in FIG. 4 may be implemented in hardware including one or more signal processing and/or application-specific integrated circuits, software, or a combination of hardware and software.

As shown in FIG. 4, the mobile phone 400 includes components such as an RF (Radio Frequency, radio frequency) circuit 410, a memory 420, an input unit 430, a display unit 440, a sensor 450, an audio circuit 460, a wireless fidelity (Wireless Fidelity, Wi-Fi) module 470, a processor 480, and a power supply 490. A person skilled in the art may understand that a structure of the mobile phone shown in FIG. 4 does not impose a limitation on the mobile phone, and the mobile phone may include more or fewer components than those shown in the figure, combine some components, or have different component arrangements.

The following specifically describes each component of the mobile phone 400 with reference to FIG. 4.

The RF circuit 410 may be configured to receive and send a signal in an information receiving/sending process or a call process. After receiving downlink information from a base station, the RF circuit 410 may send the downlink information to the processor 480 for processing, and send related uplink data to the base station. Generally, the RF circuit includes but is not limited to devices such as an antenna, at least one amplifier, a transceiver, a coupler, a low noise amplifier, and a duplexer. In addition, the RF circuit 410 may further communicate with a network and another mobile device through wireless communication. Any communications standard or protocol may be used for the wireless communication, including but not limited to a global system for mobile communications, a general packet radio service, code division multiple access, wideband code division multiple access, long term evolution, an email, a short message service, and the like.

The memory 420 may be configured to store a software program and data. The processor 480 runs the software program and the data that are stored in the memory 420, to perform various functions of the mobile phone 400 and process data. The memory 420 may mainly include a program storage area and a data storage area. The program storage area may store an operating system, an application program required by at least one function (such as a sound play function and an image play function), and the like. The data storage area may store data (such as audio data and a phone book) that is created based on use of the mobile phone 400, and the like. In addition, the memory 420 may include a high-speed random access memory, and may further include a nonvolatile memory such as at least one magnetic disk storage device, a flash memory device, or another volatile solid-state storage device. In the following embodiments, the memory 420 stores an operating system that enables the mobile phone 400 to run, for example, an iOS® operating system developed by Apple, an Android® open-source operating system developed by Google, or a Windows® operating system developed by Microsoft.

As shown in FIG. 4, the program storage area and the data storage area of the memory 420 in this embodiment of the present invention each may include at least two storage areas: a program area and a data area. The program area is configured to store an operating system, an application program required by at least one function (such as a sound play function and an image play function), and the like. The data area is configured to store data (such as audio data and a phone book) that is created during use of the mobile phone 400, and the like.

The input unit 430 (namely, a touchscreen) may be configured to: receive entered digit or character information, and generate signal input related to user setting and function control of the mobile phone 400. Specifically, the input unit 430 may include a touch panel 431 disposed on the front of the mobile phone 400. The touch panel 431 may collect a touch operation (for example, an operation performed by a user on the touch panel 431 or near the touch panel 431 by using any suitable object or accessory such as a finger or a stylus) of the user on or near the touch panel 431, and drive a corresponding connection apparatus based on a preset program. Optionally, the touch panel 431 may include two parts: a touch detection apparatus and a touch controller (not shown in the figure). The touch detection apparatus detects a touch location of the user, detects a signal brought by a touch operation, and transfers the signal to the touch controller. The touch controller receives touch information from the touch detection apparatus, converts the touch information into coordinates of a touch point, sends the coordinates to the processor 480, and can receive and execute a command sent by the processor 480. In addition, the touch panel 431 may be implemented by using a plurality of types such as a resistive type, a capacitive type, an infrared type, and a surface acoustic wave type.

The display unit 440 (namely, a display screen) may be configured to display information entered by the user or information provided for the user, and GUIs of various menus of the mobile phone 400. The display unit 440 may include a display panel 441 (which may also be referred to as a display screen) disposed on the front of the mobile phone 400. In other words, the display panel 441 and a display panel 342 are disposed on two opposite surfaces of the mobile phone 400. The display panel 441 may be configured in a form of a liquid crystal display, a light-emitting diode, or the like. The touch panel 431 covers the display panel 441. After detecting a touch operation on or near the touch panel 431, the touch panel 431 transfers the touch operation to the processor 480 to determine a touch event. Then, the processor 480 provides corresponding visual output on the display panel 441 based on a type of the touch event. In FIG. 3A and FIG. 3B, the touch panel 431 and the display panel 441 are used as two independent components to implement input and input functions of the mobile phone 400. However, in some embodiments, the touch panel 431 and the display panel 441 may be integrated to implement the input and output functions of the mobile phone 400, and the integrated touch panel 431 and display panel 441 may be briefly referred to as a touchscreen.

In some other embodiments, a pressure sensor may be further disposed on each of the touch panel 431 and a touch panel 332, so that when the user performs a touch operation on the touch panel, the touch panel can further detect pressure of the touch operation, and the mobile phone 400 can detect the touch operation more accurately.

The mobile phone 400 may further include at least one sensor 450 such as a light sensor, a motion sensor, and another sensor. Specifically, the light sensor may include an ambient light sensor and a proximity sensor. An ambient light sensor 451 may adjust luminance of the display panel 441 and/or the display panel 342 based on brightness of ambient light. A proximity light sensor 452 is disposed on the front of the mobile phone 400. When the mobile phone 400 moves to an ear, based on detection of the proximity light sensor 452, the mobile phone 400 powers off the display panel 441, and can also power off the display panel 342. In this way, power consumption of the mobile phone 400 can be further reduced. As a type of motion sensor, an accelerometer sensor may detect a value of an acceleration in each direction (generally, three axes), may detect a value and a direction of gravity in a static state, and may be used in an application for identifying a mobile phone posture (such as screen switching between a landscape mode and a portrait mode, a related game, or magnetometer posture calibration), a function related to vibration recognition (such as a pedometer or a knock), and the like. Other sensors such as a gyroscope, a barometer, a hygrometer, a thermometer, and an infrared sensor may also be disposed on the mobile phone 400. Details are not described herein.

The audio circuit 460, a loudspeaker 461, and a microphone 362 may provide an audio interface between the user and the mobile phone 400. The audio circuit 460 may convert received audio data into an electrical signal and transmit the electrical signal to the loudspeaker 461, and the loudspeaker 461 converts the electrical signal into a sound signal for output. In addition, the microphone 362 converts a collected sound signal into an electrical signal. The audio circuit 460 receives the electrical signal, converts the electrical signal into audio data, and then outputs the audio data to the RF circuit 410 to send the audio data to, for example, another mobile phone, or outputs the audio data to the memory 420 for further processing.

Wi-Fi belongs to a short-range wireless transmission technology. The mobile phone 400 may help, by using the Wi-Fi module 470, the user receive and send an email, browse a web page, access streaming media, and the like. The Wi-Fi module 470 provides wireless broadband internet access for the user.

The processor 480 is a control center of the mobile phone 400, is connected to each part of the entire mobile phone through various interfaces and lines, and performs various functions of the mobile phone 400 and processes data by running or executing the software program stored in the memory 420 and by invoking the data stored in the memory 420, to perform overall monitoring on the mobile phone. In some embodiments, the processor 480 may include one or more processing units. An application processor and a modem processor may be further integrated into the processor 480. The application processor mainly processes an operating system, a user interface, an application program, and the like. The modem processor mainly processes wireless communication. It may be understood that the modem processor may not be integrated into the processor 480.

A Bluetooth module 481 is configured to exchange information with another device by using a short-range communications protocol such as Bluetooth. For example, the mobile phone 400 may establish, by using the Bluetooth module 481, a Bluetooth connection to a wearable electronic device (for example, a smartwatch) that also has a Bluetooth module, to exchange data.

The mobile phone 400 further includes the power supply 490 (such as a battery) that supplies power to each component. The power supply may be logically connected to the processor 480 by using a power management system, to implement functions such as charging, discharging, and power consumption management by using the power management system. The mobile phone 400 may further include cameras such as a front-facing camera and a rear-facing camera. Details are not described herein. All methods in the following embodiments can be implemented in the mobile phone 400 having the foregoing hardware structure.

Figure 5:
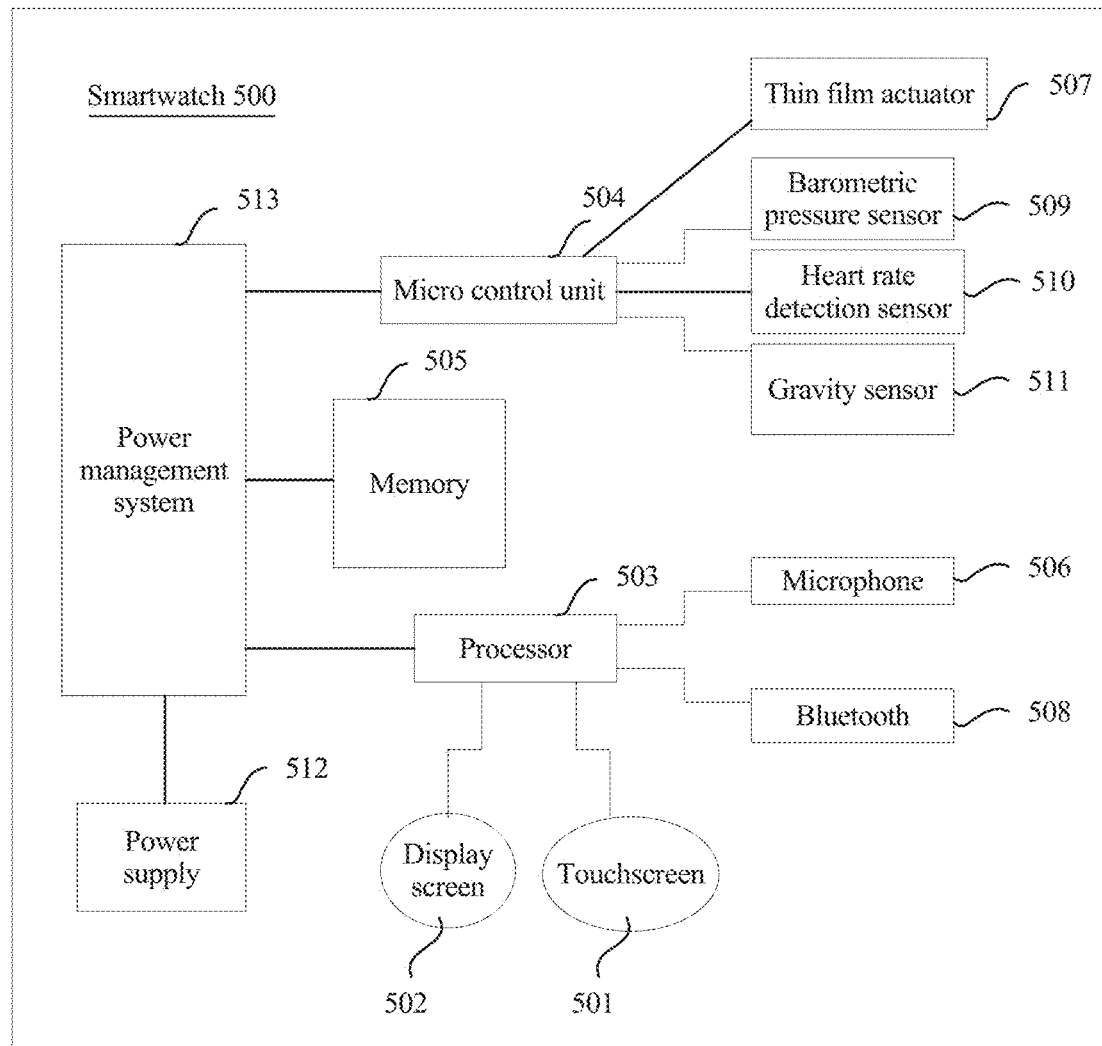
FIG. 5 is a schematic structural diagram of hardware of a potential energy watch according to an embodiment of the present invention.

For example, the first device or the second device in this embodiment of the present invention may be a smartwatch 500 shown in FIG. 5. It should be understood that the smartwatch 500 in the figure is only an example of the first device or the second device, and the smartwatch 500 may have more or fewer components than those shown in the figure, combine two or more components, or have different component configurations. Components shown in FIG. 5 may be implemented in hardware including one or more signal processing and/or application-specific integrated circuits, software, or a combination of hardware and software.

As shown in FIG. 5, the smartwatch 500 includes a body and a wrist strap that are connected to each other. The body may include a front cover (not shown in FIG. 5), a touch panel 510 (also referred to as a touchscreen), a display screen 520, a back cover (not shown in FIG. 5), a processor 530, a micro control unit (Micro Control Unit, MCU) 540, a memory 550, a microphone (Microphone, MIC) 560, a Bluetooth module 570, a heart rate detection sensor 580, a power supply 591, a power management system 592, and the like. Although not shown, the smartwatch may further include an antenna, a Wi-Fi module, a GPS module, a loudspeaker, an accelerometer, a gyroscope, and the like. A person skilled in the art may understand that a structure of the smartwatch shown in FIG. 5 does not impose a limitation on the smartwatch, and the smartwatch may include more or fewer components than those shown in the figure, combine some components, or have different component arrangements.

The following describes each function component of the smartwatch 500.

The touch panel 510, also referred to as a touchpad, may collect a touch operation (for example, an operation performed by a user on the touch panel or near the touch panel by using any suitable object or accessory such as a finger or a stylus) of the user of the watch on the touch panel 510, and drive a corresponding connection apparatus based on a preset program. Optionally, the touch panel 510 may include two parts: a touch detection apparatus and a touch controller. The touch detection apparatus detects a touch location of the user, detects a signal brought by a touch operation, and transfers the signal to the touch controller. The touch controller receives touch information from the touch detection apparatus, converts the touch information into coordinates of a touch point, sends the coordinates to the processor 530, and can receive and execute a command sent by the processor 530. In addition, the touch panel may be implemented by using a plurality of types such as a resistive type, a capacitive type, an infrared type, and a surface acoustic wave type. In addition to the touch panel 510, the smartwatch may further include another input device, and the another input device may include but is not limited to a function key (such as a volume control key or an on/off key).

The display screen 520 may be configured to display information entered by the user or information provided for the user, and various menus of the watch. Optionally, the display screen 520 may be configured in a form of an LCD, an OLED, or the like. Further, the touch panel 510 may cover the display screen 520. After detecting a touch operation on or near the touch panel 510, the touch panel 510 transfers the touch operation to the processor 530 to determine a type of a touch event. Then, the processor 530 provides corresponding visual output on the display screen 520 based on the type of the touch event. In FIG. 3A and FIG. 3B, the touch panel 510 and the display screen 520 are used as two independent components to implement input and output functions of the watch. However, in some embodiments, the touch panel 510 and the display screen 520 may be integrated to implement the input and output functions of the watch.

The processor 530 is configured to perform system scheduling, control a display screen and a touchscreen, and support processing of the microphone 360, one or more thin film actuators, the Bluetooth module 570, and the like.

The microphone 360 is also referred to as a microphone. The microphone 360 may convert a collected sound signal into an electrical signal. An audio circuit receives the electrical signal, and converts the electrical signal into audio data. The audio circuit may also convert audio data into an electrical signal and transmit the electrical signal to the loudspeaker, and the loudspeaker converts the electrical signal into a sound signal for output.

For the Bluetooth module 570, the smartwatch may exchange information with another electronic device (such as a mobile phone or a tablet computer) by using the Bluetooth module 570, and is connected to a network by using the electronic device, so as to be connected to a server and process a function such as speech recognition.

The micro control unit 340 is configured to: control a sensor, perform an operation on sensor data, communicate with the processor 530, and the like.

The sensor may be the heart rate detection sensor 580, a barometric pressure sensor, a gravity sensor, a light sensor, a motion sensor, or another sensor. Specifically, the light sensor may include an ambient light sensor and a proximity sensor. Other sensors such as a gyroscope, a barometer, a hygrometer, a thermometer, and an infrared sensor may also be disposed on the watch. Details are not described herein.

The memory 550 is configured to store a software program and data. The processor 530 runs the software program and the data that are stored in the memory, to perform various function applications of the watch and processes data. The memory 550 mainly includes a program storage area and a data storage area. The program storage area may store an operating system, and an application program required by at least one function (such as a sound play function and an image play function). The data storage area may store data (such as audio data and a phone book) that is created based on use of the watch. In addition, the memory may include a high-speed random access memory, and may further include a nonvolatile memory such as a magnetic disk storage device, a flash memory device, or another volatile solid-state storage device.

The smartwatch 500 further includes the power supply 591 (such as a battery) that supplies power to each component. Optionally, the power supply 591 may be logically connected to the processor 530 by using the power management system 592, to implement functions such as charging, discharging, and power consumption management by using the power management system 592.

It can be learned that most mobile phones currently support hardware such as Bluetooth, NFC, a camera, an infrared sensor, a fingerprint recognition sensor, and an iris recognition sensor, and can implement functions such as two-dimensional code scanning, establishment of an NFC connection to another device, fingerprint recognition, iris recognition, and infrared remote control. A smartwatch mainly supports hardware such as Bluetooth, a heart rate sensor, and a motion sensor, and can implement functions such as establishment of a Bluetooth connection to another device, and recording of sleep, a heart rate, and a motion track of a user. However, due to a lack of related hardware support, functions such as two-dimensional code scanning, fingerprint recognition, and iris recognition cannot be implemented.

Further, the smartwatch 500 shown in FIG. 5 may further include an RF circuit (not shown in FIG. 5). The RF circuit may be configured to receive and send a signal in an information receiving/sending process or a call process. After receiving downlink information from a base station, the RF circuit may send the downlink information to the processor 503 for processing, and send related uplink data to the base station. Generally, the RF circuit includes but is not limited to devices such as an antenna, at least one amplifier, a transceiver, a coupler, a low noise amplifier, and a duplexer. In addition, the RF circuit may further communicate with a network and another mobile device through wireless communication. Any communications standard or protocol may be used for the wireless communication, including but not limited to a global system for mobile communications, a general packet radio service, code division multiple access, wideband code division multiple access, long term evolution, an email, a short message service, and the like.

For detailed descriptions of other possible forms (for example, a Bluetooth headset or a tablet computer) of the first device and the second device in this embodiment of the present invention, refer to descriptions of the mobile phone 400 shown in FIG. 4 or the smartwatch 500 shown in FIG. 5 in this embodiment of the present invention. For example, the first device and the second device may include at least one of an RF circuit, a Bluetooth module, or a Wi-Fi module, a processor, a power supply, and the like. Details are not described in this embodiment of the present invention.

Figure 6A:
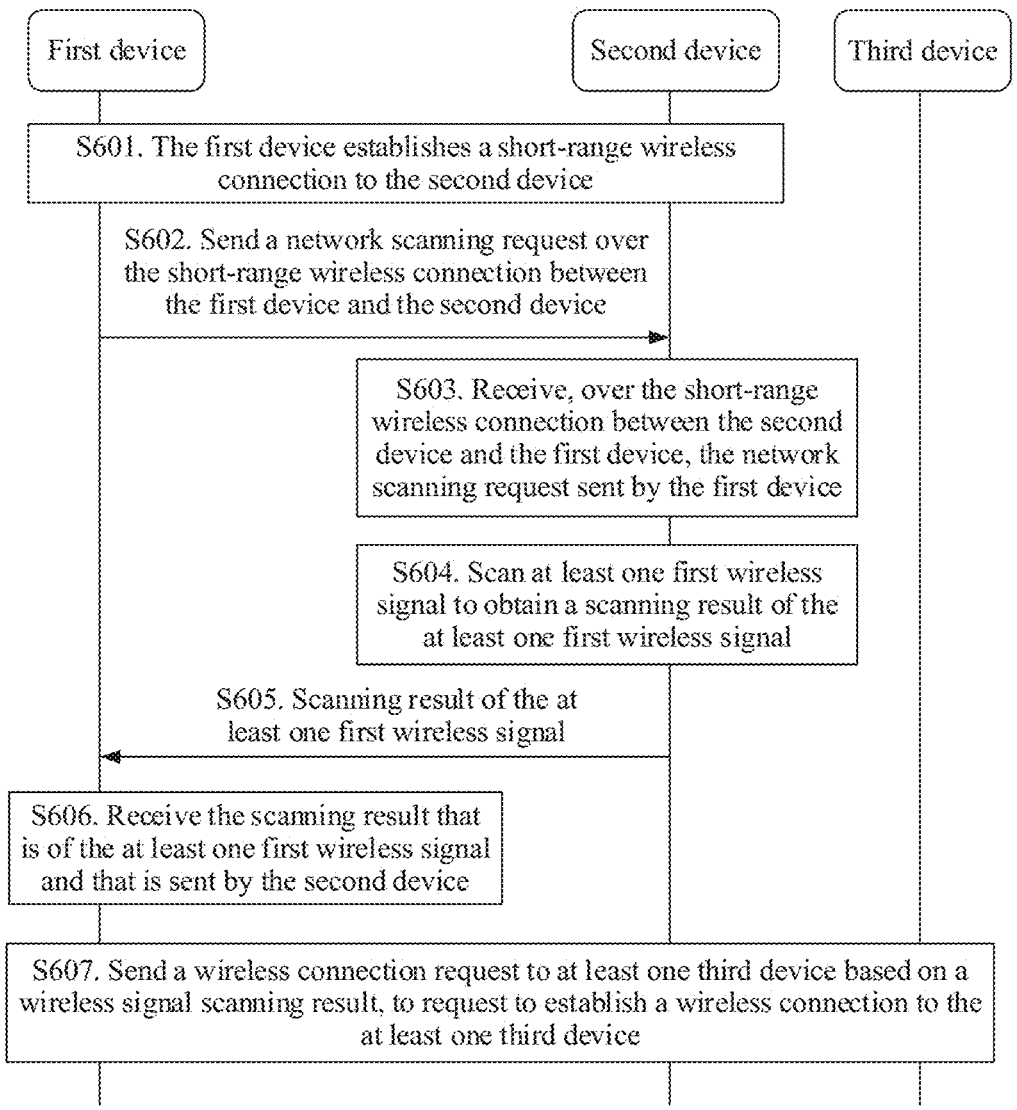
FIG. 6A is a flowchart 1 of a method for establishing a wireless communication connection according to an embodiment of the present invention.

An embodiment of the present invention provides a method for establishing a wireless communication connection. As shown in FIG. 6A, the method for establishing a wireless communication connection includes S601 to S607.

S601. A first device establishes a short-range wireless communication connection to a second device.

S602. The first device sends a network scanning request to the second device over the short-range wireless communication connection between the first device and the second device.

The network scanning request is used to instruct the second device to scan at least one first wireless signal.

S603. The second device receives, over the short-range wireless communication connection between the second device and the first device, the network scanning request sent by the first device.

S604. The second device scans the at least one first wireless signal to obtain a scanning result of the at least one first wireless signal.

For example, the scanning result of the at least one first wireless signal may include an identifier of a wireless device that transmits the at least one wireless signal (for example, an internet protocol (Internet Protocol, IP) address or a media access control (Media Access Control, MAC) address of the wireless device), an identifier of the at least one wireless signal (for example, an SSID of a Wi-Fi network), or the like.

S605. The second device sends the scanning result of the at least one first wireless signal to the first device.

Optionally, the second device may send the scanning result of the at least one first wireless signal to the first device over a short-range wireless communication connection that is the same as that in S603. Alternatively, the second device may send the scanning result of the at least one first wireless signal to the first device over a short-range wireless communication connection that is different from that in S603.

For example, it is assumed that a Bluetooth connection and a Wi-Fi direct connection exist between the first device and the second device. The first device sends the network scanning request to the second device over the Bluetooth connection, and the second device also receives, over the Bluetooth connection, the network scanning request sent by the first device. Then, the second device may send the scanning result of the at least one first wireless signal to the first device over the Bluetooth connection or the Wi-Fi direct connection.

For example, after receiving the network scanning request sent by the first device over the Bluetooth connection, and scanning the at least one first wireless signal to obtain the scanning result of the at least one first wireless signal, the second device finds that signal quality of the Bluetooth connection between the first device and the second device is less than a specific threshold. In this case, the second device may send the scanning result of the at least one first wireless signal to the first device over the Wi-Fi direct connection between the first device and the second device.

S606. The first device receives the scanning result that is of the at least one first wireless signal and that is sent by the second device.

S607. The first device sends a wireless connection request to at least one third device based on a wireless signal scanning result, to request to establish a wireless connection to the at least one third device.

The wireless signal scanning result includes the scanning result of the at least one first wireless signal.

For example, after receiving the scanning result of the at least one first wireless signal, the first device may establish, based on user selection for the at least one first wireless signal, a wireless connection to a third device that transmits a wireless signal selected by a user; or the first device may randomly establish a wireless connection to a third device that transmits any one of the at least one first wireless signal.

According to the method for establishing a wireless communication connection provided in this embodiment of the present invention, the first device may send the network scanning request to the second device, to instruct the second device to help the first device scan the at least one first wireless signal. In this case, the first device does not need to scan the at least one first wireless signal, and only needs to receive the scanning result that is of the at least one first wireless signal and that is sent by the second device, to establish a wireless connection to the at least one third device based on the wireless signal scanning result. Because the first device does not need to scan a wireless signal, battery power that is of the first device and that is consumed by scanning the wireless signal (that is, searching for a network) can be avoided, that is, power consumed when the first device establishes a wireless communication connection can be reduced, and a battery life of the first device can be prolonged.

Figure 6B:
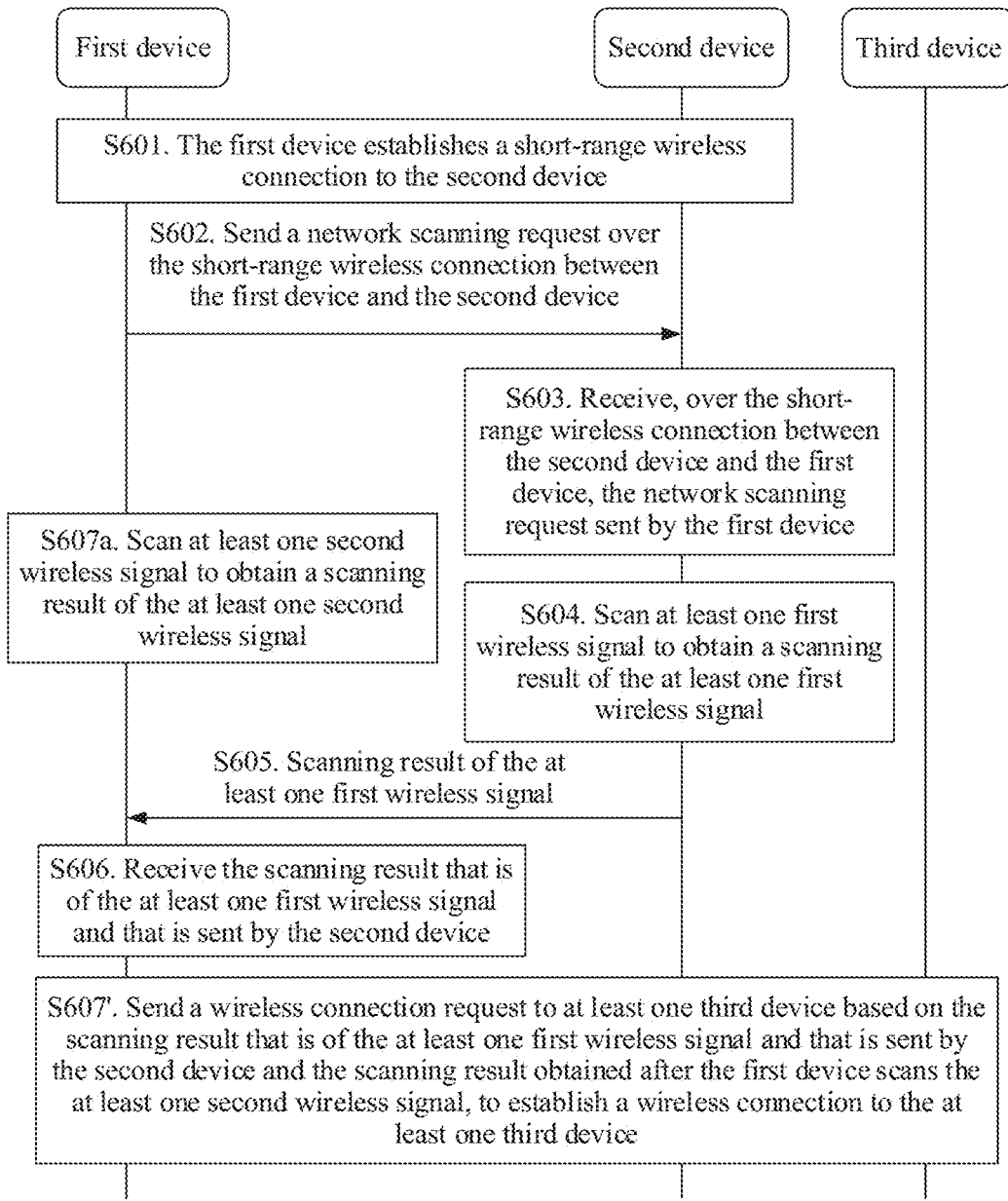
FIG. 6B is a flowchart 2 of a method for establishing a wireless communication connection according to an embodiment of the present invention.

Further, the first wireless signal may be only a part of signals that the first device expects to scan. Therefore, when the first device instructs the second device to scan the at least one first wireless signal, the first device may scan another wireless signal, to improve wireless connection efficiency of the first device. Specifically, as shown in FIG. 6B, before S607 shown in FIG. 6A, the method in this embodiment of the present invention may further include S607a, and S607 shown in FIG. 6A may be replaced with S607'.

S607a. The first device scans at least one second wireless signal to obtain a scanning result of the at least one second wireless signal, where the at least one second wireless signal is different from the at least one first wireless signal.

The at least one second wireless signal in this embodiment of the present invention may be a wireless signal of a type that is different from that of the at least one first wireless signal. For example, the at least one first wireless signal may be a wireless signal transmitted by a base station, and the at least one second wireless signal may be a Wi-Fi signal and/or a Bluetooth signal.

Alternatively, the at least one second wireless signal in this embodiment of the present invention may be a wireless signal of a type that is the same as that of the at least one first wireless signal. For example, the at least one first wireless signal and the at least one second wireless signal may be Wi-Fi signals on different frequency bands; or the at least one first wireless signal may be a 4G signal transmitted by a base station, and the at least one second wireless signal may be a 3G signal transmitted by the base station.

S607'. The first device sends the wireless connection request to the at least one third device based on the scanning result that is of the at least one first wireless signal and that is sent by the second device and the scanning result obtained after the first device scans the at least one second wireless signal, to establish a wireless connection to the at least one third device.

According to the method for establishing a wireless communication connection provided in this embodiment of the present invention, the first device may send the network scanning request to the second device, to instruct the second device to help the first device scan the at least one first wireless signal. In this way, the first device does not need to scan at least one first wireless signal. In addition, the first device may scan the at least one second wireless signal when instructing the second device to scan the at least one first wireless signal. To be specific, the first device only needs to scan a part (the at least one second wireless signal) of wireless signals, to obtain scanning results of a plurality of wireless signals (the at least one first wireless signal and the at least one second wireless signal), and establish a wireless connection to the at least one third device based on the scanning results of the plurality of wireless signals.

The first device only needs to scan a part (the at least one second wireless signal) of wireless signals to obtain scanning results of a plurality of wireless signals (the at least one first wireless signal and the at least one second wireless signal). In this way, battery power that is of the first device and that is consumed by scanning a wireless signal (that is, searching for a network) can be reduced, that is, power consumed when the first device establishes a wireless communication connection can be reduced, and a battery life of the first device can be prolonged.

Further, after obtaining the wireless signal scanning result, the first device may display the wireless signal scanning result, so that the user can select the at least one third device to which the first device is to establish a wireless connection. Specifically, before S607 or S607', the method in this embodiment of the present invention may further include S607b.

S607b. The first device displays the wireless signal scanning result.

Figure 6C:
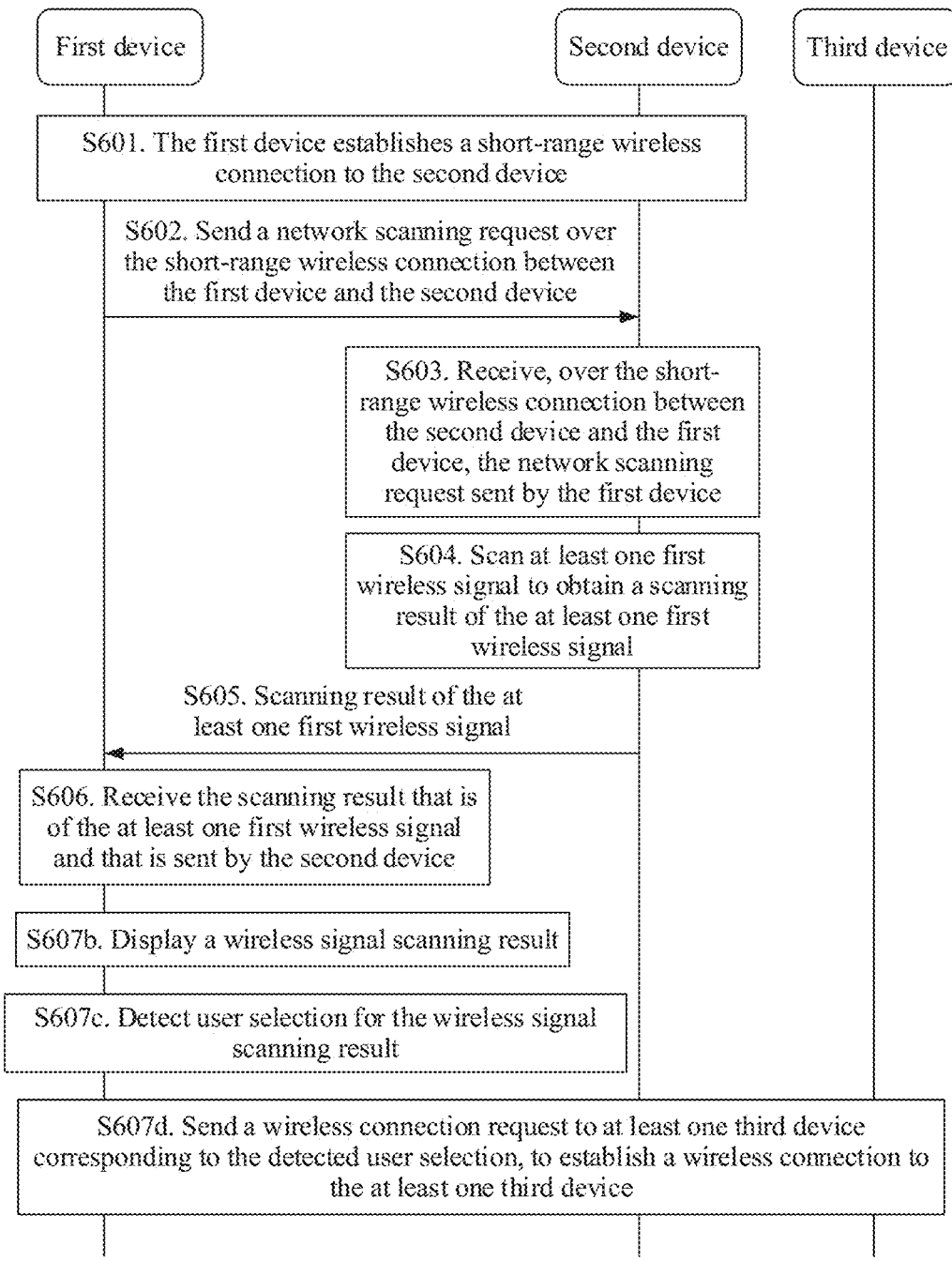
FIG. 6C is a flowchart 3 of a method for establishing a wireless communication connection according to an embodiment of the present invention.

In some embodiments, the wireless signal scanning result may include the scanning result that is of the at least one first wireless signal and that is sent by the second device. In these embodiments, as shown in FIG. 6C, after S606 and before S607 shown in FIG. 6A, the method in this embodiment of the present invention may further include S607b, and S607 may be replaced with S607c and S607d.

S607c. The first device detects user selection for the wireless signal scanning result.

S607d. The first device sends the wireless connection request to at least one third device corresponding to the detected user selection, to establish a wireless connection to the at least one third device.

Figure 6D:
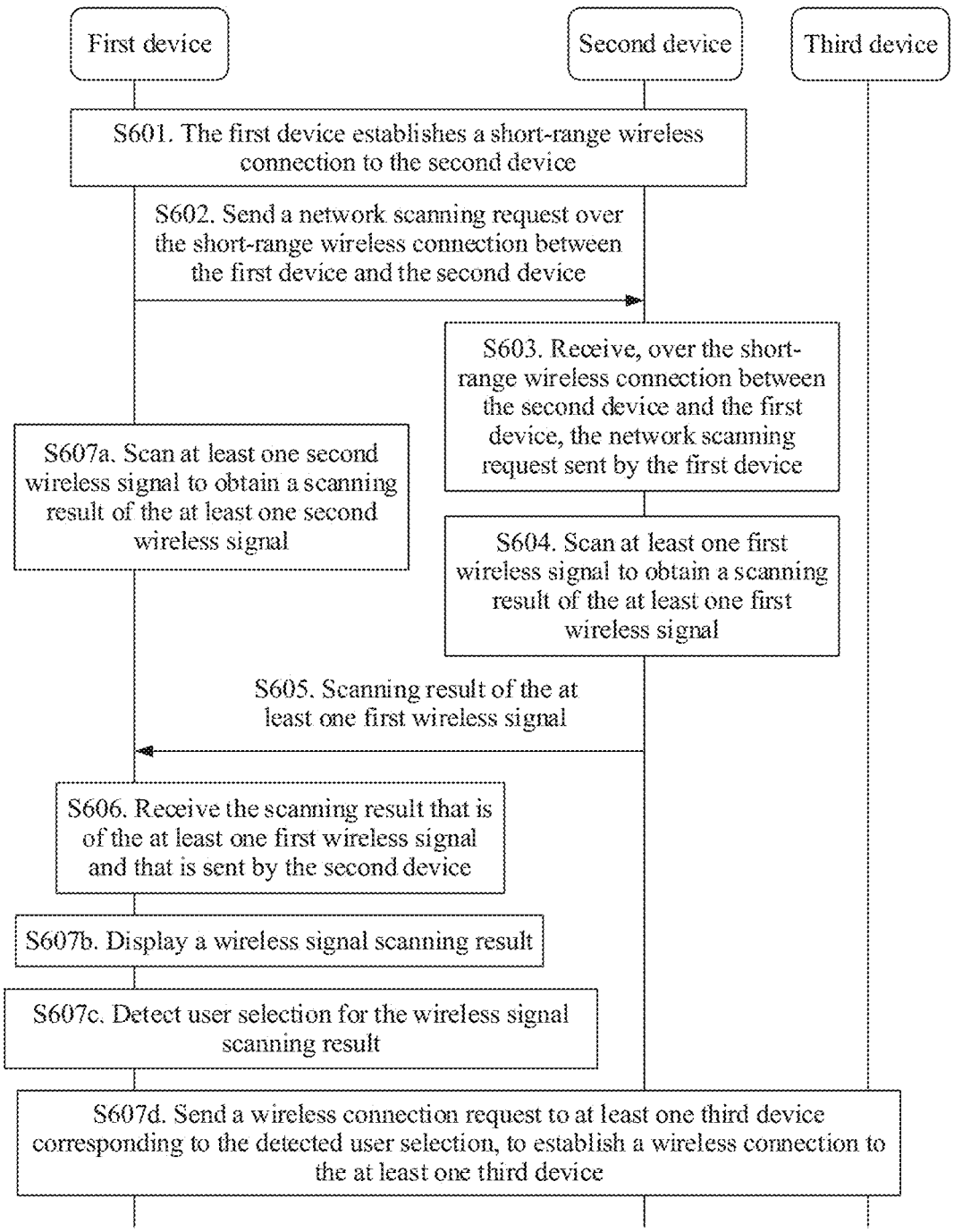
FIG. 6D is a flowchart 4 of a method for establishing a wireless communication connection according to an embodiment of the present invention.

In some other embodiments, the wireless signal scanning result includes not only the scanning result that is of the at least one first wireless signal and that is sent by the second device, but also the scanning result obtained after the first device scans the at least one second wireless signal. In these embodiments, as shown in FIG. 6D, after S607a and before S607' shown in FIG. 6B, the method in this embodiment of the present invention may further include S607b, and S607' may be replaced with S607c and S607d.

Figure 7:
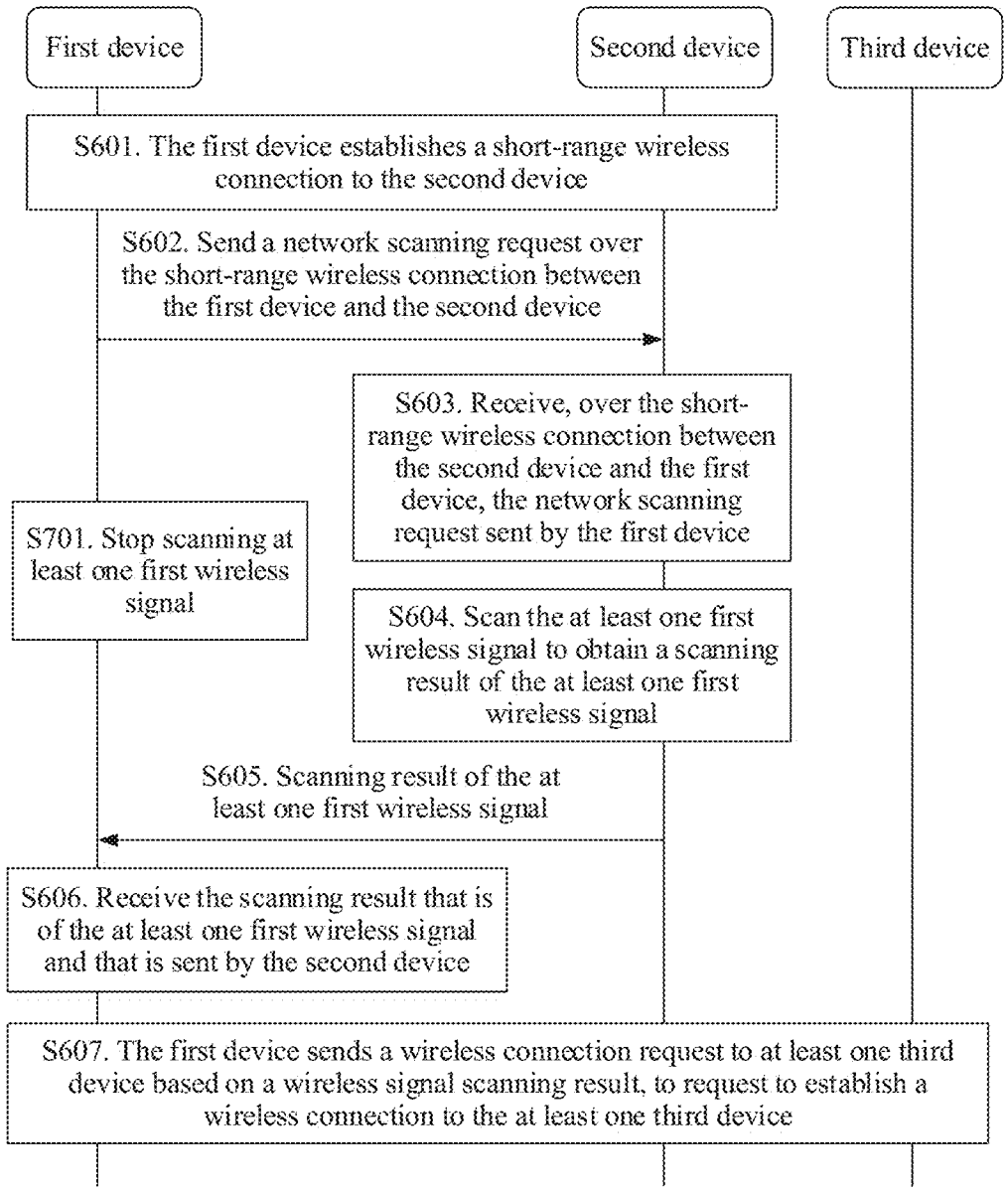
FIG. 7 is a flowchart 5 of a method for establishing a wireless communication connection according to an embodiment of the present invention.

Further, to reduce power consumed when the first device establishes a wireless communication connection, and prolong the battery life of the first device, the first device may stop scanning the at least one first wireless signal, and the second device assists the first device in scanning the at least one first wireless signal. Specifically, as shown in FIG. 7, the method in this embodiment of the present invention may further include S701.

S701. The first device stops scanning the at least one first wireless signal.

The first device may perform S602 (that is, send a network scanning request to the second device over the short-range wireless communication connection) in response to S701 (stop scanning the at least one first wireless signal).

Alternatively, the first device may stop scanning the at least one first wireless signal when sending the network scanning request to the second device over the short-range wireless communication connection, that is, the first device may simultaneously perform S701 and S602. Alternatively, the first device may perform S701 (stop scanning the at least one first wireless signal) in response to S602 (that is, send a network scanning request to the second device over the short-range wireless communication connection). In this embodiment of the present invention, a sequence of performing S701 and S602 is not limited.

Optionally, in a first application scenario of this embodiment of the present invention, the first device may perform S701 and S602 when remaining power of the first device is lower than a first preset threshold. Specifically, before S701 and S602, the method in this embodiment of the present invention may further include S801.

S801. The first device determines whether the remaining power of the first device is lower than the first preset threshold.

Specifically, when the remaining power of the first device is lower than the first preset threshold, the first device may continue to perform S701 and/or S602; or when the remaining power of the first device is higher than or equal to the first preset threshold, the first device may continue to perform S801.

It may be understood that when the remaining power of the first device is lower than the first preset threshold, the first device may enter a low power mode. In the low power mode, the first device may stop scanning the at least one first wireless signal, and send the network scanning request to the second device, to instruct the second device to scan the at least one first wireless signal and return the scanning result to the first device.

In a second application scenario of this embodiment of the present invention, the first device may perform S701 and S602 in response to user input. For example, the input may be a tap operation performed by the user on a shortcut key on the first device, or may be an operation performed by the user to enable a function that is on the first device and that is used to control the first device to "stop scanning the at least one first wireless signal" and "send a network scanning request to the second device".

For example, it is assumed that the first device is the smartwatch 200 shown in FIG. 2A and FIG. 2B (referring to the smartwatch 500 shown in FIG. 5), and the second device is any wireless device such as the mobile phone 220 shown in FIG. 2A and FIG. 2B (referring to the mobile phone 400 shown in FIG. 4) or a tablet computer. When a finger of the user slides down from the top of a display screen of the smartwatch 200 (that is, the finger slides along a sliding track 901 shown in FIG. 9-1), the smartwatch 200 may display a drop-down list 902 shown in FIG. 9-2. The drop-down list 902 may include options such as a "WLAN" option, a "Bluetooth" option, and a "mobile network" option, and may further include a "signal scanning option" 903. The "signal scanning option" 903 is a function used to control the smartwatch 200 to "stop scanning the at least one first wireless signal" and "send a network scanning request to the second device* (a wireless device such as a mobile phone or a tablet computer)". When the finger of the user taps the "signal scanning option" 903 shown in FIG. 9-2, the smartwatch 200 may perform S701 (that is, "stop scanning the at least one first wireless signal") and S602 (that is, "send a network scanning request to the mobile phone 130") and display a display interface shown in FIG. 9-3.

Figure 9A:
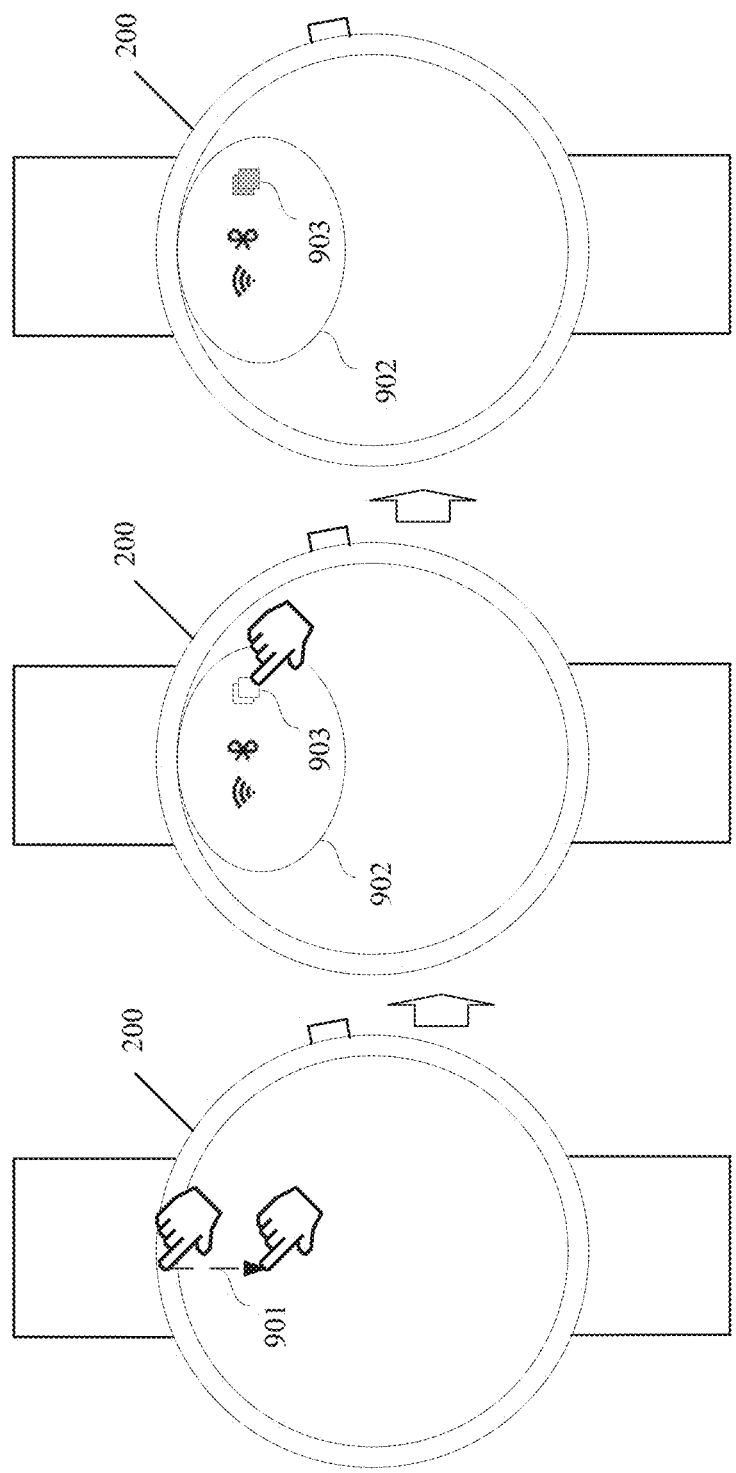
FIG. 9A is a schematic diagram 1 of an example of a display interface of a smart band according to an embodiment of the present invention.
Figure 9B:
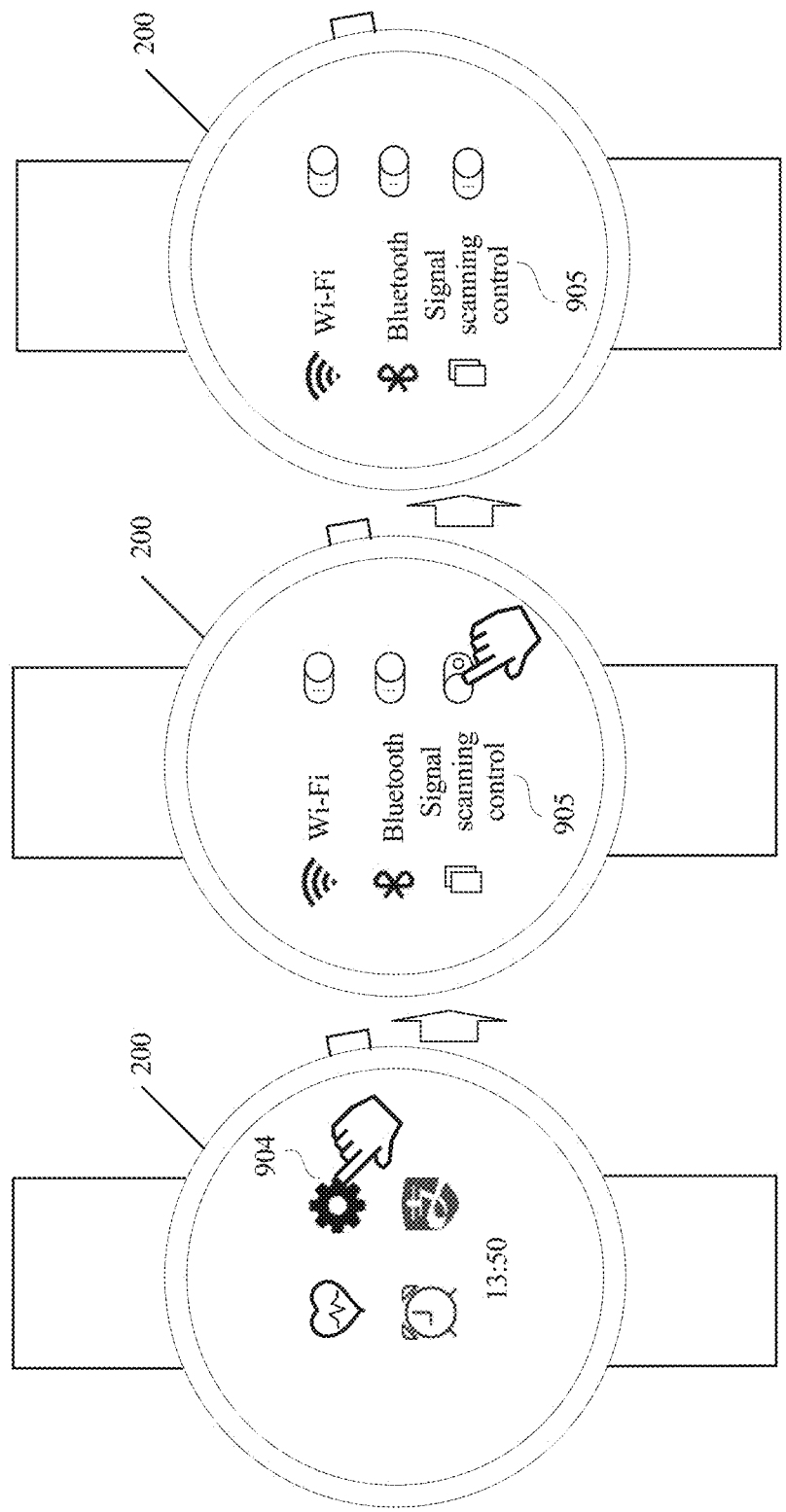
FIG. 9B is a schematic diagram 2 of an example of a display interface of a smart band according to an embodiment of the present invention.
Figure 9C:
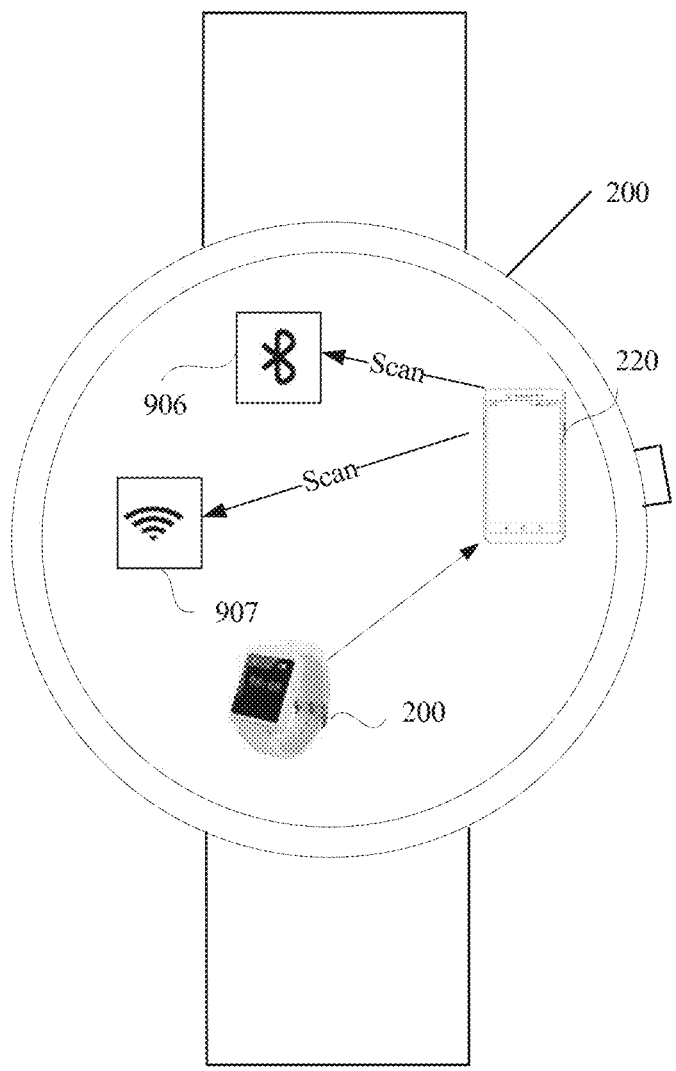
FIG. 9C is a schematic diagram 3 of an example of a display interface of a smart band according to an embodiment of the present invention.
Figure 9D:
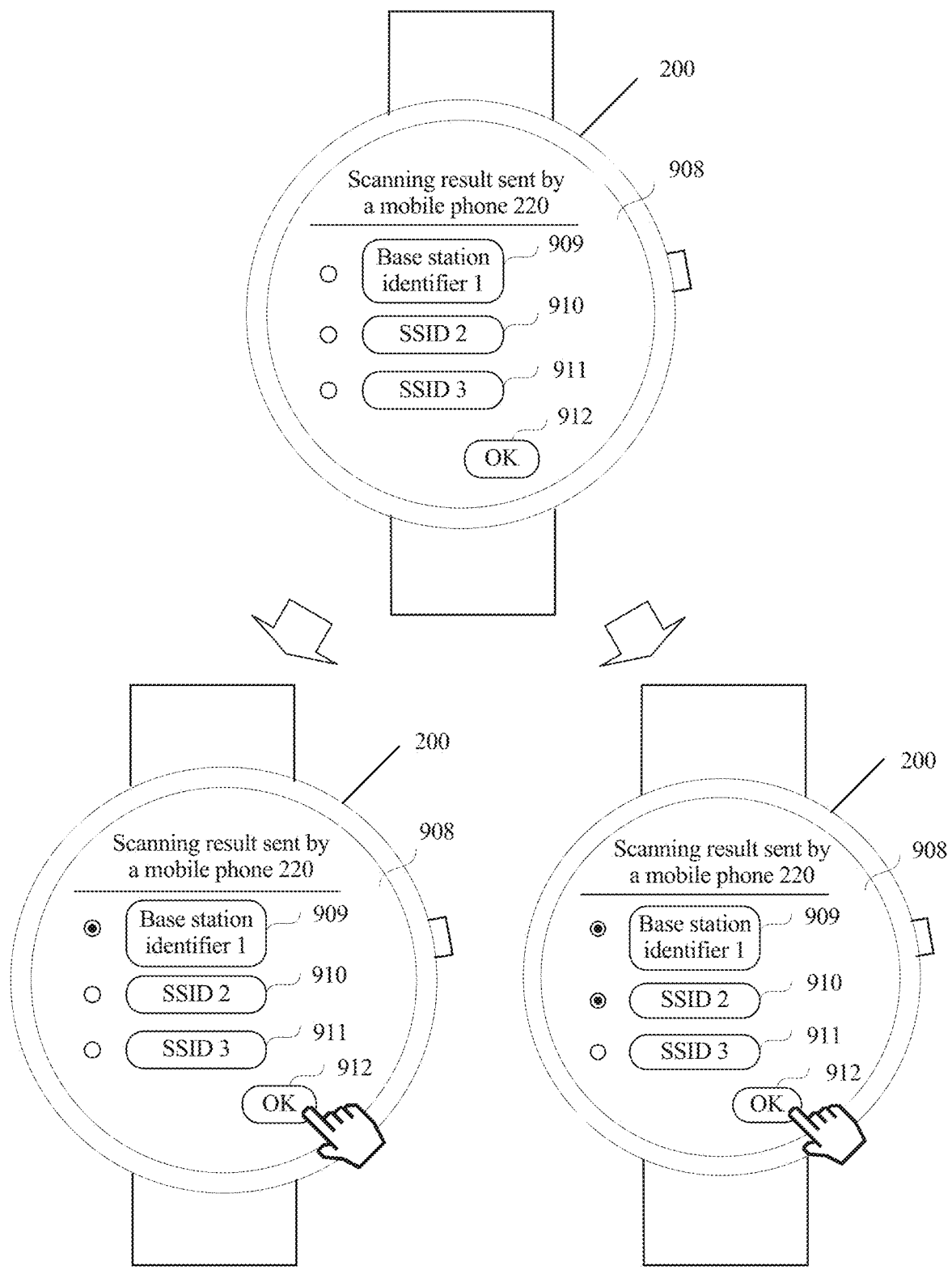
FIG. 9D is a schematic diagram 4 of an example of a display interface of a smart band according to an embodiment of the present invention.
Figures 9, 10:
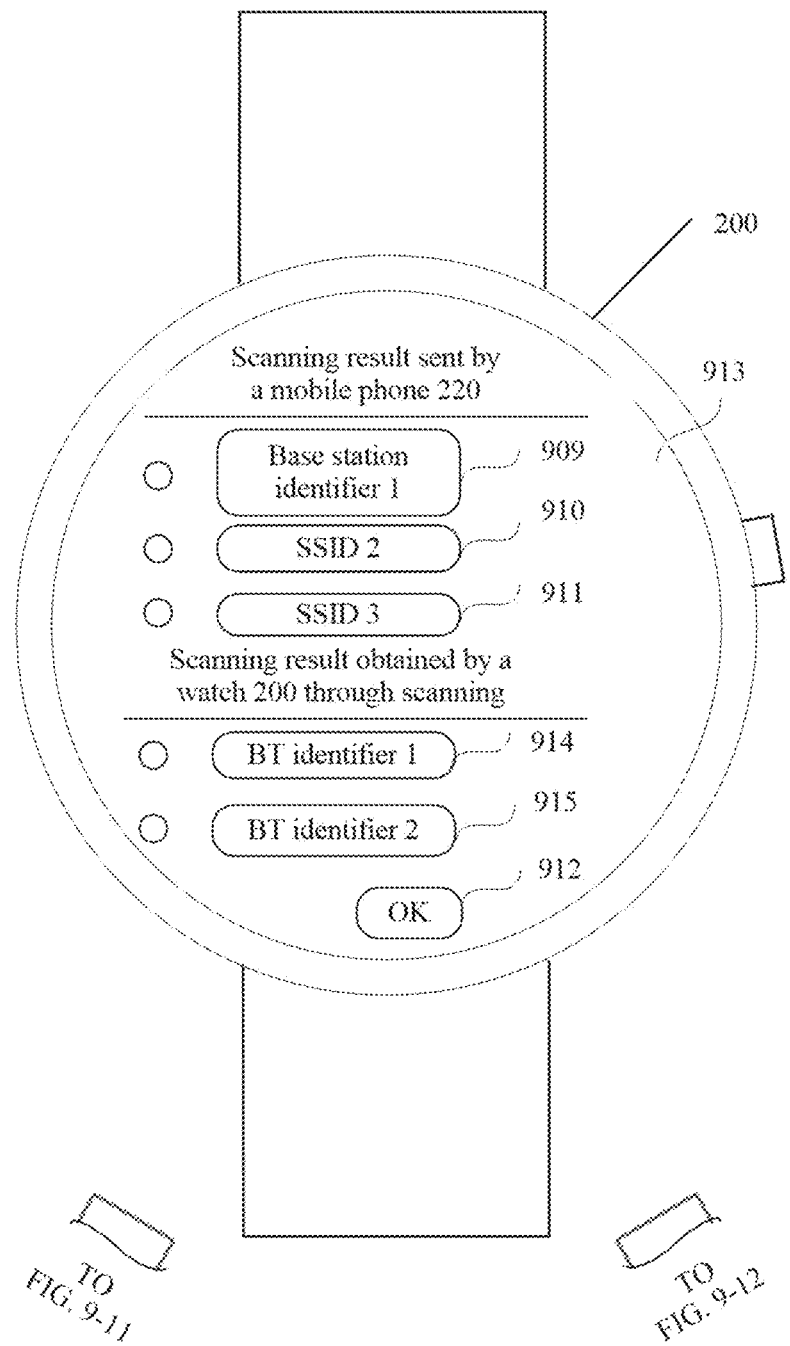
FIG. 9-10 to FIG. 9-12 are a schematic diagram 5 of an example of a display interface of a smart band according to an embodiment of the present invention.

Alternatively, when the finger of the user taps a "setting" option 904 on the smartwatch 200 shown in FIG. 9-4, the smartwatch 200 may display a "setting interface" shown in FIG. 9-5, and the setting interface includes a "signal scanning control" option 905. As shown in FIG. 9-5, when the user slides the "signal scanning control" option 905 to enable the "signal scanning control" option 905, the smartwatch 200 may display a display interface shown in FIG. 9-6, and perform S701 (that is, "stop scanning the at least one first wireless signal") and S602 (that is, "send a network scanning request to the mobile phone 130").

Optionally, it is assumed that the smartwatch 200 establishes a short-range wireless communication connection (for example, a Bluetooth connection) only to the mobile phone 220 shown in FIG. 2B. In this case, after the user enables the "signal scanning control" option shown in FIG. 9-2 or FIG. 9-5, the smartwatch may display a display interface shown in FIG. 9C. The user does not configure the smartwatch 200 to instruct the mobile phone 200 to scan a specific type of wireless signal (namely, a Wi-Fi signal or a Bluetooth signal). Therefore, after receiving the network scanning request, the mobile phone 220 may simultaneously scan a Bluetooth signal transmitted by a Bluetooth device 906 and a Wi-Fi signal transmitted by a Wi-Fi device 907.

For example, with reference to FIG. 6C, after S606 and before S607 shown in FIG. 6A, the first device displays the wireless signal scanning result (that is, the method in this embodiment of the present invention may include S607b), and S607 may be replaced with S607c and S607d.

For example, the smartwatch 200 shown in FIG. 9A or FIG. 9B is used as an example. After the user operates an icon or an option in a display interface of the smartwatch 200 shown in FIG. 9A or FIG. 9B to control the smartwatch 200 to send the network scanning request to the mobile phone 220, if the smartwatch 200 receives the scanning result that is of the at least one first wireless signal and that is sent by the mobile phone 220, the smartwatch 200 may display a wireless signal scanning result interface 908 shown in FIG. 9-7 (that is, perform S607b). The wireless signal scanning result includes the scanning result that is of the at least one first wireless signal and that is sent by the second device.

For example, it is assumed that the at least one first wireless signal scanned by the mobile phone 220 includes a signal transmitted by a base station 1, a signal transmitted by a Wi-Fi hotspot 2, and a signal transmitted by a Wi-Fi hotspot 3. In this case, the scanning result interface 908 shown in FIG. 9-7 may include an option 909 of a "base station identifier 1" of the base station 1, an option 910 of an "SSID 2" corresponding to the Wi-Fi hotspot 2, and an option 911 of an "SSID 3" corresponding to the Wi-Fi hotspot 3.

Figure 8:
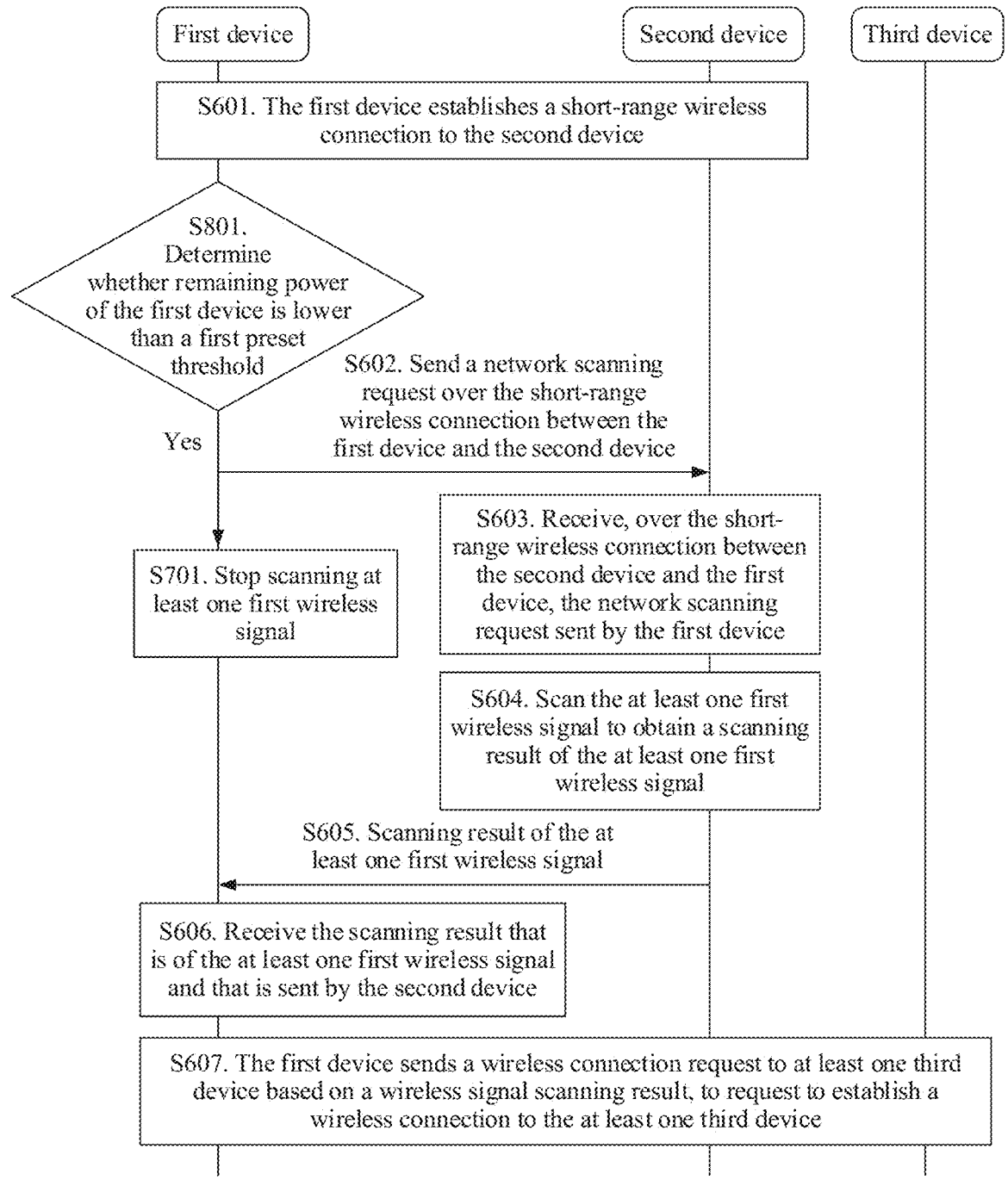
FIG. 8 is a flowchart 6 of a method for establishing a wireless communication connection according to an embodiment of the present invention.

As shown in FIG. 9-8, when the user selects the option 909 of the "base station identifier 1" and taps an "OK" button 912, the first device may send a wireless connection request to the base station 1 to request to establish a wireless connection to the base station 1. As shown in FIG. 9-9, when the user selects the option 909 of the "base station identifier 1" and the option 910 of the "SSID 2" and taps an "OK" button 912, the first device may send a wireless connection request to each of the base station 1 and the Wi-Fi hotspot 2 to request to establish a wireless connection to each of the base station 1 and the Wi-Fi hotspot 2.

For example, with reference to FIG. 6D, after S607a and before S607' shown in FIG. 6B, the first device displays the wireless signal scanning result (that is, the method in this embodiment of the present invention may include S607b), and S607' may be replaced with S607c and S607d.

For example, the smartwatch 200 shown in FIG. 9A or FIG. 9B is used as an example. After the user operates an icon or an option in a display interface of the smartwatch 200 shown in FIG. 9A or FIG. 9B to control the smartwatch 200 to send the network scanning request to the mobile phone 220, if the smartwatch 200 receives the scanning result that is of the at least one first wireless signal and that is sent by the mobile phone 220, the smartwatch 200 may display a wireless signal scanning result interface 913 shown in FIG. 9-10 (that is, perform S607b). The wireless signal scanning result includes not only the scanning result that is of the at least one first wireless signal and that is sent by the second device, but also the scanning result of the at least one second wireless signal.

For example, it is assumed that the at least one first wireless signal scanned by the mobile phone 220 includes a signal transmitted by a base station 1, a signal transmitted by a Wi-Fi hotspot 2, a signal transmitted by a Wi-Fi hotspot 3, and a signal transmitted by a Bluetooth device 1, and the at least one second wireless signal scanned by the smartwatch 200 includes a Bluetooth identifier 1 of the Bluetooth device 1 and a Bluetooth identifier 2 of a Bluetooth device 2. In this case, the scanning result interface 909 shown in FIG. 9-10 may include an option 909 of a "base station identifier 1" of the base station 1, an option 910 of an "SSID 2" corresponding to the Wi-Fi hotspot 2, and an option 911 of an "SSID 3" corresponding to the Wi-Fi hotspot 3, and may further include an option 914 of the "Bluetooth identifier 1" of the Bluetooth device 1 and an option 915 of the "Bluetooth identifier 2" of the Bluetooth device 2.

Figures 9, 10, 11:
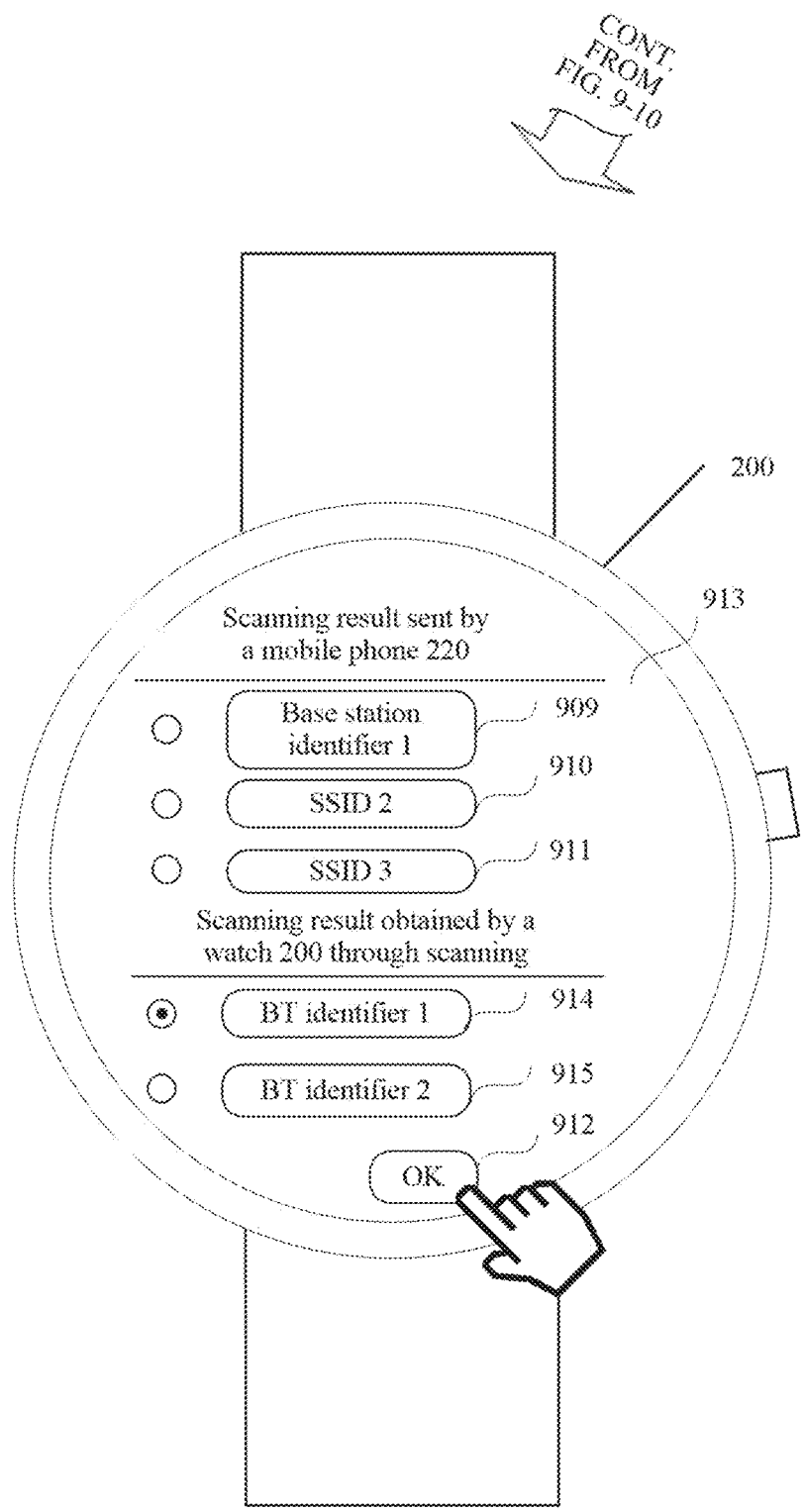
Figures 9, 10, 11, 12:
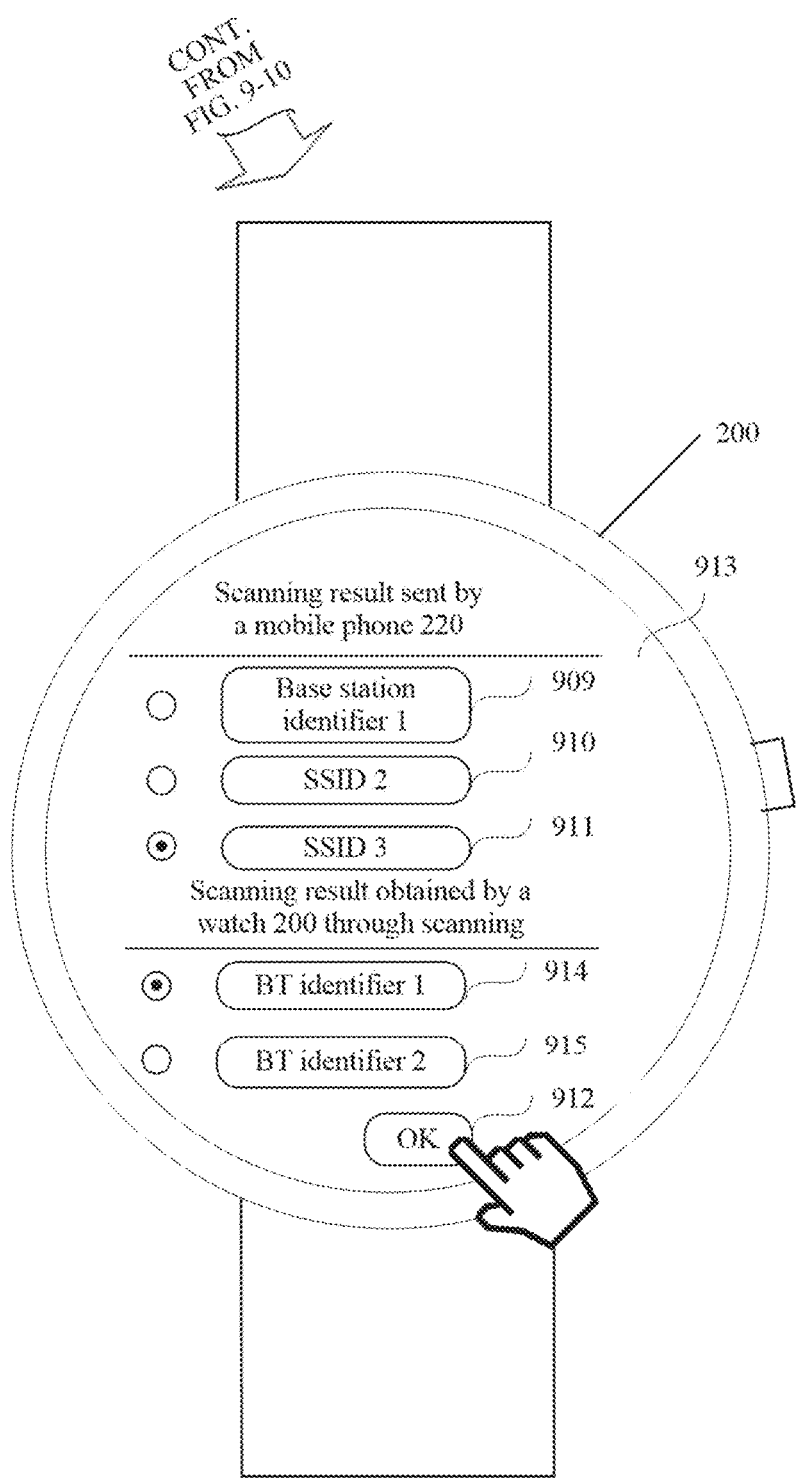

As shown in FIG. 9-11, when the user selects the option 914 of the "Bluetooth identifier 1" and taps an "OK" button 912, the first device may send a wireless connection request to the Bluetooth device 1 to request to establish a wireless connection to the Bluetooth device 1. As shown in FIG. 9-12, when the user selects the option 911 of the "SSID 3" and the option 914 of the "Bluetooth identifier 1" and taps an "OK" button 912, the first device may send a wireless connection request to each of the Bluetooth device 1 and the Wi-Fi hotspot 3 to request to establish a Bluetooth connection to the Bluetooth device 1 and request to access a Wi-Fi network corresponding to the Wi-Fi hotspot 3.

Figure 10A:
FIG. 10A to FIG. 10C are a schematic diagram 1 of an example of a display interface of a mobile phone according to an embodiment of the present invention.

For example, it is assumed that the first device is the mobile phone 110 (referring to the mobile phone 400 shown in FIG. 4), and the second device is any wireless device such as the tablet computer 130 or a mobile phone (referring to the mobile phone 400 shown in FIG. 4). When a finger of the user slides down from the top of a display screen of the mobile phone 110 (that is, the finger slides along a sliding track 1001 shown in FIG. 10A), the mobile phone 110 may display a drop-down list 1002 shown in FIG. 10B. The drop-down list 1002 may include options such as a "WLAN" option, a "Bluetooth" option, and a "mobile network" option, and may further include a "signal scanning option" 1003. The "signal scanning option" 1003 is a function used to control the mobile phone 110 to "stop scanning the at least one first wireless signal" and "send a network scanning request to the mobile phone". When the finger of the user taps the "signal scanning option" 1003 shown in FIG. 10B, the mobile phone 110 may perform S701 (that is, "stop scanning the at least one first wireless signal") and S602 (that is, "send a network scanning request to the mobile phone 130").

Figure 10B:
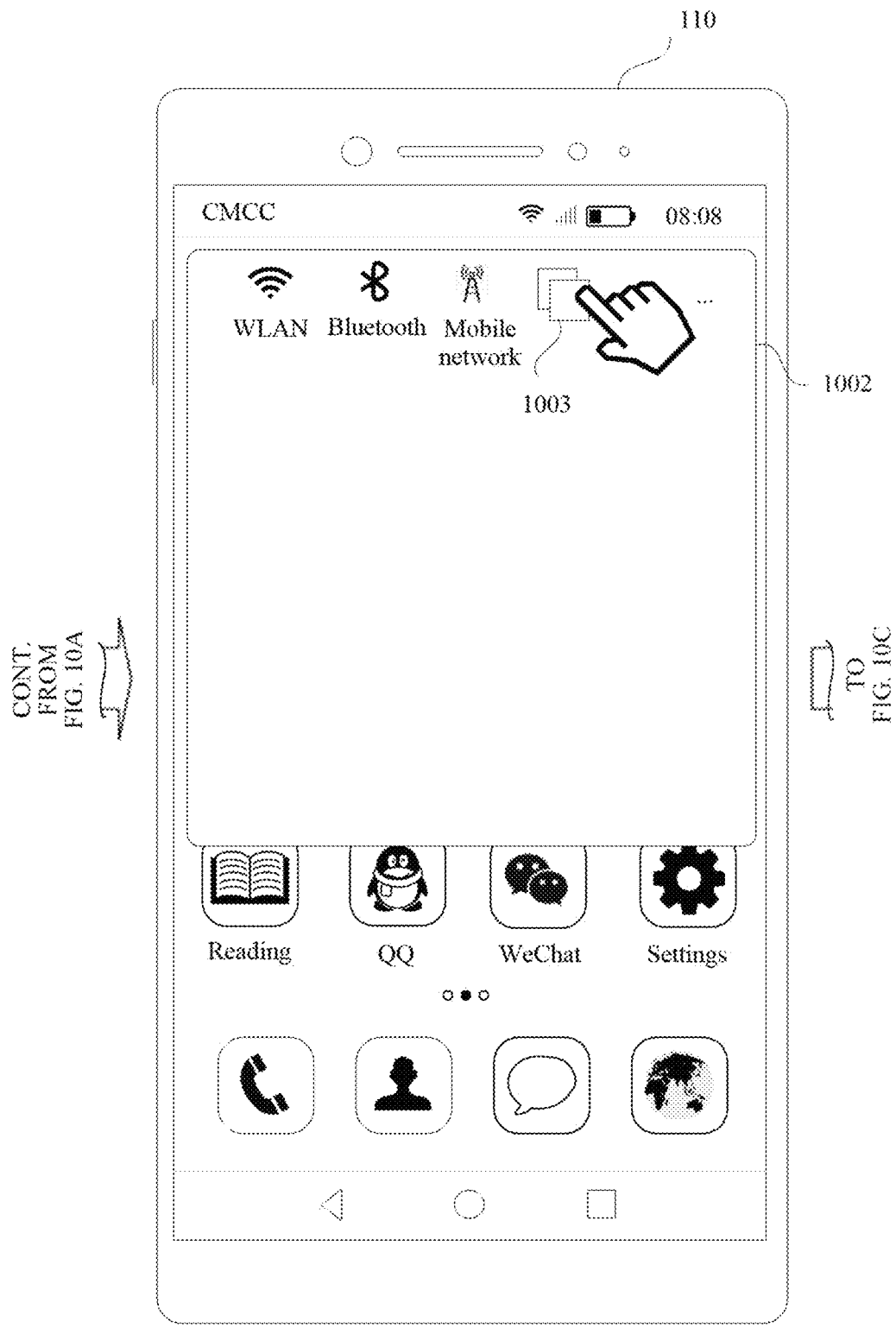
Figure 10C:
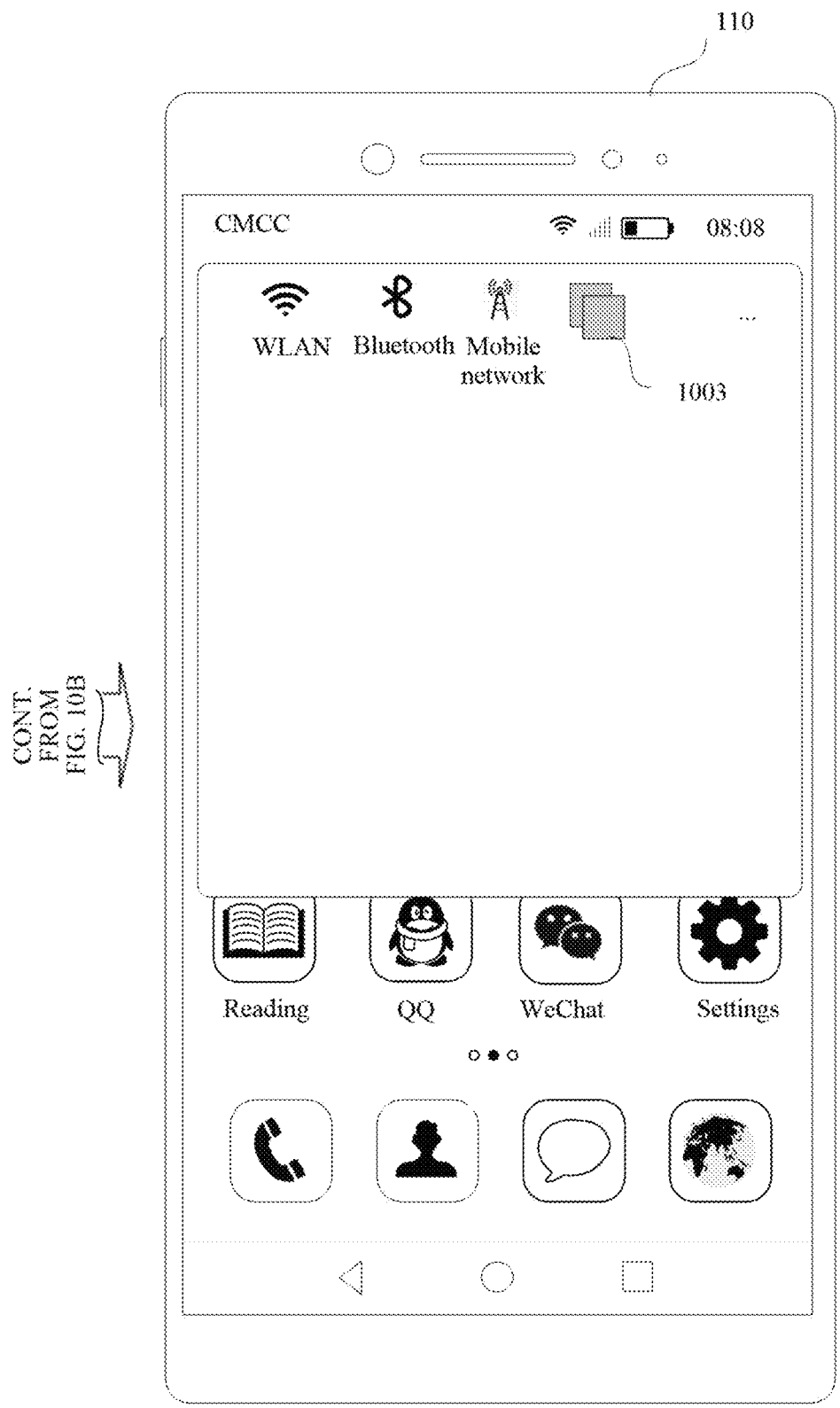
Figure 11:
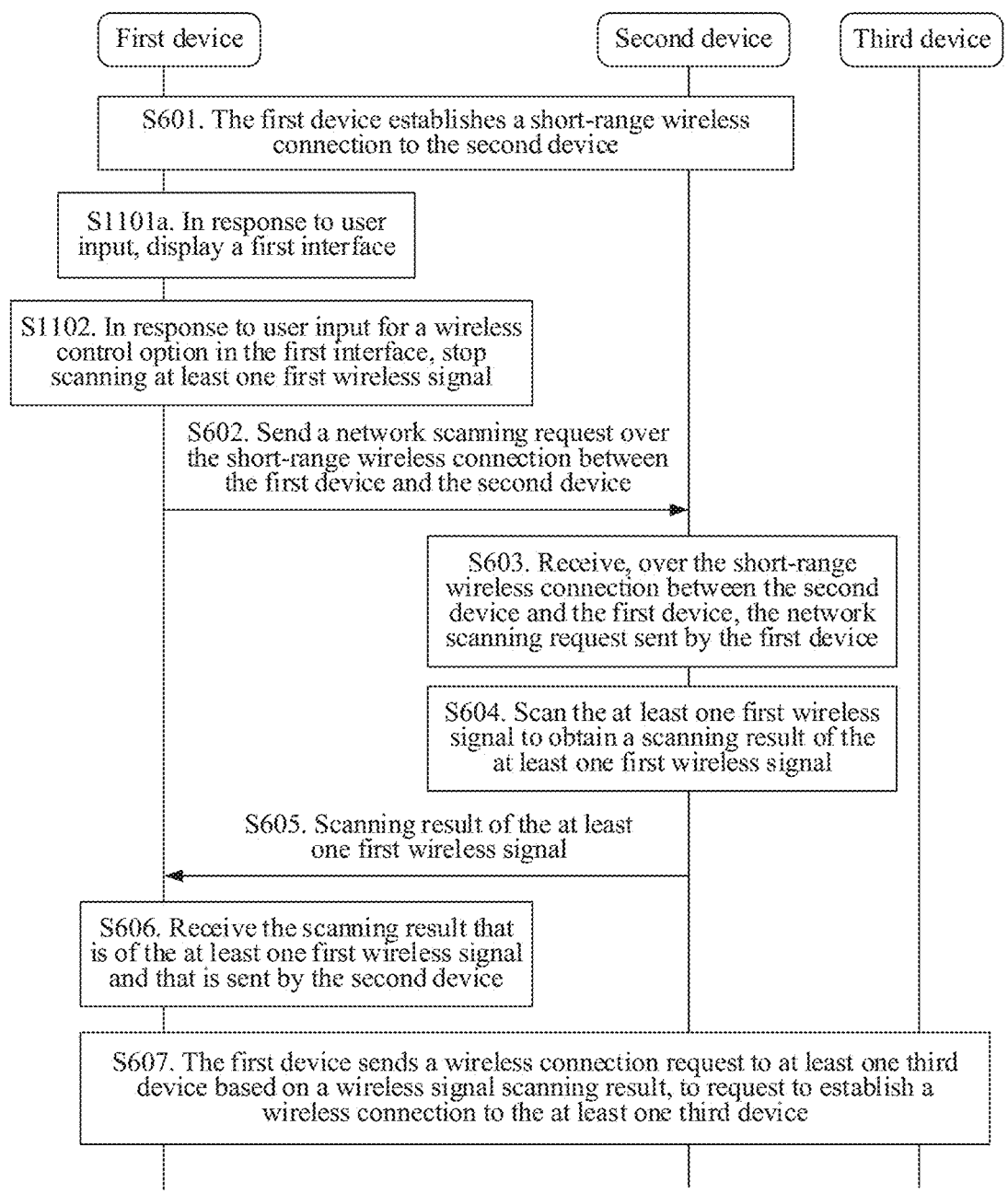
Figures 1, 14:
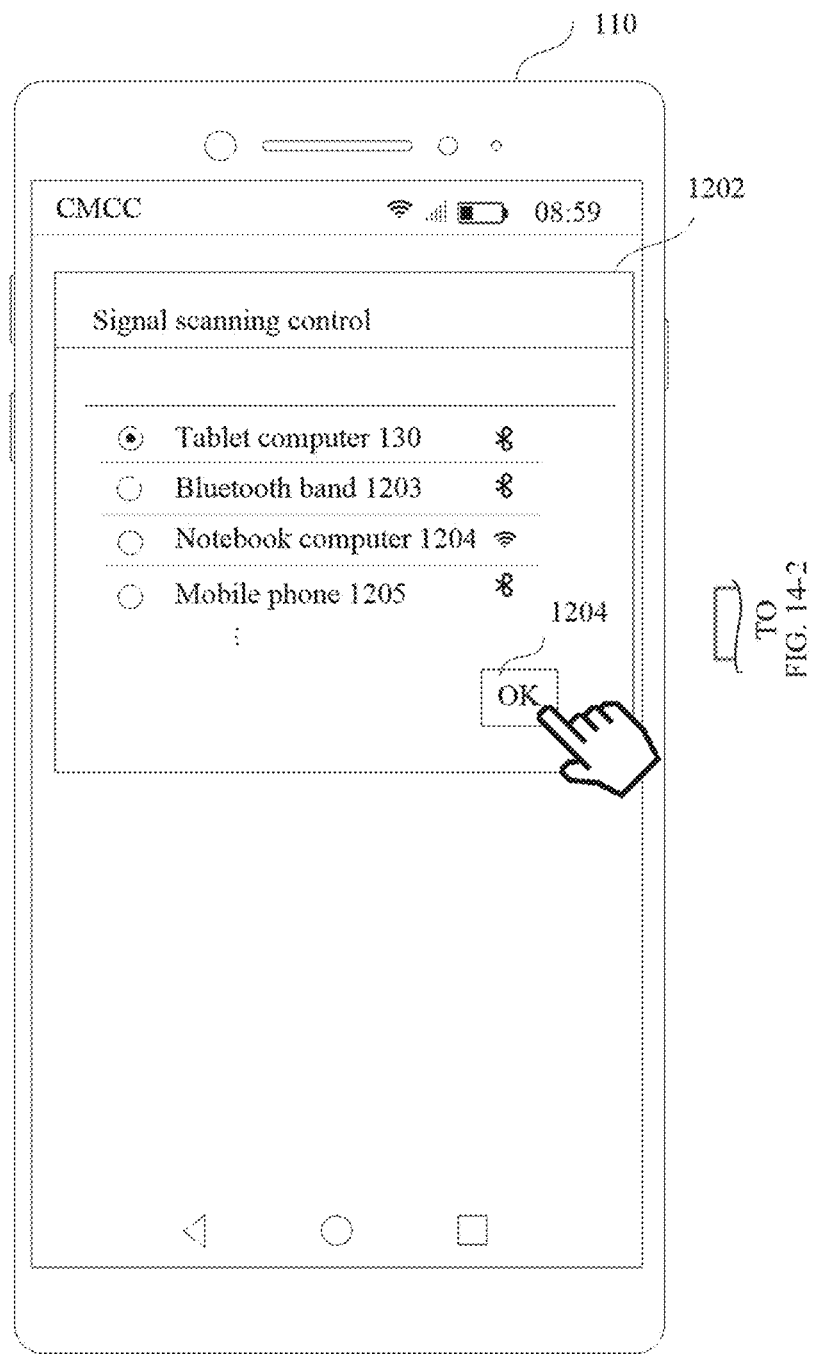
FIG. 14-1 and FIG. 14-2 are a schematic diagram 4 of an example of a display interface of a mobile phone according to an embodiment of the present invention.
Figures 2, 14:
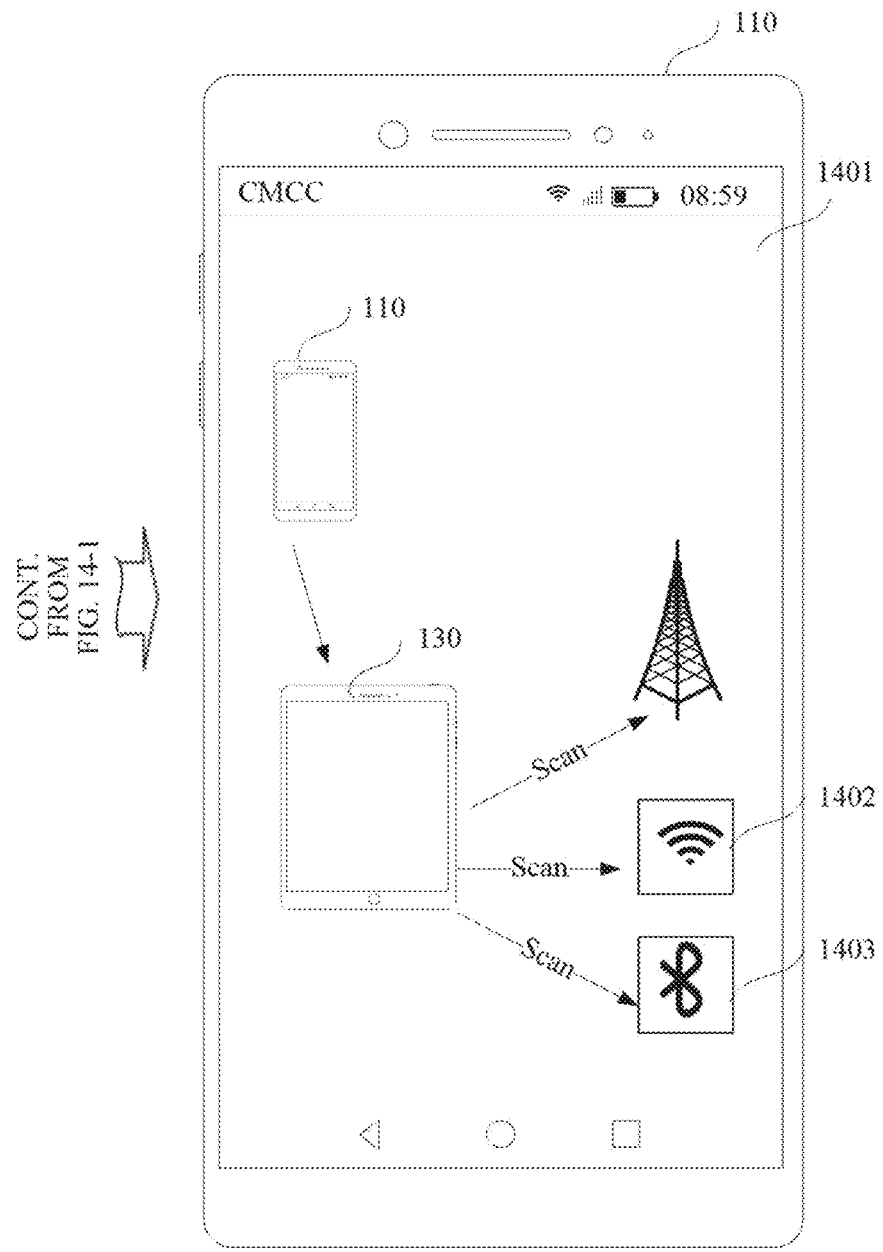
Figures 3, 14:
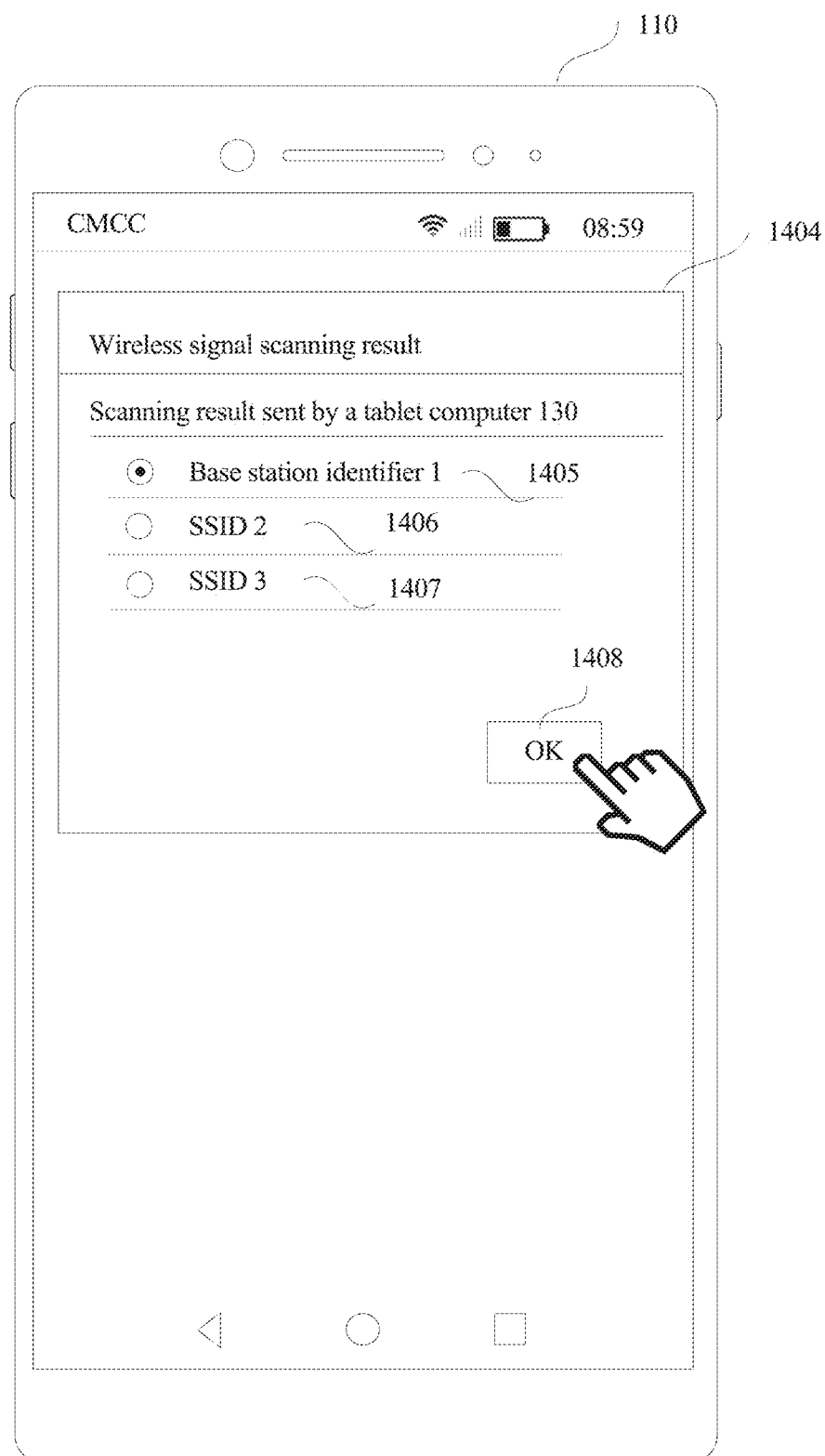
Figures 4, 14:
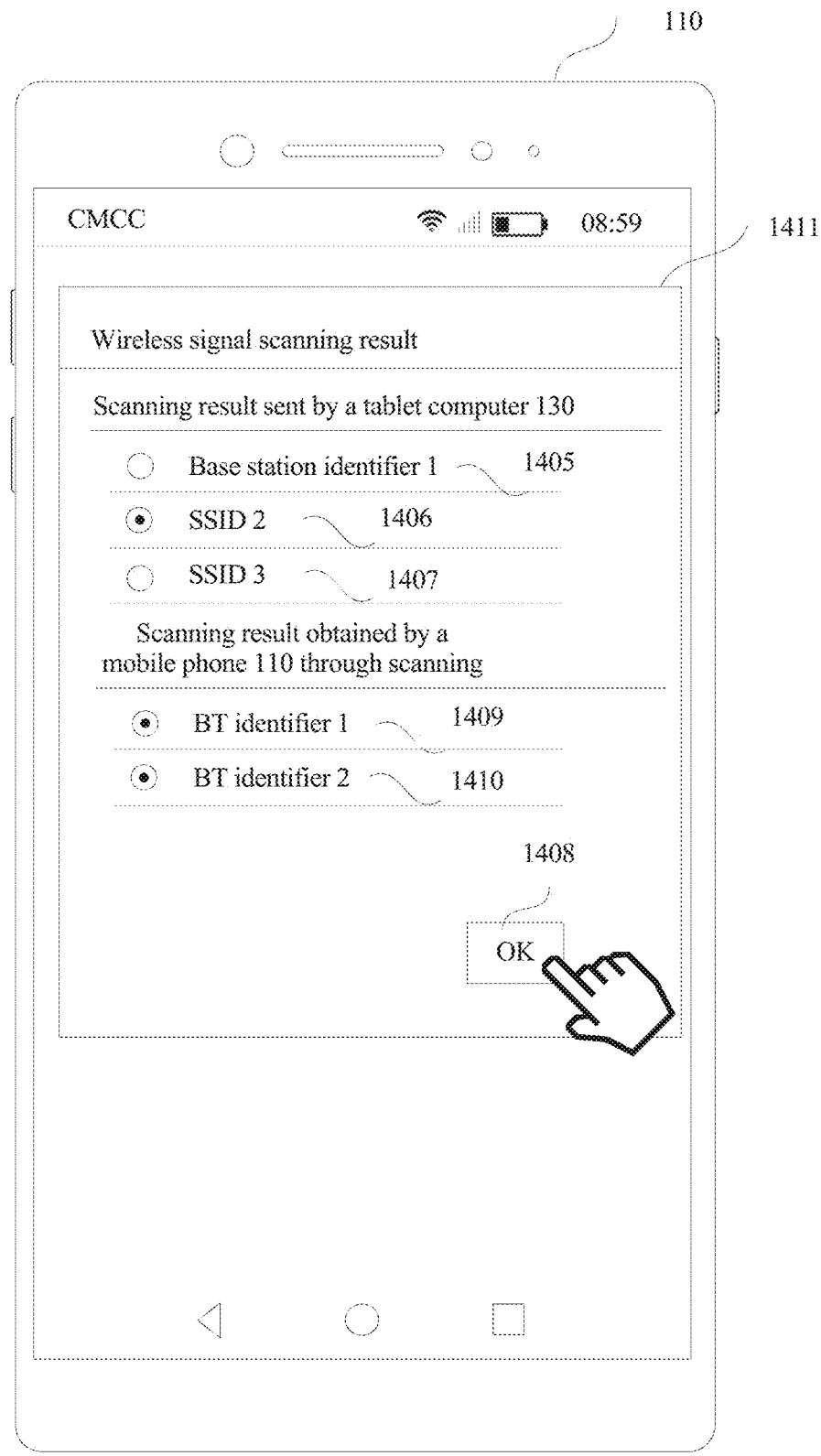

It may be understood that the "signal scanning option" 903 shown in FIG. 9-2 or FIG. 9-3, the "signal scanning control" option 905 shown in FIG. 9-5 or FIG. 9-6, and the "signal scanning option" 1003 shown in FIG. 10B or FIG. 10C may also be referred to as a "low power mode" option. The user may control, by tapping the "low power mode" option, the first device to enter or exit the low power mode. In the low power mode, the first device may stop scanning the at least one first wireless signal, and send the network scanning request to the second device, to instruct the second device to scan the at least one first wireless signal and return the scanning result to the first device.

It should be noted that the mobile phone 110 may alternatively display the wireless signal scanning result after receiving the scanning result that is of the at least one first wireless signal and that is sent by the tablet computer 130. The wireless signal scanning result includes the scanning result that is of the at least one first wireless signal and that is sent by the tablet computer 130, or the wireless signal scanning result includes the scanning result that is of the at least one first wireless signal and that is sent by the tablet computer 130 and the scanning result obtained after the mobile phone 110 scans the at least one second wireless signal. For content of a wireless signal scanning result interface displayed by the mobile phone 110, refer to the wireless signal scanning result interface displayed by the smartwatch 200. Details are not described again in this embodiment of the present invention.

The at least one first wireless signal may include at least one of a wireless signal such as a 2G signal, a 3G signal, or an LTE signal transmitted by a base station, a Wi-Fi signal transmitted by a Wi-Fi hotspot, and a Bluetooth signal transmitted by the Bluetooth device.

Optionally, in a third application scenario of this embodiment of the present invention, the first device may display a first interface in response to user input or when remaining power of the first device is lower than a first preset threshold. The first interface is a display interface of a first application, and the first application may be used to control the first device to perform S602 or S702.

For example, in the third application scenario, S701 may be replaced with S1101a and S1102 or S1101b and S1102. For example, as shown in FIG. 11, S701 shown in FIG. 7 may be replaced with S1101a and S1102.

S1101a. In response to user input, the first device displays the first interface, where the first interface is the display interface of the first application, and the first interface includes a wireless control option.

For example, FIG. 1B is used as an example. It is assumed that the first device is the mobile phone 110 shown in FIG. 1B and the second device is the tablet computer 130 shown in FIG. 1B. The first application may be an application program on the mobile phone 110. The first application is used to: control the mobile phone 110 to stop scanning a wireless signal, and help the mobile phone 110 scan a wireless signal by using another device that has a short-range wireless communication connection to the mobile phone 110.

Figure 12A:
FIG. 12A and FIG. 12B are a schematic diagram 2 of an example of a display interface of a mobile phone according to an embodiment of the present invention.
Figure 12B:
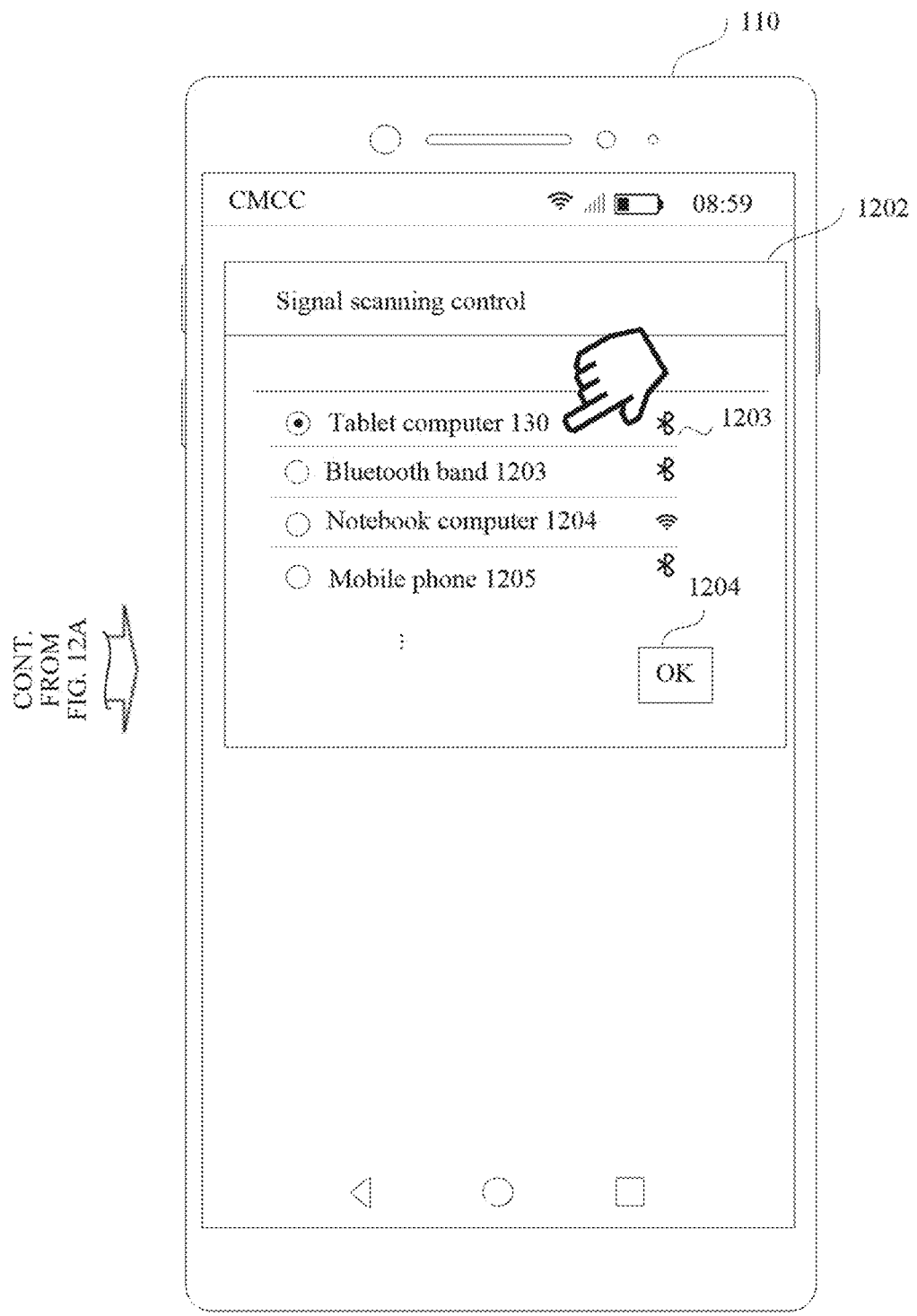

For example, the first application may be an application program corresponding to a "signal scanning control" option 1201 shown in FIG. 12A and FIG. 12B. When a finger of the user taps the "signal scanning control" option 1201 shown in FIG. 12A, the mobile phone 110 may display a "signal scanning control interface" 1202 shown in FIG. 12B, namely, the first interface. The "signal scanning control interface" 1202 shown in FIG. 12B may include a "wireless control option" 1203.

Figure 13A:
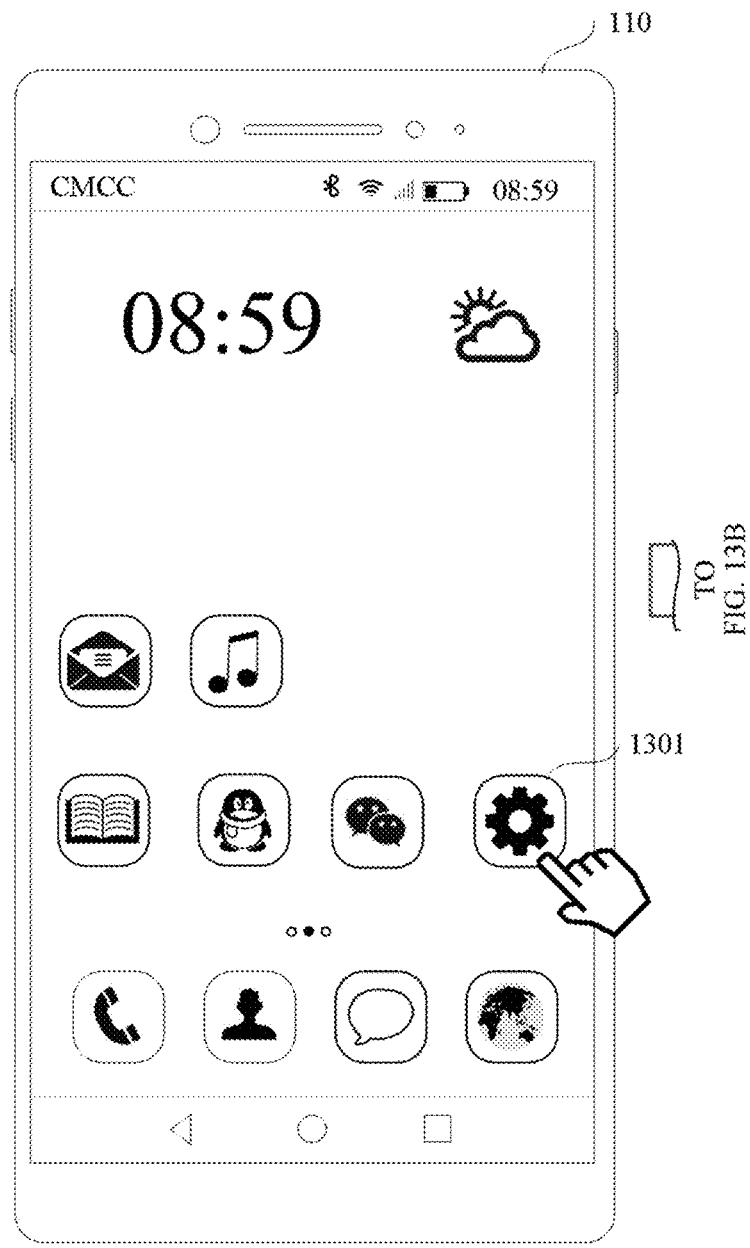
FIG. 13A to FIG. 13C are a schematic diagram 3 of an example of a display interface of a mobile phone according to an embodiment of the present invention.
Figure 13B:
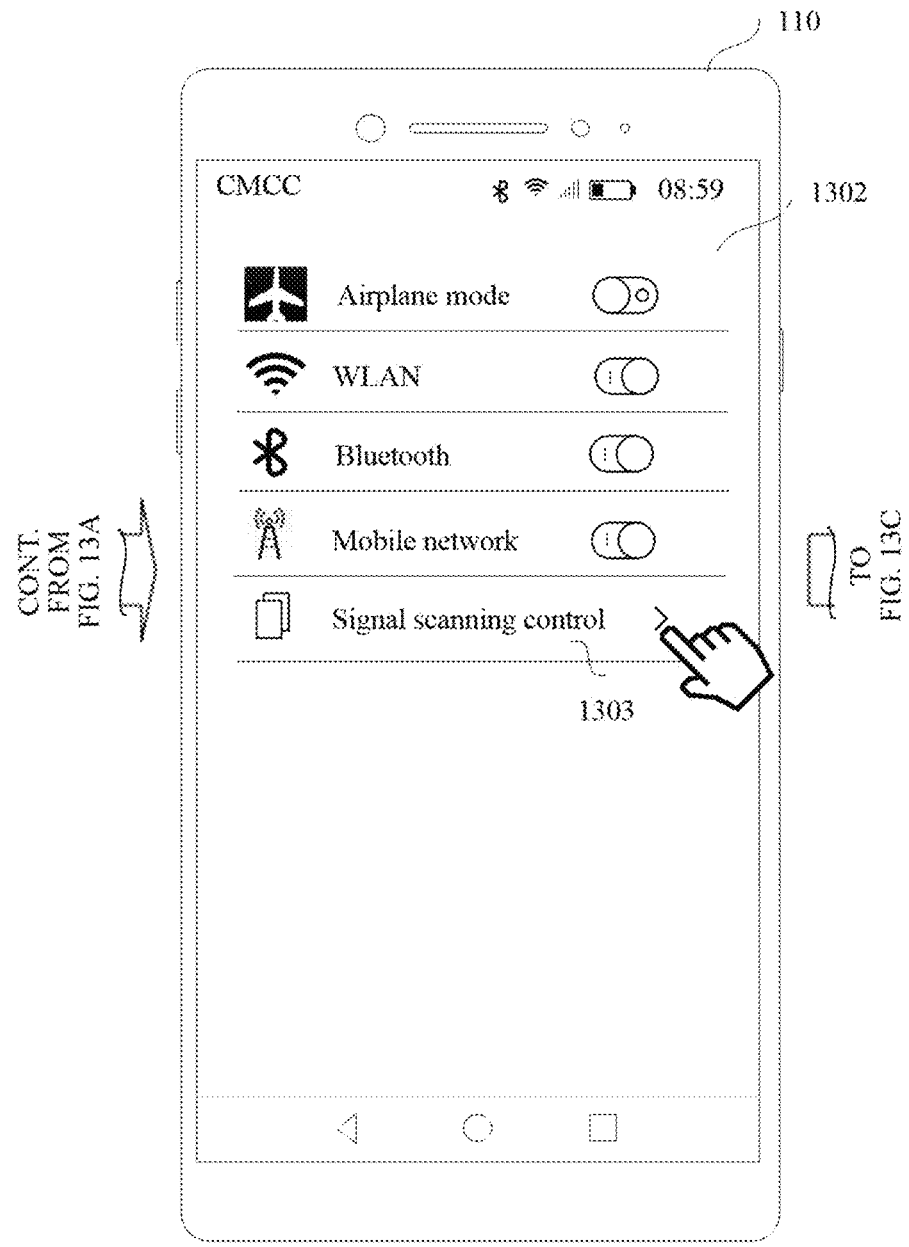

Alternatively, the first application may be a system application on the mobile phone 110. For example, when a finger of the user taps a "setting" icon 1301 shown in FIG. 13A, the mobile phone 110 may display a "setting interface" 1302 shown in FIG. 13B. The "setting interface" 1302 shown in FIG. 13B may include an "airplane mode" option, a "wireless local area network (Wireless Local Area Networks, WLAN)" option, a "Bluetooth" option, a "mobile network" option, and a "signal scanning control" option 1303. When the finger of the user taps the "signal scanning control" option 1303 shown in FIG. 13A, the mobile phone 110 may display a "signal scanning control interface" 1202 shown in FIG. 13C, namely, the first interface. The first interface may include at least one "wireless control option".

Figure 13C:
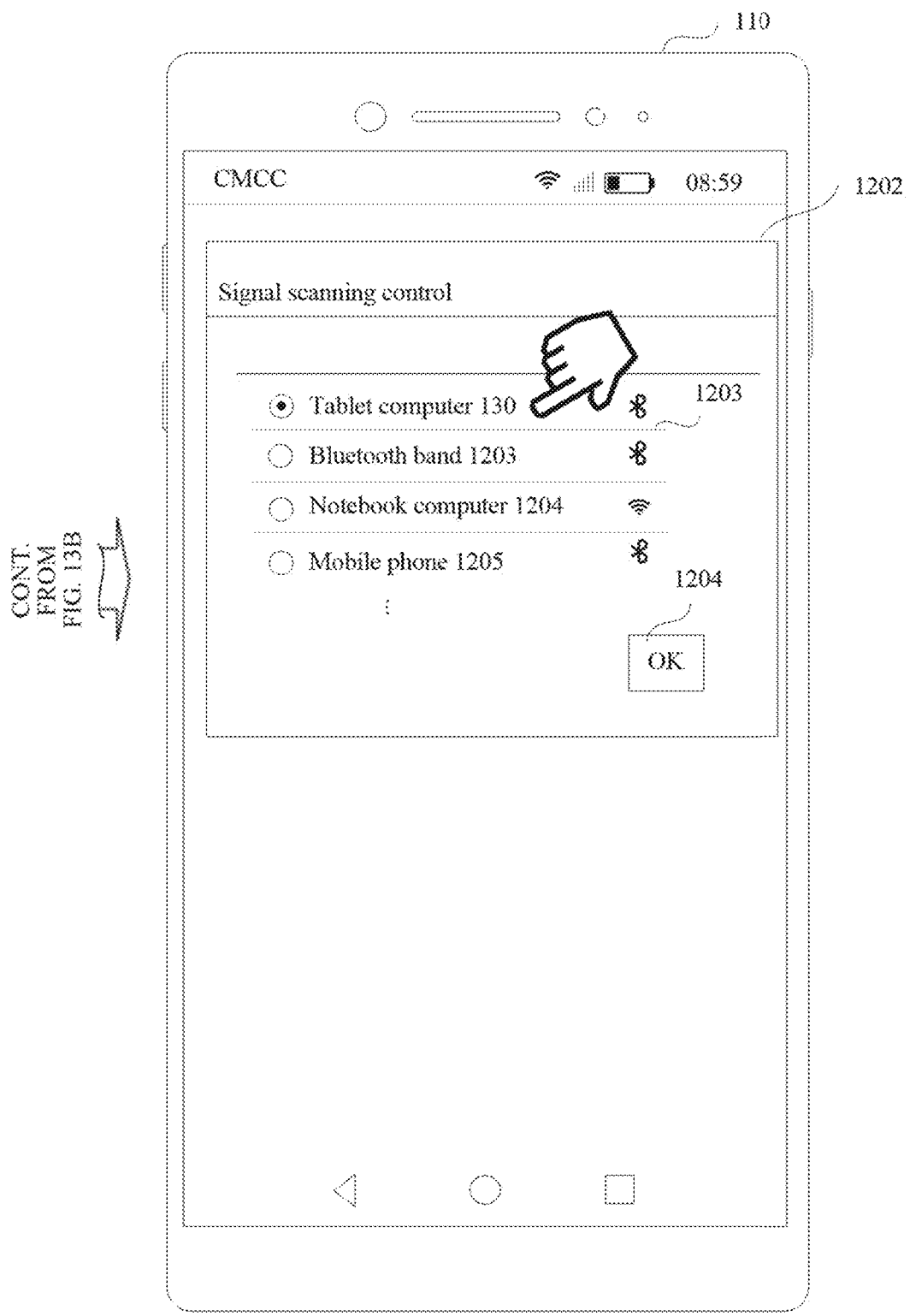

For example, as shown in FIG. 12B or FIG. 13C, the "signal scanning control interface" 1202 may include the following "wireless control options" 1203: a wireless control option of the tablet computer 130, a wireless control option of a Bluetooth band 1203, a wireless control option of a notebook computer 1204, and a wireless control option of a mobile phone 1205. As shown in FIG. 12B or FIG. 13C, when the user selects the wireless control option of the tablet computer 130, it indicates that the user selects the tablet computer 130 that has a short-range wireless communication connection (for example, a Bluetooth connection shown in FIG. 12B or FIG. 13C) with the mobile phone 110, to scan the at least one first wireless signal.

S1101b. When the remaining power of the first device is lower than the first preset threshold, the first device displays the first interface, where the first interface is the display interface of the first application, and the first interface includes a wireless control option.

When the remaining power of the first device is lower than the first preset threshold, the first interface displayed by the first device is similar to the first interface shown in FIG. 12B or FIG. 13C and the first interface subsequently described in this embodiment of the present invention. Details are not described again in this embodiment of the present invention.

S1102. In response to user input for the wireless control option in the first interface, the first device stops scanning the at least one first wireless signal.

For example, as shown in FIG. 14-1, when the user selects the wireless control option of the tablet computer 130 and the finger of the user taps an "OK" button 1204 shown in FIG. 14-1, the first device may stop scanning the at least one first wireless signal, and perform S602 (send a network scanning request to the second device, namely, the tablet computer 130).

When the user taps the "OK" button 1204 shown in FIG. 14-1, the at least one first wireless signal that the mobile phone 110 instructs the tablet computer 130 to scan may include at least one of a wireless signal such as a 2G signal, a 3G signal, or an LTE signal transmitted by a base station, a Wi-Fi signal transmitted by a Wi-Fi hotspot, and a Bluetooth signal transmitted by the Bluetooth device.

Optionally, as shown in FIG. 14-1, when the user selects the wireless control option of the tablet computer 130 and the finger of the user taps the "OK" button 1204 shown in FIG. 14-1, the first device may display a "second device scanning interface" 1401 shown in FIG. 14-3 and FIG. 14-4.

The mobile phone 110 does not limit a type of the at least one first wireless signal. Therefore, as shown in FIG. 14-2, the mobile phone 110 may instruct the tablet computer 130 to simultaneously scan a wireless signal such as a 2G signal, a 3G signal, or an LTE signal transmitted by a base station, a Wi-Fi signal transmitted by a Wi-Fi hotspot 1402, and a Bluetooth signal transmitted by a Bluetooth device 1402. After displaying, for a specific time (for example, 5 seconds), the "second device scanning interface" 1401 shown in FIG. 14-2, the mobile phone 110 may continue to return to a terminal interface shown in FIG. 14-1 or display a home screen (a screen including a plurality of application icons) of the mobile phone 100.

Optionally, after the mobile phone 110 displays, for a specific time (for example, 5 seconds), the "second device scanning interface" 1401 shown in FIG. 14-2, if the mobile phone 110 receives the scanning result that is of the at least one first wireless signal and that is sent by the table computer 130 (for example, the at least one first wireless signal scanned by the tablet computer 130 includes a signal transmitted by a base station 1, a signal transmitted by a Wi-Fi hotspot 2, a signal transmitted by a Wi-Fi hotspot 3, and a signal transmitted by a Bluetooth device 1), the mobile phone 110 may display a wireless signal scanning result interface 1404 shown in FIG. 14-3. The wireless signal scanning result interface 1404 includes an option 1405 of a "base station identifier 1" of the base station 1, an option 1406 of an "SSID 2" corresponding to the Wi-Fi hotspot 2, and an option 1407 of an "SSID 3" corresponding to the Wi-Fi hotspot 3. When the user selects the option 1405 of the "base station identifier 1" and taps an "OK" button 1408, the mobile phone 110 may send a wireless access request to the base station 1 to request to establish a wireless connection to the base station 1.

In other embodiments, the mobile phone 110 may instruct the tablet computer 130 to scan the at least one first wireless signal, and may further scan the at least one second wireless signal. In this case, the mobile phone 110 may display a wireless signal scanning result interface 1411 shown in FIG. 14-4. The wireless signal scanning result interface 1411 may include an option 1405 of a "base station identifier 1" of a base station 1, an option 1406 of an "SSID 2" corresponding to a Wi-Fi hotspot 2, and an option 1407 of an "SSID 3" corresponding to a Wi-Fi hotspot 3, and may further include an option 914 of a "Bluetooth identifier 1" of a Bluetooth device 1 and an option 915 of a "Bluetooth identifier 2" of a Bluetooth device 2. When the user selects the option 1406 of the "SSID 2", the option 1409 of the "BT identifier 1", and the option 1410 of the "BT identifier 2" and taps an "OK" button 1408, the mobile phone 110 may send a wireless access request to the Wi-Fi hotspot 2 to request to access a Wi-Fi network corresponding to the Wi-Fi hotspot 2, and may send a wireless access request to each of the Bluetooth device 1 and the Bluetooth device 2 to request to establish a Bluetooth connection to each of the Bluetooth device 1 and the Bluetooth device 2.

For example, for detailed content of the network scanning request, refer to the following Table 1:

TABLE 1

| Network scanning request | |
| --- | --- |
| Identifier of the second device | Type indication information |
| FF | FF |

In this embodiment of the present invention, the identifier of the second device may be any one piece of information that can uniquely identify the second device, for example, an internet protocol (Internet Protocol, IP) address or a media access control (Media Access Control, MAC) address of the second device. The identifier "FF" of the second device indicates that the network scanning request is sent to all wireless devices that have a short-range wireless communication connection to the first device. The first device may instruct all the wireless devices (namely, second devices), that have a short-range wireless communication connection to the first device, to assist the first device in scanning a wireless signal. The "type indication information" FF may be used to instruct the second device to scan all types of wireless signals, for example, a wireless signal transmitted by a base station, a Wi-Fi signal, and a Bluetooth signal.

For example, FIG. 12B is used as an example. The first device is the mobile phone 110, and the user selects the tablet computer 130 as the second device. In this case, for detailed content of the network scanning request, refer to the following Table 2.

TABLE 2

| Network scanning request | |
| --- | --- |
| Identifier of the second device | Type indication information |
| Identifier of the tablet computer 130 | FF |

The "type indication information" FF may be used to instruct the tablet computer 130 to scan all types of wireless signals, for example, a wireless signal transmitted by a base station, a Wi-Fi signal, and a Bluetooth signal. To be specific, as shown in FIG. 14-3 and FIG. 14-4, the tablet computer 130 may scan wireless signals such as a wireless signal transmitted by a base station, a Wi-Fi signal, and a Bluetooth signal.

Figure 15A:
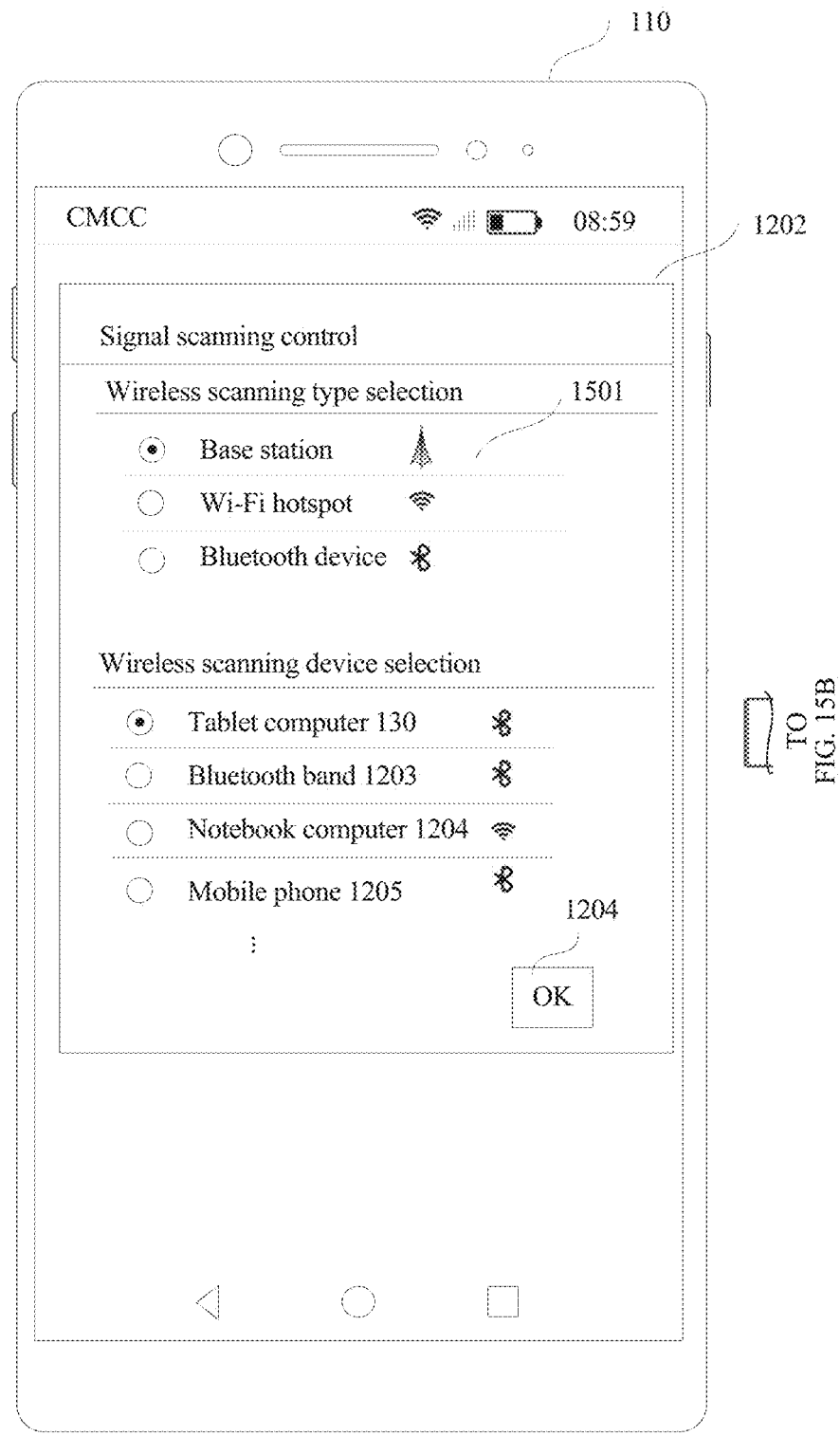
FIG. 15A and FIG. 15B are a schematic diagram 6 of an example of a display interface of a mobile phone according to an embodiment of the present invention.
Figure 15B:
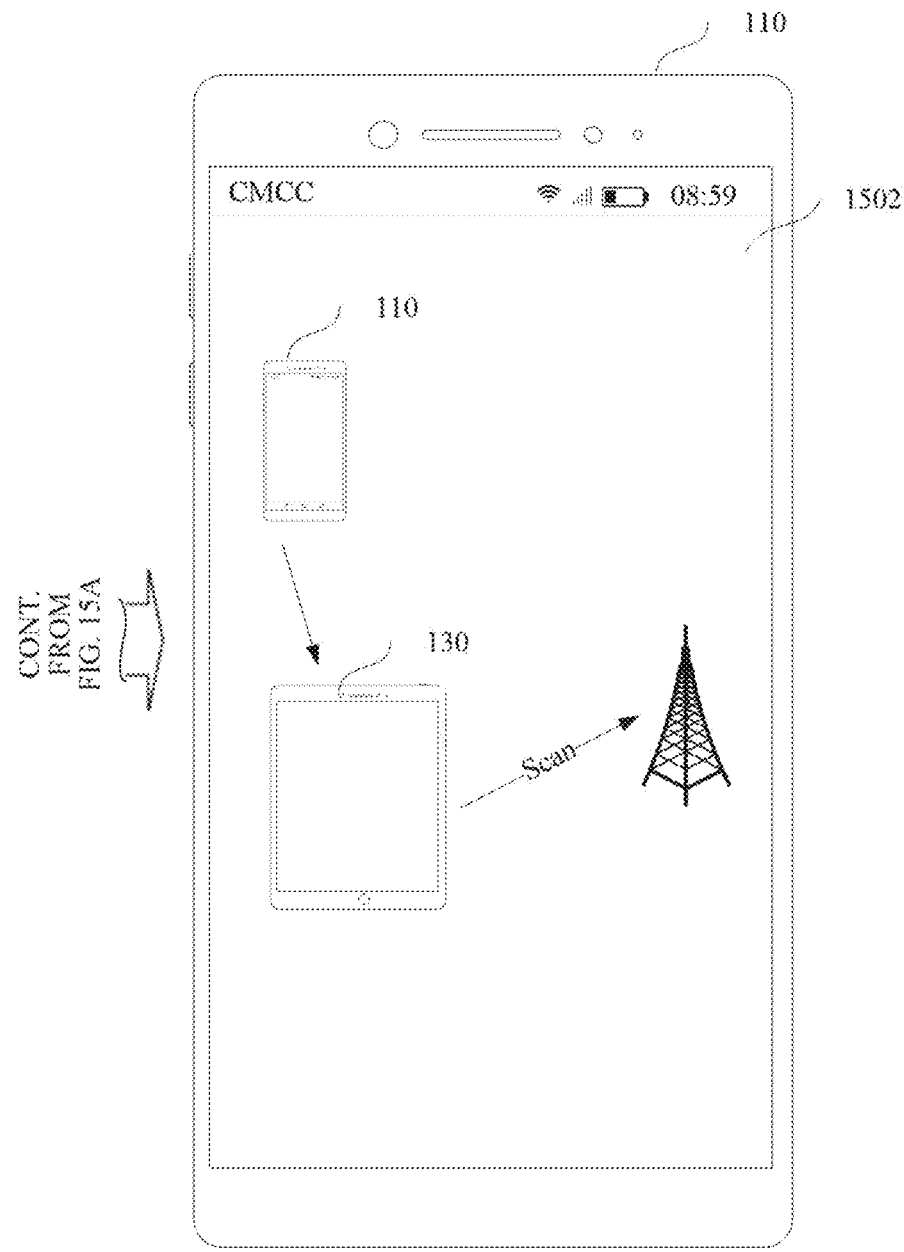

Further, in some embodiments, the first interface may further include a type indication option, and the type indication option is used to select a type of a wireless device that transmits the at least one first wireless signal. For example, with reference to the application scenario shown in FIG. 1B, as shown in FIG. 15A and FIG. 15B, in addition to the "wireless control option" 1203, the "signal scanning control interface" 1202 shown in FIG. 12B or 13C may further include at least two "type indication options" 1501. The "signal scanning control interface" 1202 shown in FIG. 15A and FIG. 15B may include the following "type indication options" 1501: a base station, a Wi-Fi hotspot, and a Bluetooth device. As shown in FIG. 15A and FIG. 15B, the user selects a "type indication option" 1501 corresponding to the base station, and the second device selected by the user is the "tablet computer 130". Therefore, after the user taps an "OK" button 1204 shown in FIG. 15A and FIG. 15B, as shown in FIG. 1B, the mobile phone 110 (namely, the first device) may send a network scanning request to the tablet computer 130 to request the tablet computer 130 to scan a wireless signal transmitted by the base station 120.

Optionally, after the user taps the "OK" button 1204 shown in FIG. 15A and FIG. 15B, the mobile phone 110 may further display a "second device scanning interface" 1502 shown in FIG. 15B.

Optionally, after the mobile phone 110 displays, for a specific time, the "second device scanning interface" 1502 shown in FIG. 15B, when the mobile phone 110 receives a wireless signal scanning result sent by the tablet computer 130, the mobile phone 110 may display the wireless signal scanning result interface shown in FIG. 14-3 and FIG. 14-4. Alternatively, the mobile phone 110 may not display the "second device scanning interface" 1502 shown in FIG. 15B, and when the mobile phone 110 receives a wireless signal scanning result sent by the tablet computer 130, the mobile phone 110 may display the wireless signal scanning result interface shown in FIG. 14-3 and FIG. 14-4.

Correspondingly, the network scanning request may include type indication information of the wireless device that transmits the at least one first wireless signal, and the type indication information is used to indicate that the wireless device that sends the at least one first wireless signal may be at least one of a Wi-Fi hotspot, a Bluetooth device, or a base station.

For example, FIG. 15A is used as an example. The first device is the mobile phone 110, the user selects the tablet computer 130 as the second device, and the "type indication information" indicates that the wireless device that sends the at least one first wireless signal may be a base station. In this case, for detailed content of the network scanning request, refer to the following Table 3.

TABLE 3

| Network scanning request | |
|---|---|
| Identifier of the second device | Type indication information |
| Identifier of the tablet computer 130 | 00 |

The "type indication information" 00 may be used to instruct the tablet computer 130 to scan a wireless signal transmitted by a base station. To be specific, as shown in FIG. 15B, the tablet computer 130 may scan the wireless signal transmitted by the base station.

The first device may instruct the second device to scan one or more of specific wireless signals, for example, the first wireless signal such as a 2G signal, a 3G signal, or an LTE signal transmitted by a base station, a Wi-Fi signal transmitted by a Wi-Fi hotspot, and a Bluetooth signal transmitted by a Bluetooth device.

Figures 1, 16:
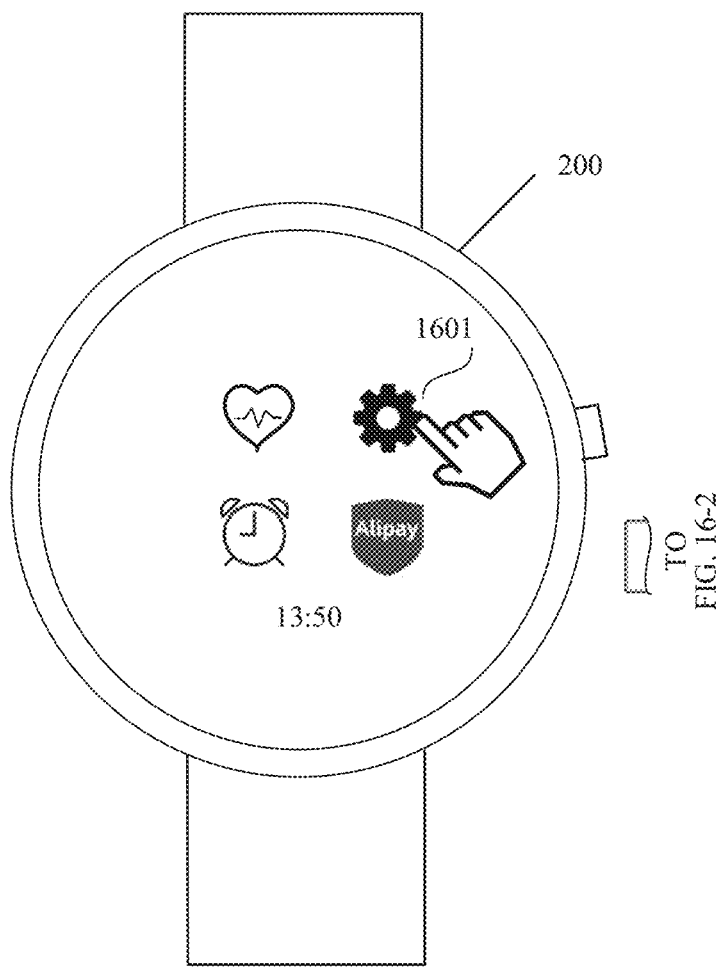
Figures 2, 16:
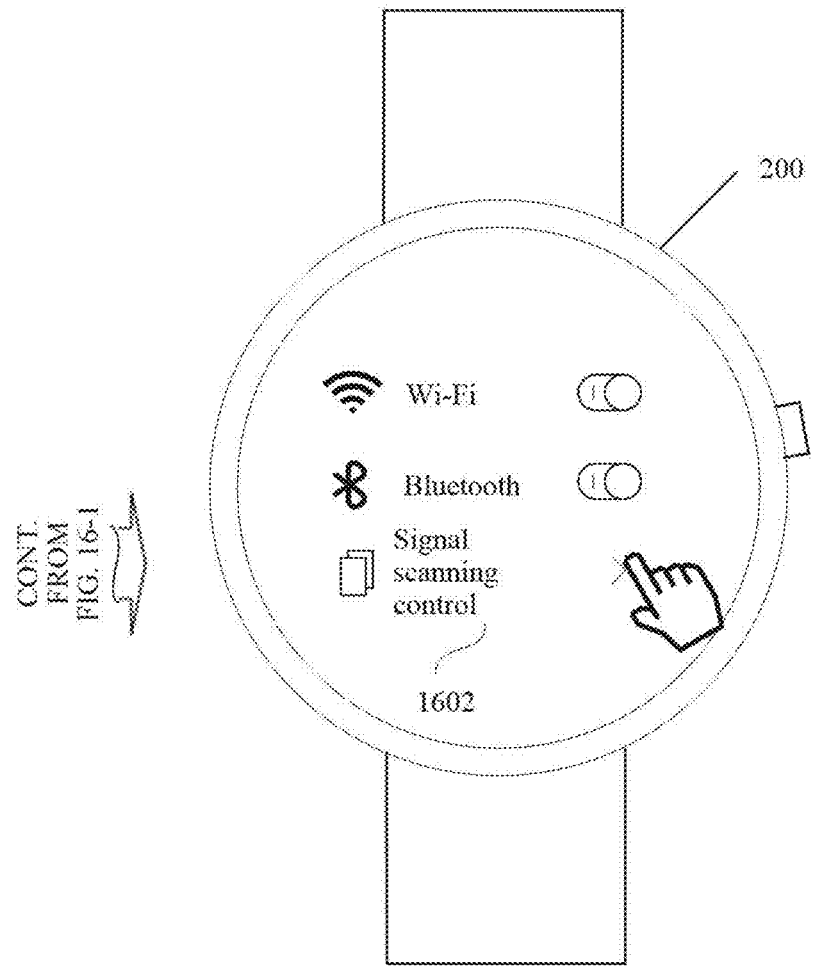
Figures 3, 16:
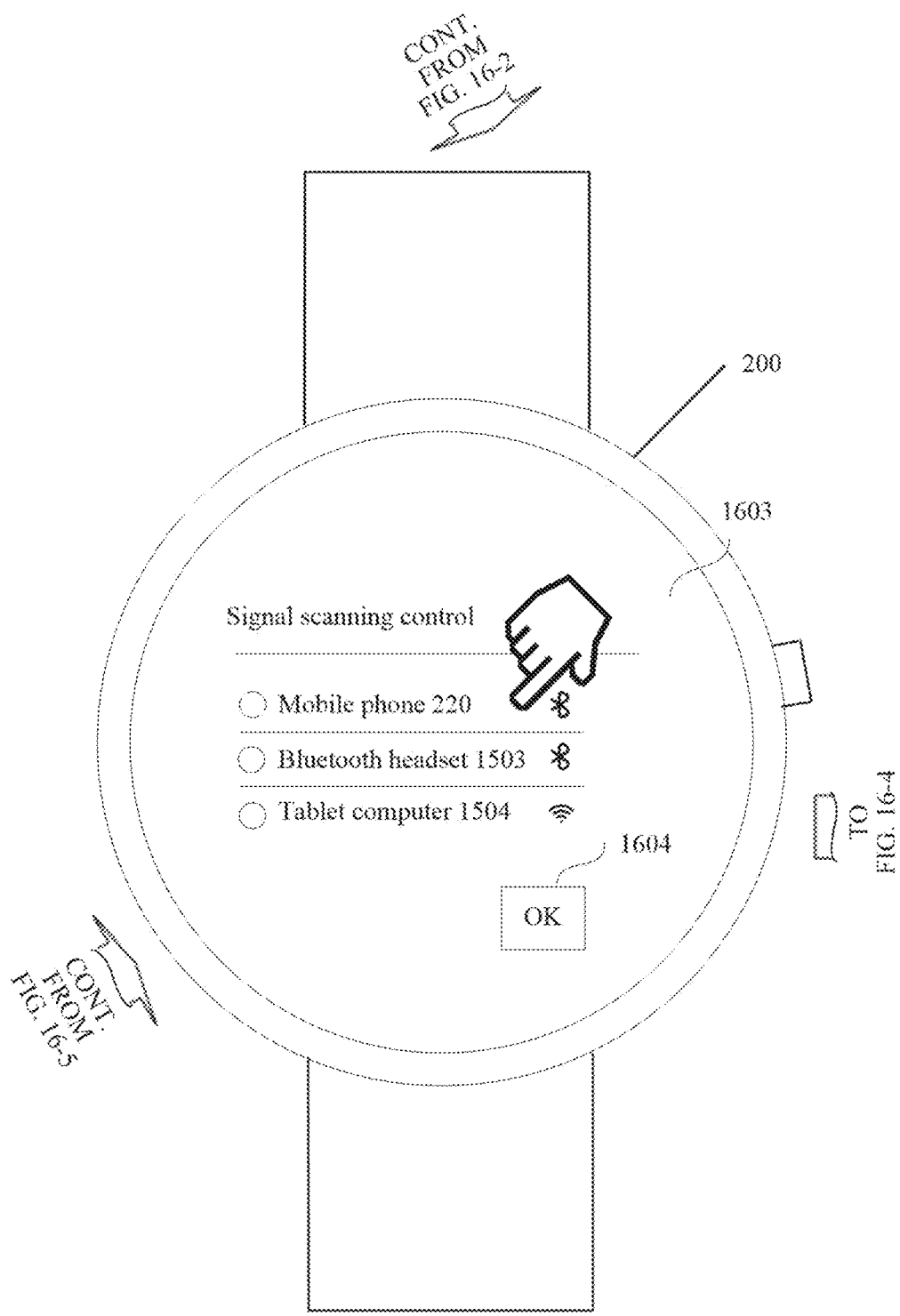
Figures 4, 16:
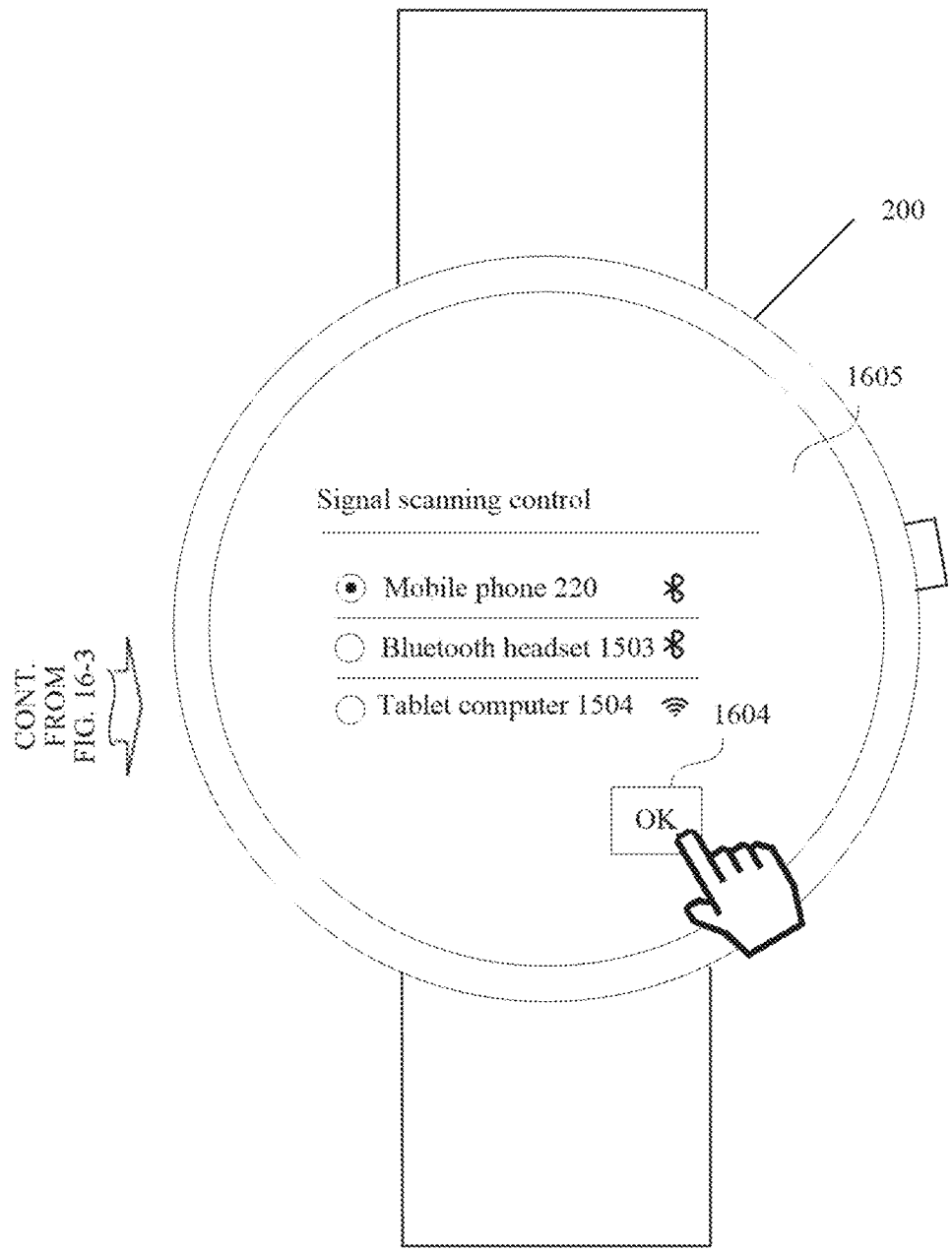
Figures 5, 16:
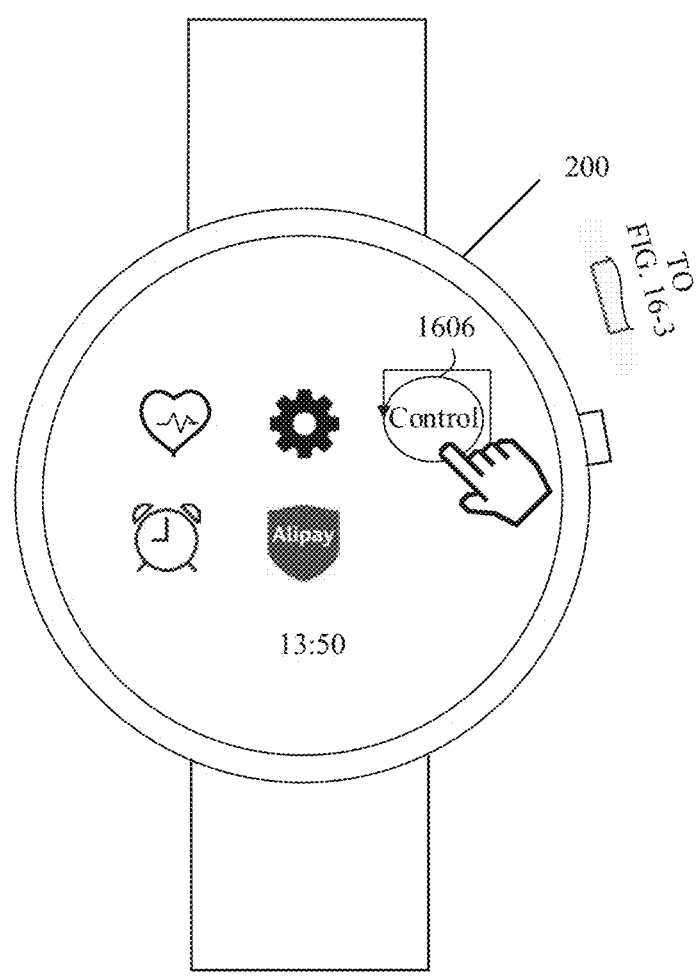

For example, FIG. 2B is used as an example. It is assumed that the first device is the smartwatch 200 shown in FIG. 2B and the second device is the mobile phone 220 shown in FIG. 2B. For example, when a finger of the user taps a "signal scanning control" option 1601 shown in FIG. 16-1, a "signal scanning control interface" that is displayed by the smartwatch 200 and that is shown in FIG. 16-2 includes a "signal scanning control" option 1602. When the finger of the user taps the "signal scanning control" option 1602 shown in FIG. 16-2, assuming that the smartwatch 200 currently establishes a Bluetooth connection to the mobile phone 220, the smartwatch 200 currently establishes a Bluetooth connection to a Bluetooth headset 1503, and the smartwatch 200 currently establishes a Wi-Fi connection to a tablet computer 1504, the smartwatch 200 may display a display interface 1603 (namely, the first interface) shown in FIG. 16-3. When the finger of the user taps a type indication option corresponding to the mobile phone 220 shown in FIG. 16-3, the terminal may display a display interface 1605 shown in FIG. 16-4. When the finger of the user taps an "OK" button 1604 shown in FIG. 16-4, as shown in FIG. 2B, the smartwatch 200 (namely, the first device) may send a network scanning request to the mobile phone 220 to request the mobile phone 220 to scan the at least one first wireless signal. Optionally, when the finger of the user taps the "OK" button 1604 shown in FIG. 16-4, the smartwatch 200 may further display a display interface shown in FIG. 16B.

Figures 1, 17:
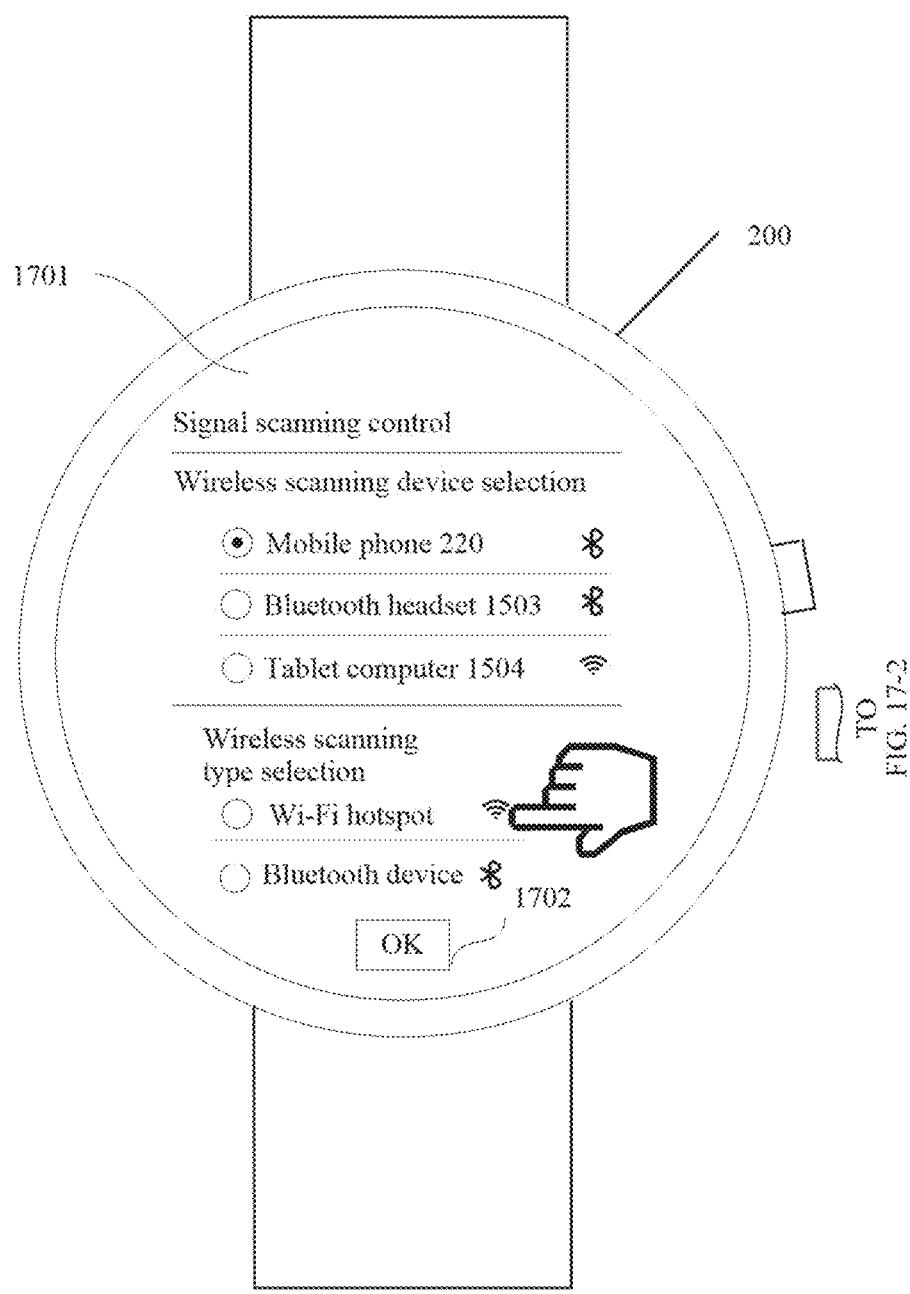
Figures 2, 17:
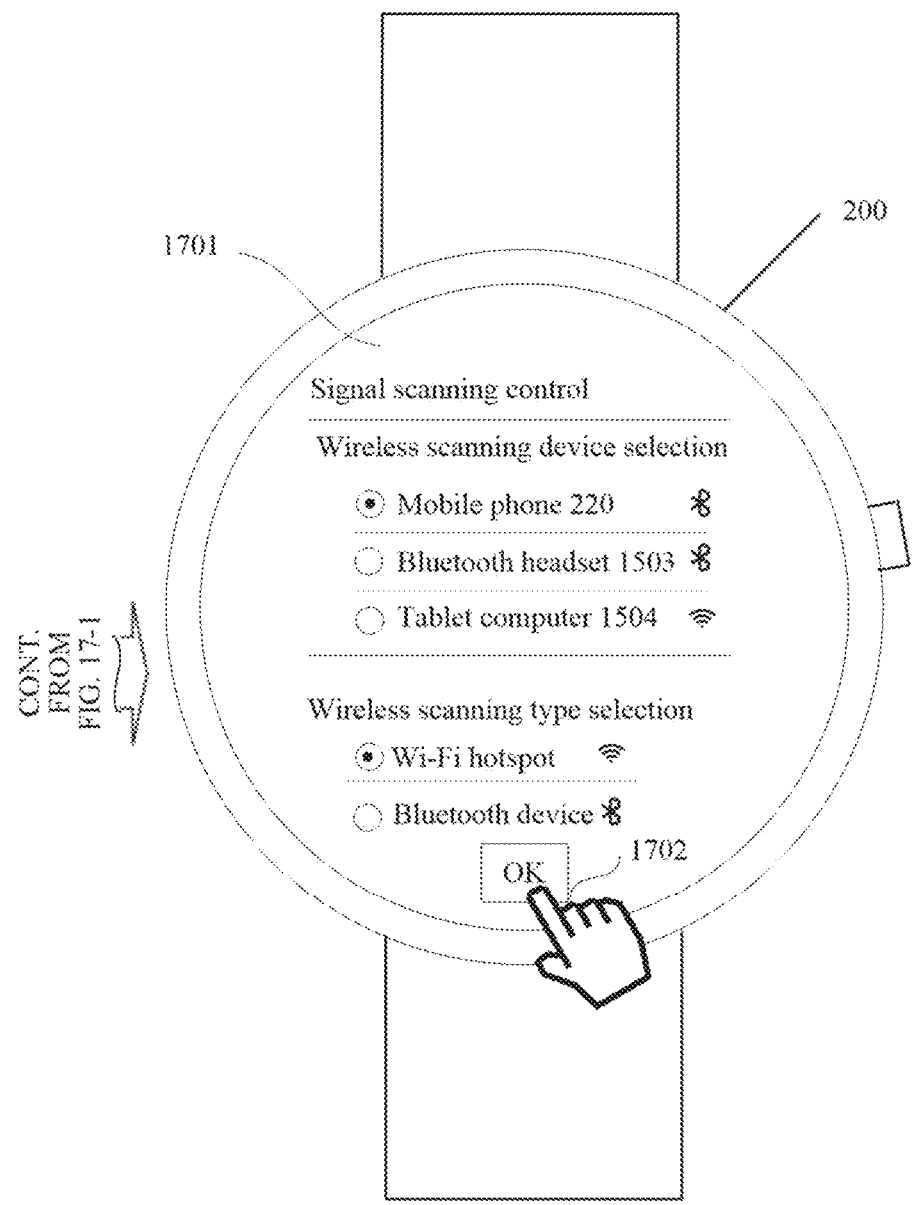
Figures 3, 17:
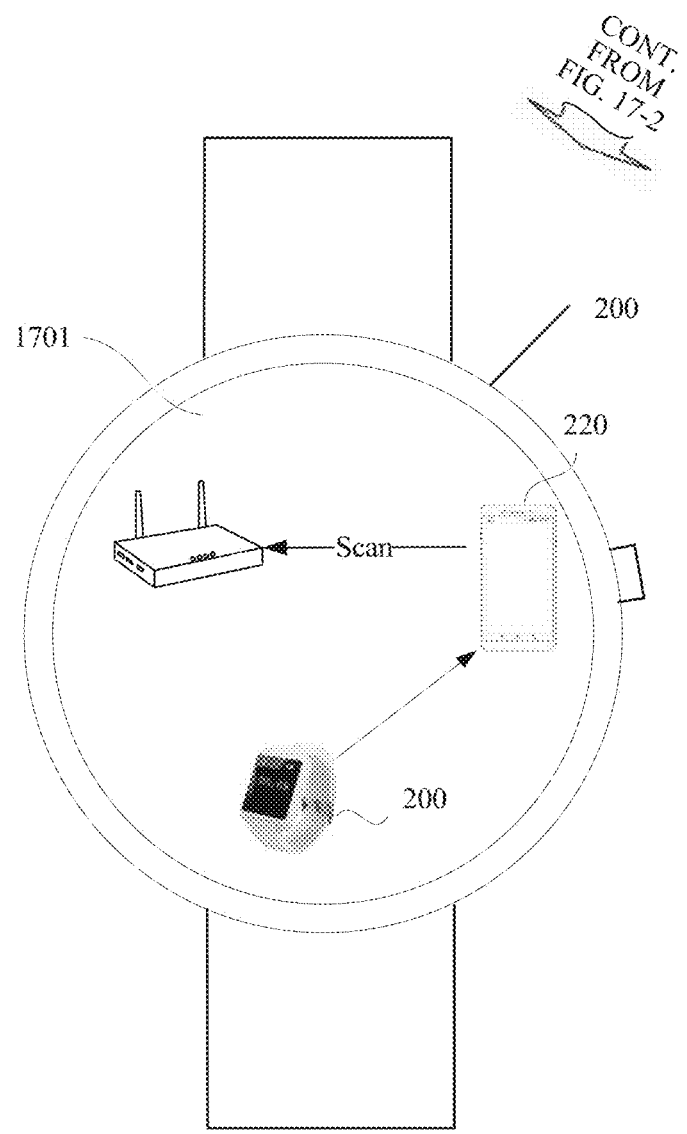

Optionally, the first interface may further include at least one "type indication option". With reference to FIG. 16-4, as shown in FIG. 17-1, the first interface may include a "type indication option" corresponding to a "Wi-Fi hotspot" and a "type indication option" corresponding to a "Bluetooth device". As shown in FIG. 17-1, when the user taps the "type indication option" corresponding to the "Wi-Fi hotspot", the smartwatch 200 may display a display interface shown in FIG. 17-2. When the user taps an "OK" button 1702 in the display interface shown in FIG. 17-2, the smartwatch 200 may send a network scanning request to the mobile phone 220 to request the mobile phone 220 to scan a wireless signal transmitted by the Wi-Fi hotspot.

Optionally, when the user taps the "OK" button 1702 in the display interface shown in FIG. 17-2, the smartwatch 200 may display a display interface shown in FIG. 17-3.

Figure 16B:
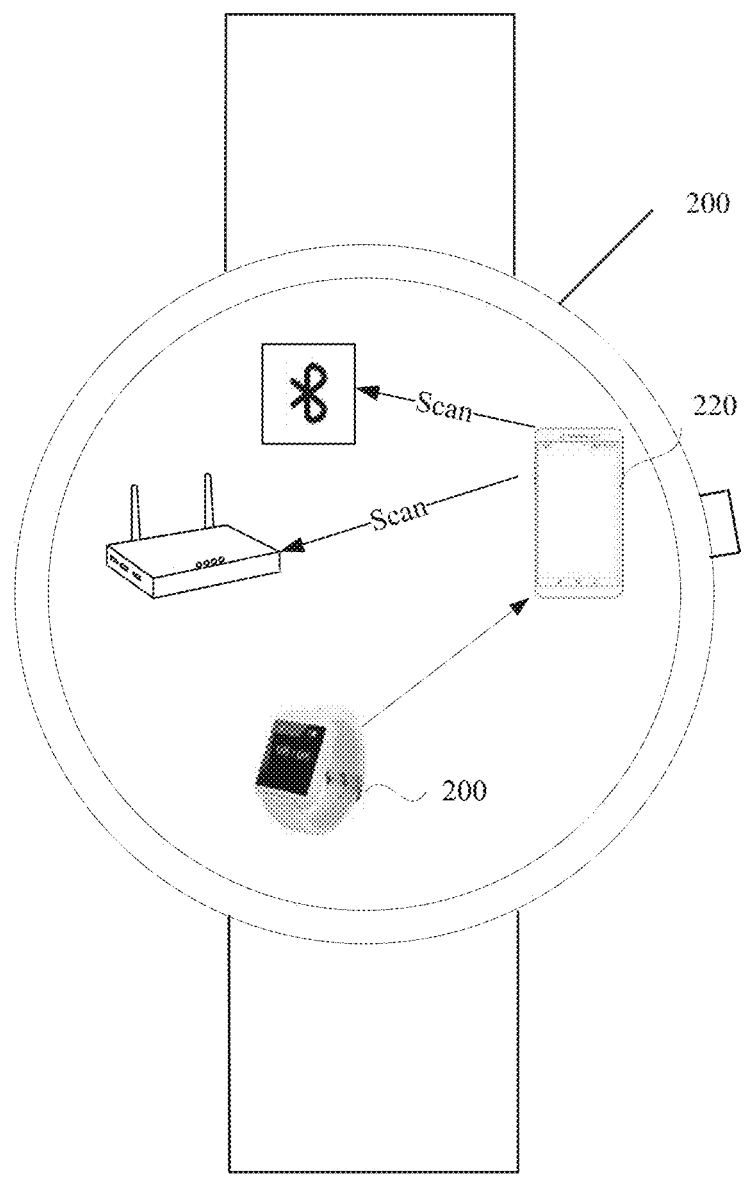
FIG. 16B is a schematic diagram 7 of an example of a display interface of a smart band according to an embodiment of the present invention.

Optionally, after the smartwatch 200 displays, for a specific time, the display interface shown in FIG. 16B or the display interface shown in FIG. 17-3, when the smartwatch 200 receives a wireless signal scanning result sent by the mobile phone 220, the smartwatch 200 may display the wireless signal scanning result interface shown in FIG. 9D or FIG. 9-10 to FIG. 9-12. Alternatively, the smartwatch 200 may not display the display interface shown in FIG. 16B or FIG. 17-3.

For example, FIG. 17-2 is used as an example. The first device is the smartwatch 200, the user selects the mobile phone 220 as the second device, and the "type indication information" indicates that the at least one first wireless signal is a Wi-Fi signal. In this case, for detailed content of the network scanning request, refer to the following Table 4.

TABLE 4

| Network scanning request | |
|---|---|
| Identifier of the second device | Type indication information |
| Identifier of the mobile phone 220 | 01 |

The "type indication information" 01 may be used to indicate that the at least one first wireless signal is a Wi-Fi signal. To be specific, as shown in FIG. 17-3, the mobile phone 220 may scan a Wi-Fi signal transmitted by a wireless router.

Further, in some embodiments, the first interface may further include a signal range option. The signal range option is used to select a frequency band range of the at least one first wireless signal.

When the type indication information indicates that the wireless device that transmits the at least one first wireless signal is a base station, the signal range indication information is used to indicate a network type of a network corresponding to the at least one first wireless signal. The network type includes at least a 2G network, a 3G network, and an LTE network (which may be considered as a 4G network).

Figure 18A:
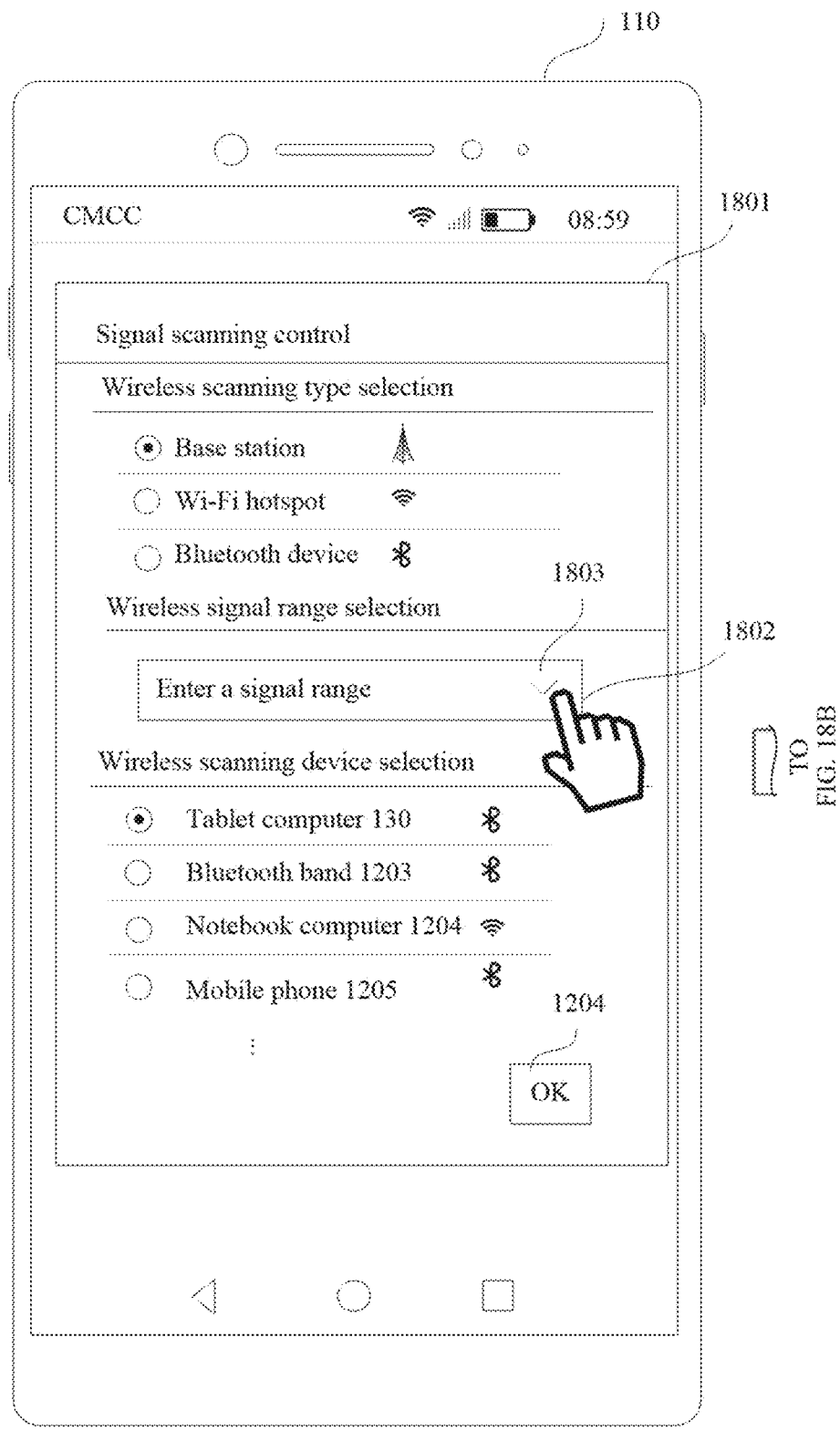
FIG. 18A to FIG. 18C are a schematic diagram 7 of an example of a display interface of a mobile phone according to an embodiment of the present invention.
Figure 18B:
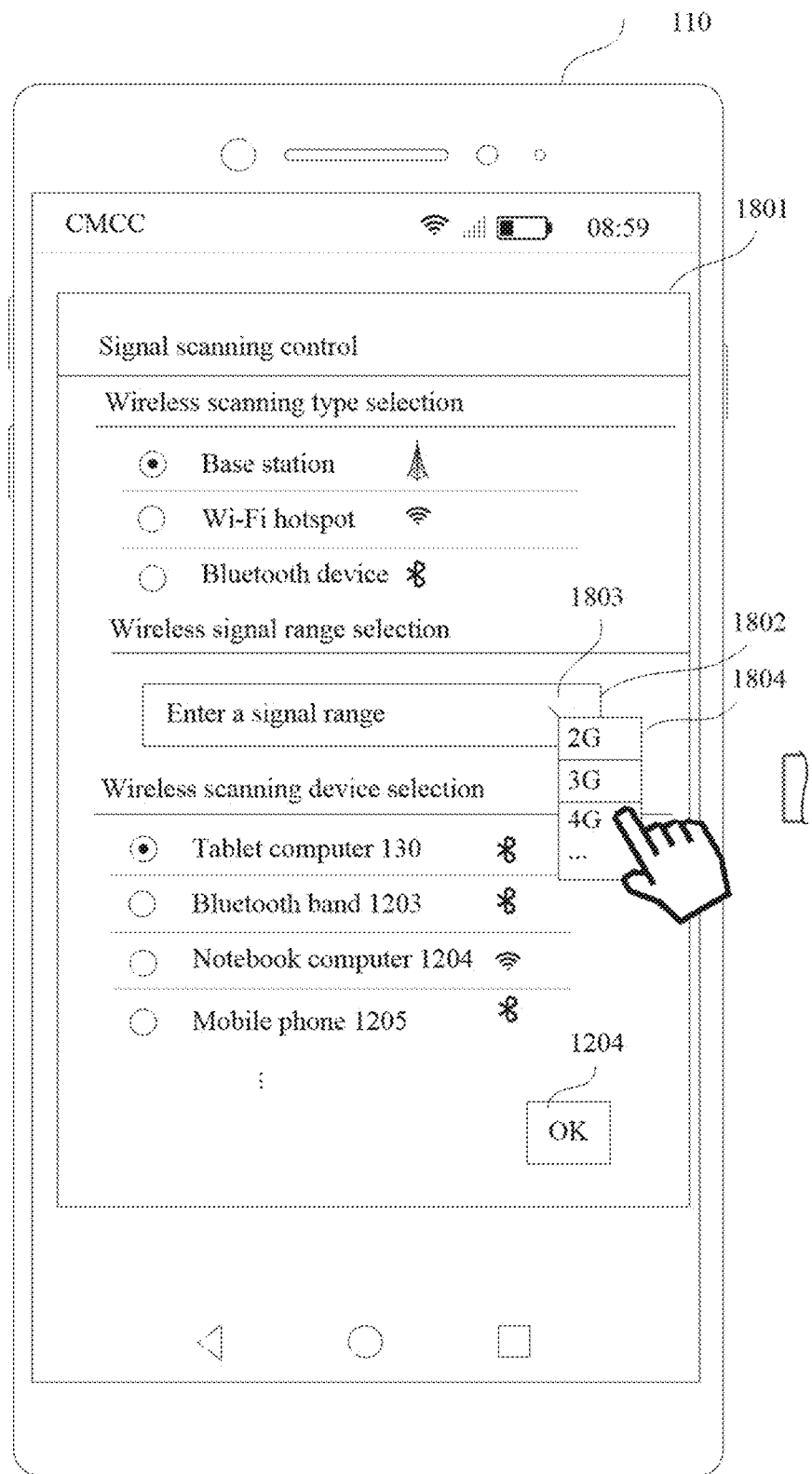

For example, as shown in FIG. 18A, the first interface may further include a "range indication option" 1802, and the "range indication option" 1802 is used to enter the foregoing signal range indication information. Certainly, the user may select the signal range indication information from a drop-down window by tapping a drop-down option 1803 shown in FIG. 18A. For example, as shown in FIG. 18A or FIG. 18B, the user selects a "type indication option" corresponding to a "base station". Therefore, when the user taps the drop-down option 1803 shown in FIG. 18A, the mobile phone 110 may display a drop-down window 1804 shown in FIG. 18B. The drop-down window 1804 shown in FIG. 18B may include a network type of a network corresponding to a wireless signal that may be provided by the base station, and the network type includes at least a 2G network, a 3G network, and an LTE network (which may be considered as a 4G network). When the user taps a 4G identifier in the drop-down window 1804 shown in FIG. 18B, the mobile phone 110 may display a display interface shown in FIG. 18C. When the user taps an "OK" button shown in FIG. 18C, the mobile phone 110 may send a network scanning request to the tablet computer 130 to instruct the tablet computer 130 to scan a 4G wireless signal transmitted by the base station.

Figure 18C:
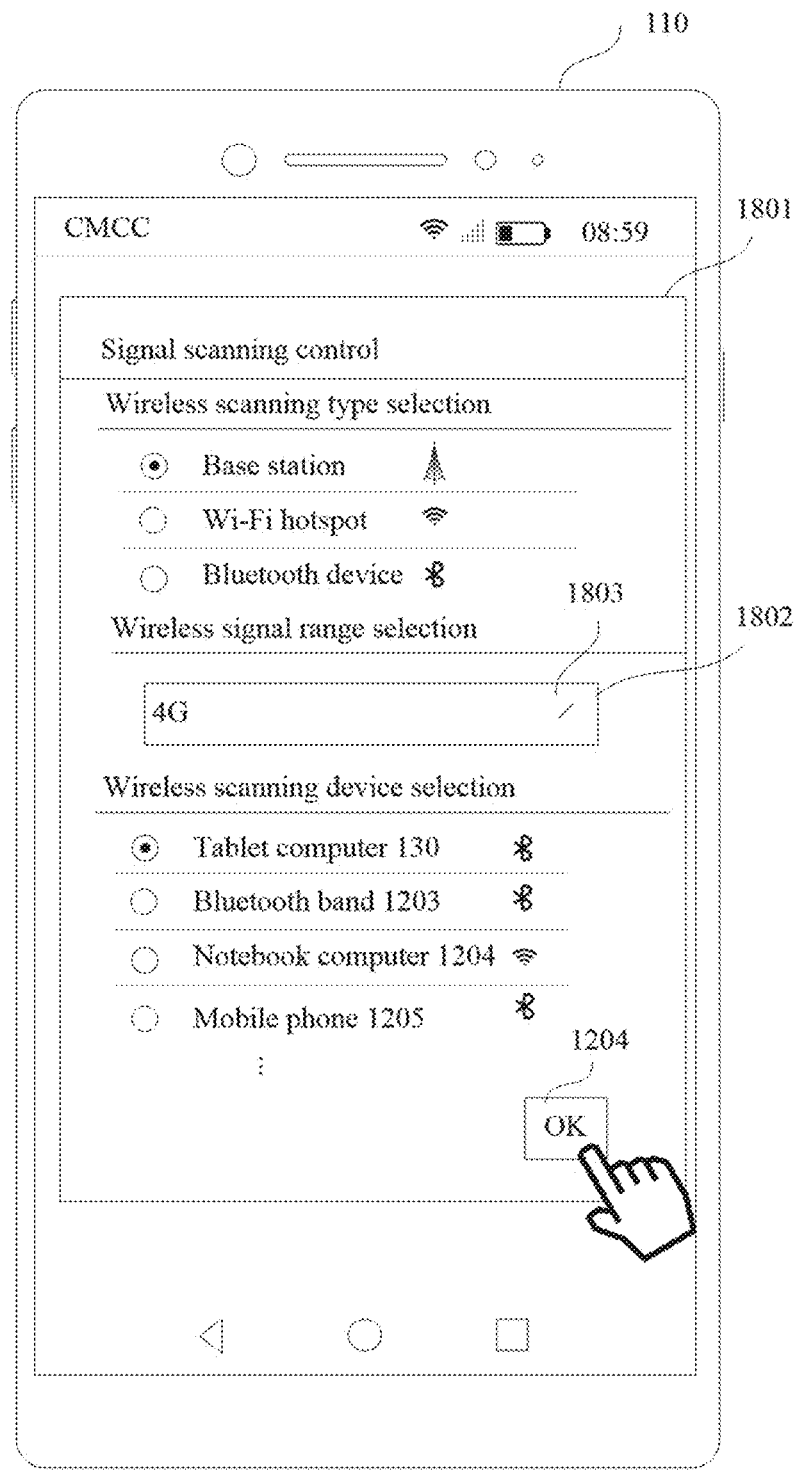

For example, FIG. 18C is used as an example. The first device is the mobile phone 110, the user selects the tablet computer 130 as the second device, the "type indication information" indicates that the at least one first wireless signal is a wireless signal transmitted by a base station, and the "signal range indication information" instructs the second device to scan a 4G signal transmitted by the base station. In this case, for detailed content of the network scanning request, refer to the following Table 5.

TABLE 5

| | Network scanning request | |
|---|---|---|
| Identifier of the second device | Type indication information | Signal range indication information |
| Identifier of the tablet computer 130 | 00 | 10 |

The "type indication information" 00 may be used to indicate that the at least one first wireless signal is a wireless signal transmitted by the base station, and the "signal range indication information" 10 may be used to instruct the second device to scan the 4G signal transmitted by the base station. To be specific, as shown in FIG. 17-3, the mobile phone 220 may scan a Wi-Fi signal transmitted by a wireless router. When the "signal range indication information" is 00, it may be used to instruct the second device to scan a 2G signal transmitted by the base station. When the "signal range indication information" is 01, it may be used to instruct the second device to scan a 3G signal transmitted by the base station.

In this embodiment of the present invention, values of the "type indication information" and the "signal range indication information" are provided only by using an example, and specific content of the "type indication information" and the "signal range indication information" includes but is not limited to the content in the foregoing example.

For example, when the type indication information indicates that the wireless device is a Wi-Fi hotspot, the signal range indication information is used to indicate the frequency band range of the at least one first wireless signal.

Figure 19A:
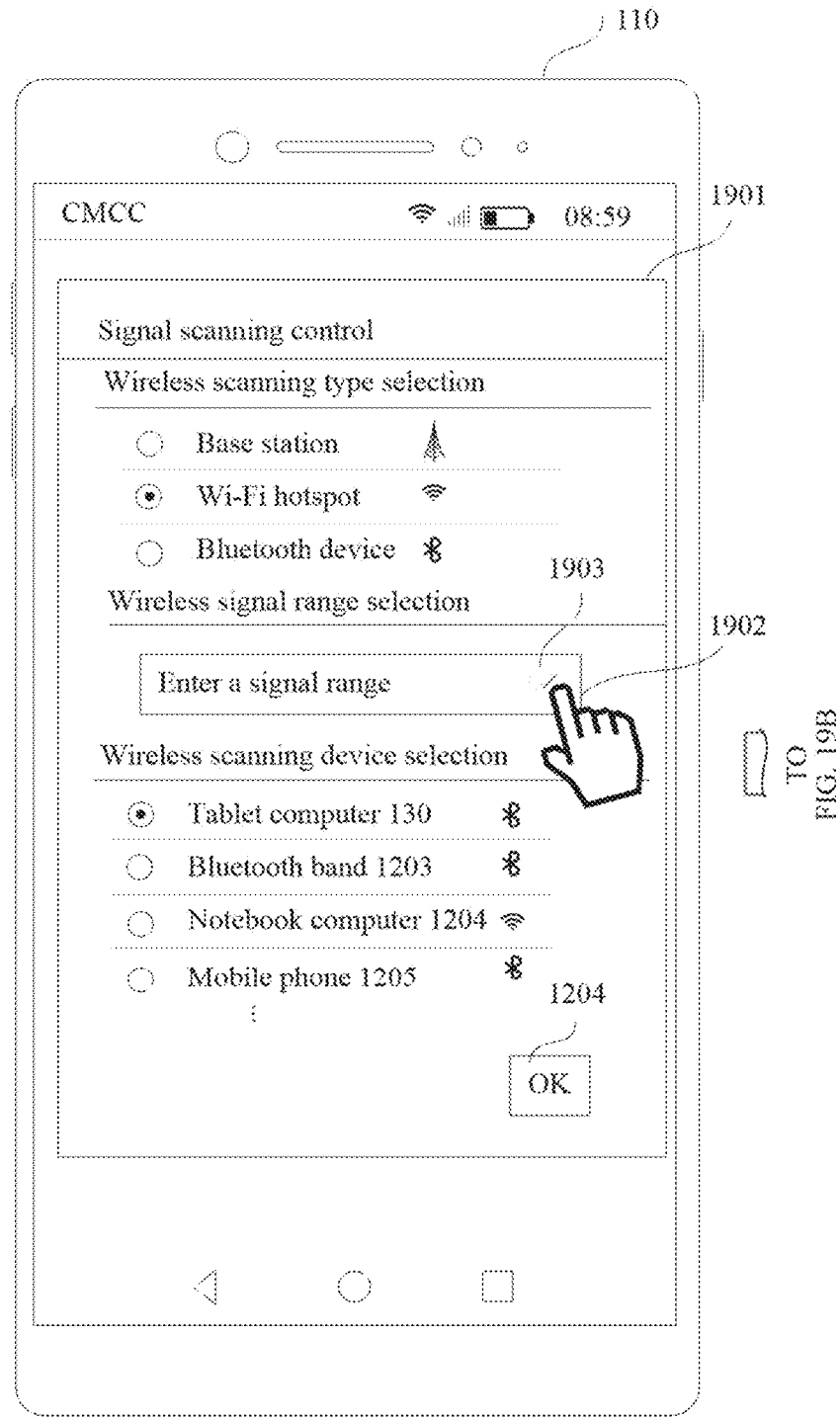
FIG. 19A to FIG. 19C are a schematic diagram 8 of an example of a display interface of a mobile phone according to an embodiment of the present invention.
Figure 19B:
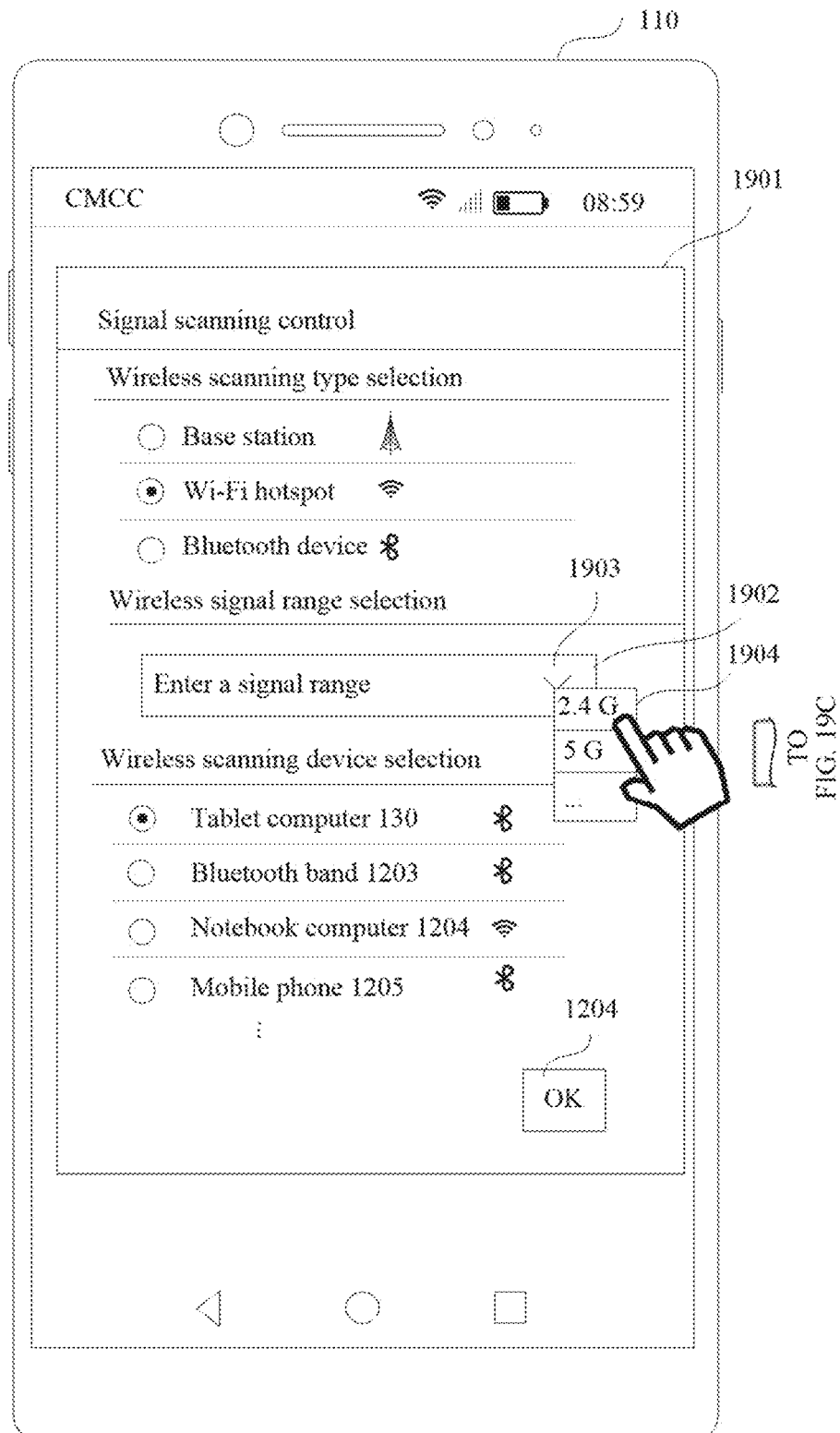

For example, as shown in FIG. 19A, the first interface 1901 may further include a "range indication option" 1902, and the "range indication option" 1902 is used to enter the foregoing signal range indication information. Certainly, the user may select the signal range indication information from a drop-down window by tapping a drop-down option 1903 shown in FIG. 19A. For example, as shown in FIG. 19A or FIG. 19B, because the user selects a "type indication option" corresponding to a "Wi-Fi hotspot". Therefore, when the user taps the drop-down option 1903 shown in FIG. 19A, the mobile phone 110 may display a drop-down window 1904 shown in FIG. 19B. The drop-down window 1904 shown in FIG. 19B may include a frequency band range of a Wi-Fi signal that may be provided by the Wi-Fi hotspot, and the frequency band range includes at least a 2.4 G frequency band and a 5 G frequency band. When the user taps a 2.4 G frequency band identifier in the drop-down window 1904 shown in FIG. 19B, the mobile phone 110 may display a display interface shown in FIG. 19C. When the user taps an "OK" button shown in FIG. 19C, the mobile phone 110 may send a network scanning request to the tablet computer 130 to instruct the tablet computer 130 to scan a wireless signal that is transmitted by the Wi-Fi hotspot and that is on the 2.4 G frequency band.

Figures 1, 20:
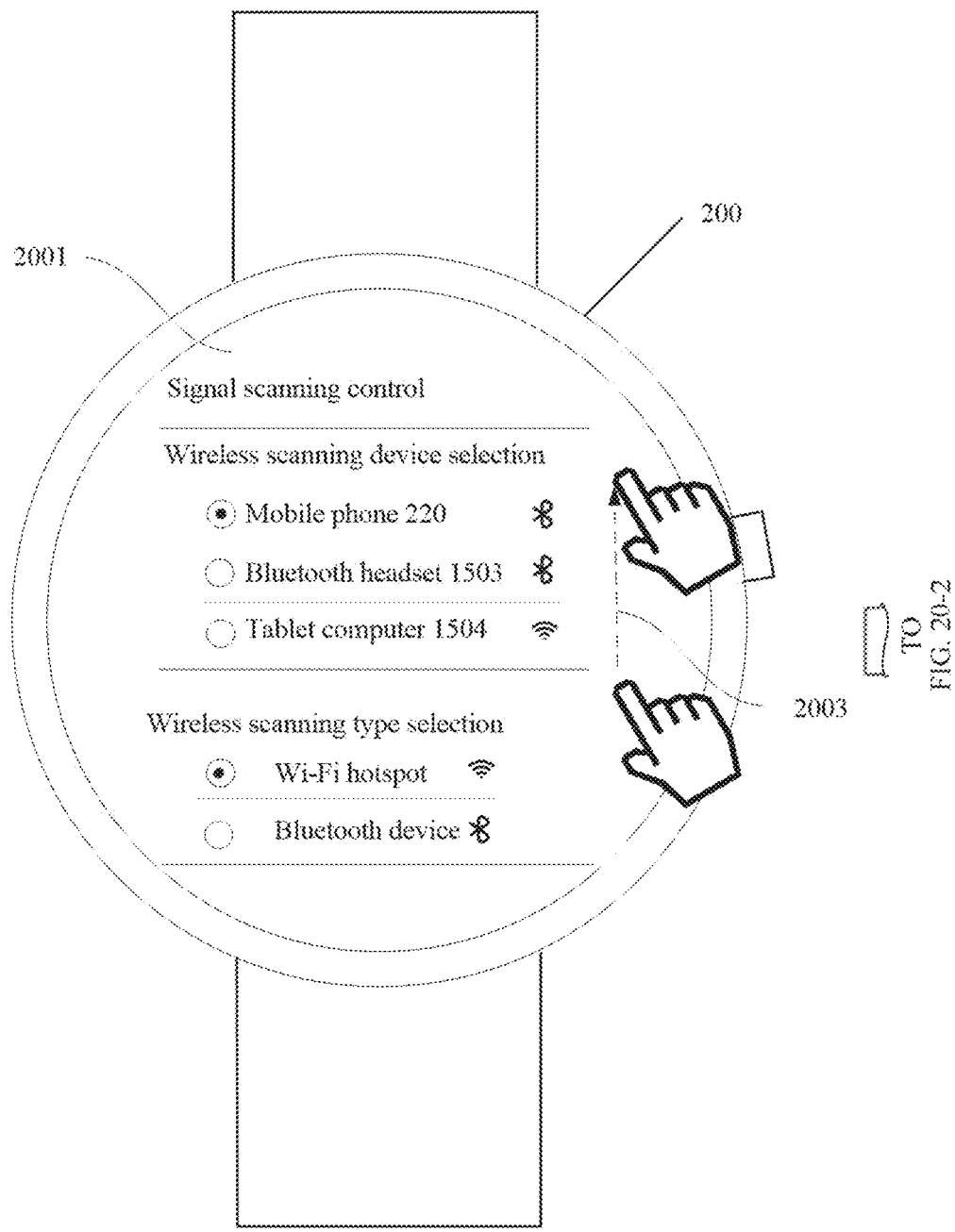
Figures 2, 20:
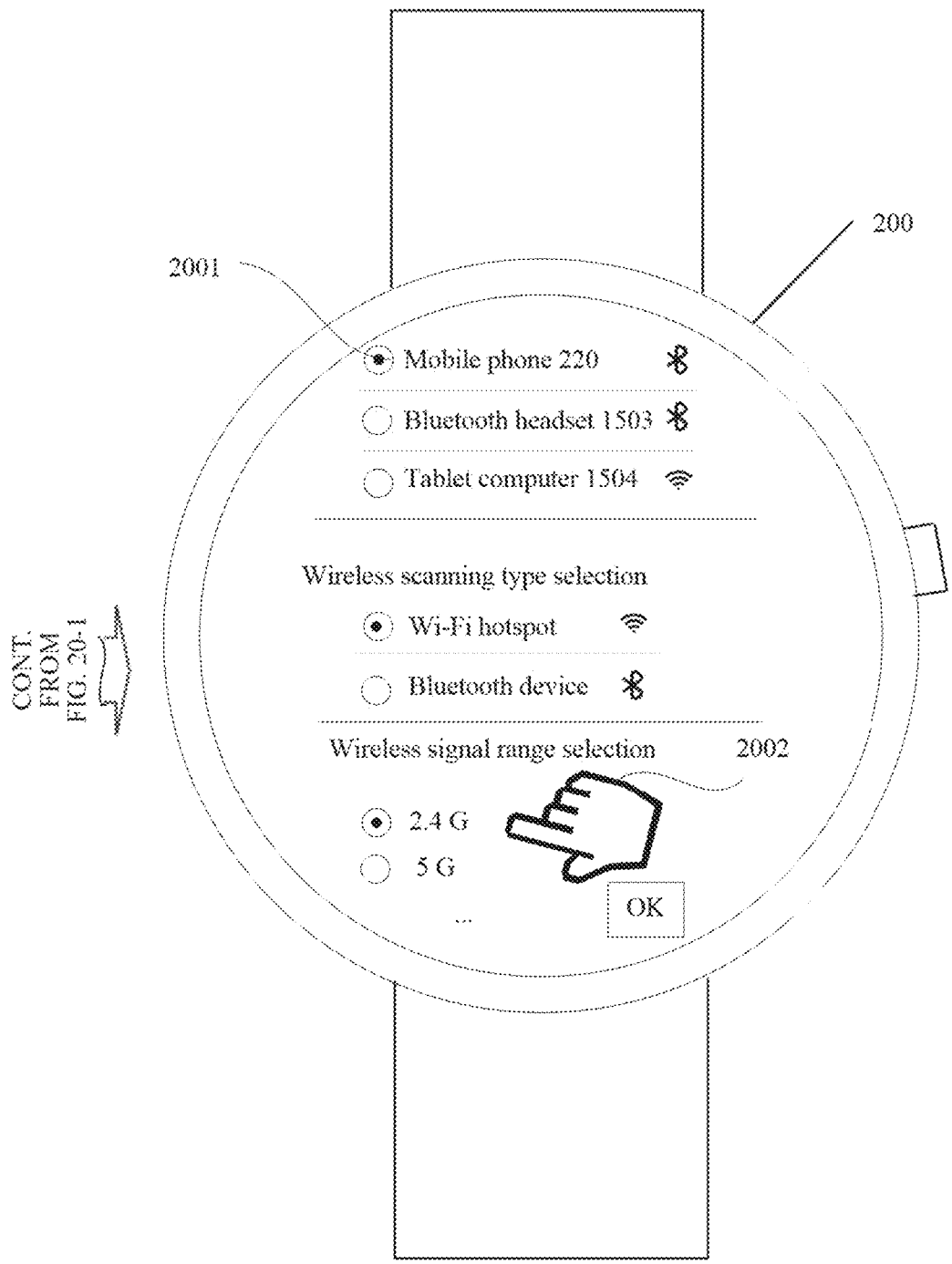

For example, because the display screen of the smartwatch 200 is relatively small, as shown in FIG. 20A, when a finger of the user slides along a sliding track 2003 in a display interface 2001 of the smartwatch 200, the smartwatch 200 displays a display interface shown in FIG. 20B. The display interface shown in FIG. 20B includes a frequency band range of a Wi-Fi signal that may be provided by a Wi-Fi hotspot, and the frequency band range includes at least a 2.4 G frequency band and a 5 G frequency band. When the user taps a 2.4 G frequency band identifier shown in FIG. 20B and taps an "OK" button shown in FIG. 20B, the smartwatch 200 may send a network scanning request to the mobile phone 220 to instruct the mobile phone 220 to scan a wireless signal that is transmitted by the Wi-Fi hotspot and that is on the 2.4 G frequency band.

Further, in some embodiments, the first interface may further include at least one object indication option. The object indication option is used to select an identifier of the wireless device that transmits the at least one first wireless signal. Correspondingly, the network scanning request may further include object indication information.

When the type indication information indicates that the wireless device that transmits the at least one first wireless signal is a base station, the object indication information includes an identifier of an operator to which the wireless device belongs.

When the type indication information indicates that the wireless device that transmits the at least one first wireless signal is a Wi-Fi hotspot, the object indication information may include a service set identifier (Service Set Identifier, SSID) of the wireless device.

Figure 19C:
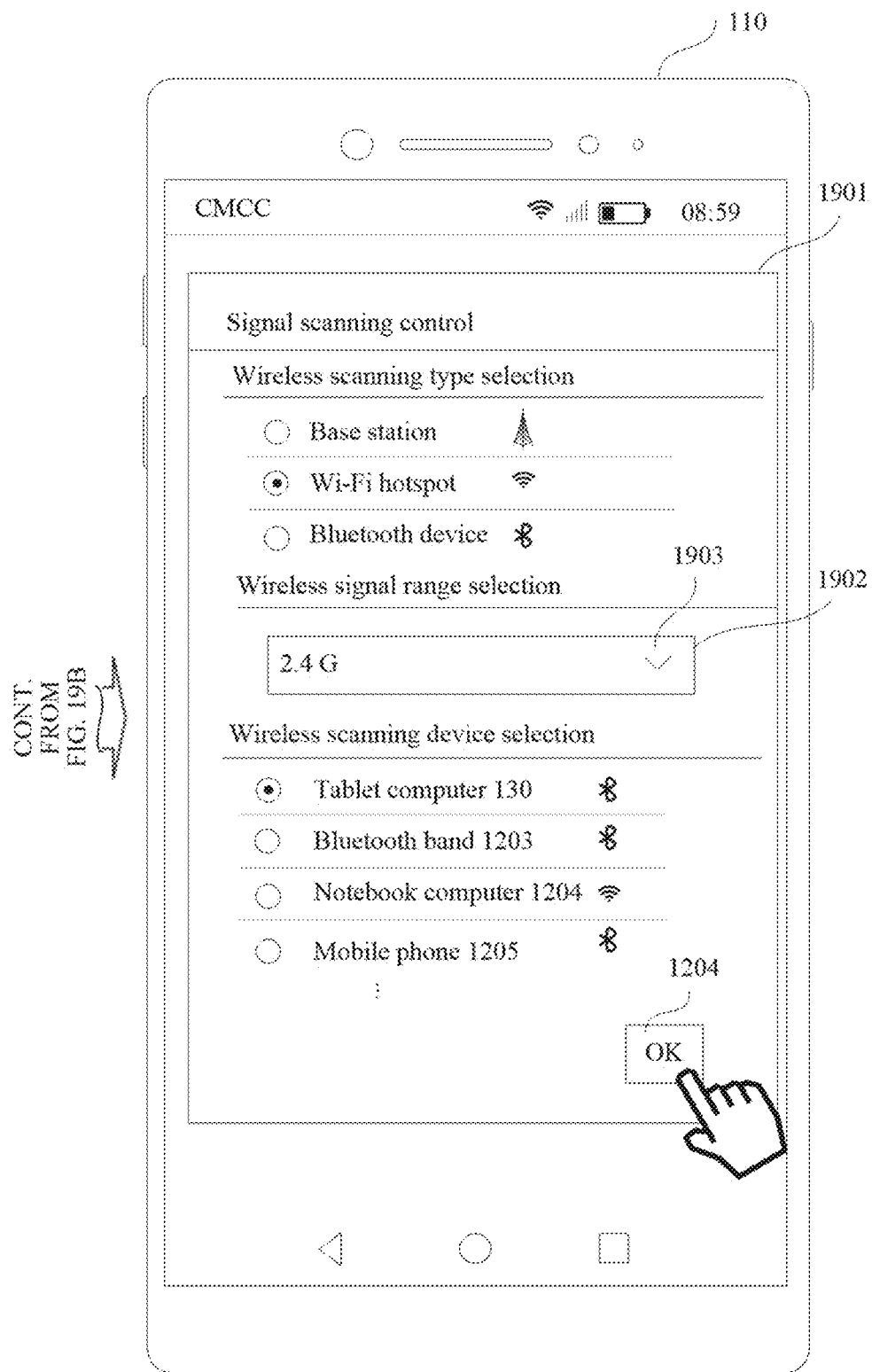
Figure 21:
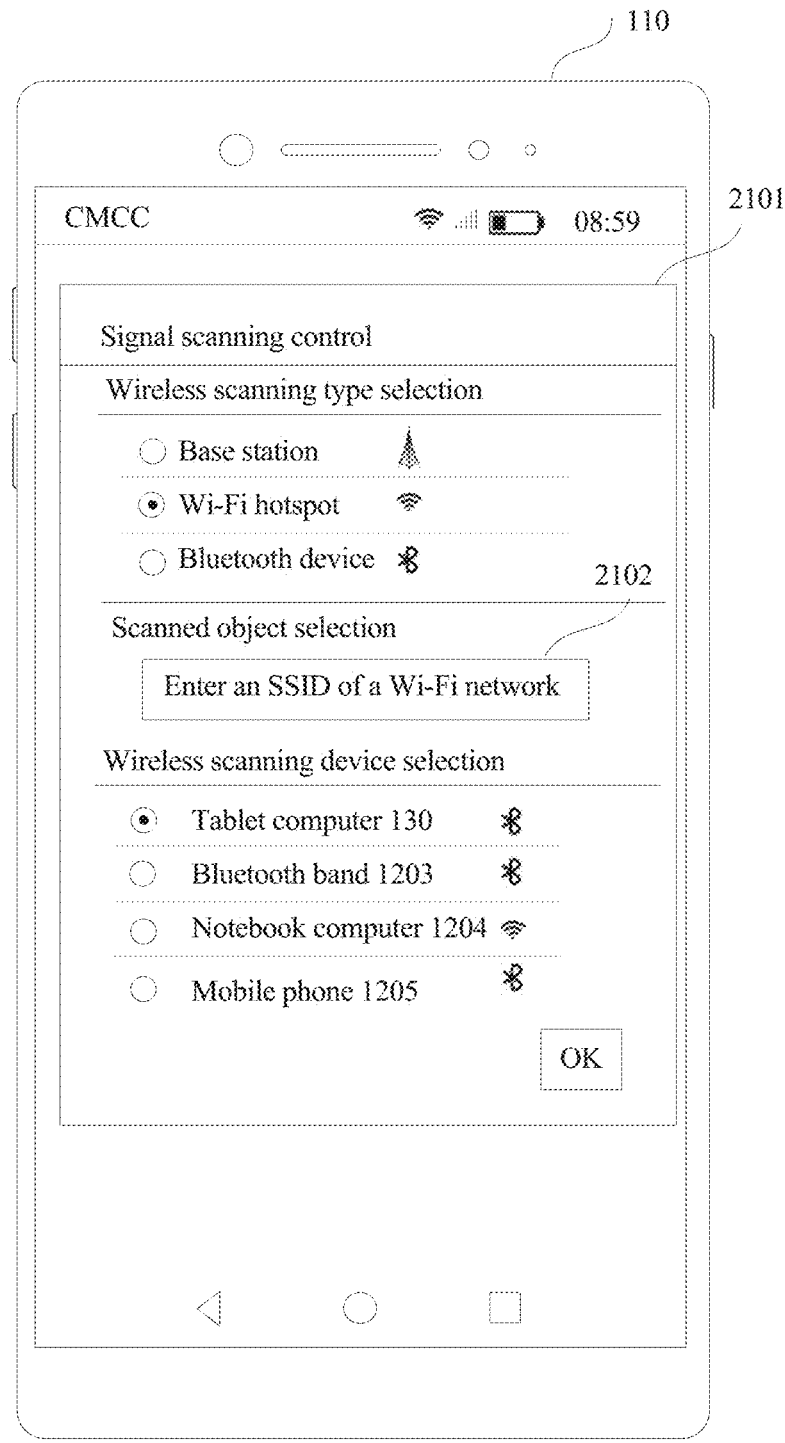
FIG. 21 is a schematic diagram 9 of an example of a display interface of a mobile phone according to an embodiment of the present invention.

For example, with reference to FIG. 19A to FIG. 19C, a first interface 2101 shown in FIG. 21 may further include an object indication option 2102. Because the user selects a "type indication option" corresponding to a "Wi-Fi hotspot", an input box of the object indication option 2102 may display indication information "enter an SSID of a Wi-Fi network", and the input box of the object indication option 2102 is used to enter an SSID of a Wi-Fi network that the mobile phone 110 instructs the tablet computer 130 to scan.

When the type indication information indicates that the wireless device is a Bluetooth device, the object indication information includes a Bluetooth identifier of the wireless device.

Figure 22:
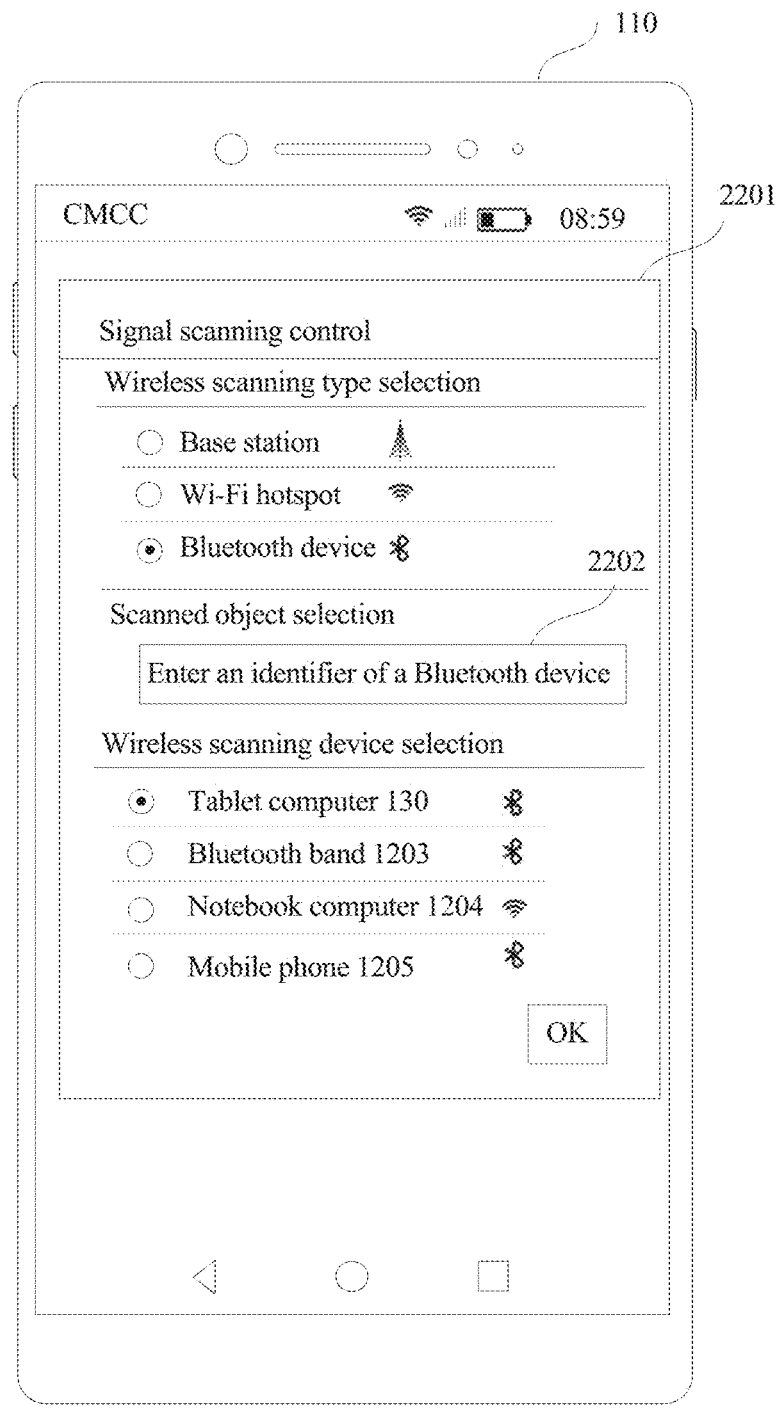
FIG. 22 is a schematic diagram 10 of an example of a display interface of a mobile phone according to an embodiment of the present invention.

For example, a first interface 2201 shown in FIG. 22 may further include an object indication option 2202. Because the user selects a "type indication option" corresponding to a "Bluetooth device", an input box of the object indication option 2202 may display indication information "enter an identifier of a Bluetooth device", and the input box of the object indication option 2202 is used to enter an identifier of a Bluetooth device to which the mobile phone 110 needs to be connected. The mobile phone 110 may instruct the tablet computer 130 to scan a Bluetooth signal transmitted by the Bluetooth device.

The at least one first wireless signal may include one or more first wireless signals. When the at least one first wireless signal includes only one first wireless signal, the first device may directly request to establish a wireless communication connection to a wireless device that transmits the first wireless signal. When the at least one first wireless signal includes a plurality of first wireless signals, the first device may select a first wireless signal with highest signal strength from the plurality of first wireless signals, and then request to establish a wireless communication connection to a wireless device that transmits the first wireless signal with the highest signal strength.

Alternatively, the first device may display a wireless signal selection interface (namely, a third interface), and the third interface may display the scanning result of the at least one first wireless signal. The user may select one wireless signal from the scanning result of the at least one first wireless signal. Then, the first device may request to establish a wireless communication connection to a wireless device that transmits the wireless signal selected by the user.

For example, the scenario shown in FIG. 2B is used as an example. After receiving scanning results (for example, SSIDs of a plurality of Wi-Fi hotspots around the smartwatch 200) that are of a plurality of first wireless signals and that are sent by the mobile phone 220, the smartwatch 200 may display a wireless signal selection interface 2301 shown in FIG. 23-1. The wireless signal selection interface 2301 may include the SSIDs that are of the plurality of Wi-Fi hotspots and that are obtained by the mobile phone 220 through scanning, for example, "G1B-1B-19-7R-2.4G", "Xyzd", and "Zhangsan". The user may select, from the SSIDs displayed in the wireless signal selection interface 2301, an SSID corresponding to a Wi-Fi network that the user expects to control the smartwatch 200 to access. When the user selects the SSID "Xyzd" shown in FIG. 23-1, the smartwatch 200 may display a display interface 2302 shown in FIG. 23-2. After the user enters a password of "Xyzd" in a password input box in the display interface 2302 shown in FIG. 23-2, and taps a "join" button, the smartwatch 200 may request to establish a Wi-Fi connection to a Wi-Fi hotspot whose SSID is "Xyzd".

Optionally, in this embodiment of the present invention, the second device may further assist, based on an instruction of the first device, the first device in implementing a function other than a function of scanning a wireless signal. For example, the second device may scan a two-dimensional code or a barcode based on the instruction of the first device, and send a code scanning result to the first device; or the second device may take a photo based on the instruction of the first device, and send the photographed photo to the first device.

For example, an example in which the first device is a smartwatch and the second device is a mobile phone is used. Because the smartwatch does not have a camera, the smart band cannot scan a two-dimensional code or a barcode. Therefore, the smartwatch may send a scanning command to the mobile phone, to instruct the mobile phone to turn on a camera to assist the smart band in scanning the two-dimensional code or the barcode. After obtaining a code scanning result by scanning the two-dimensional code or the barcode, the mobile phone may send the code scanning result to the smartwatch.

It should be noted that in this embodiment of the present invention, functions implemented by the first device by using the second device include but are not limited to scanning (or searching for) a wireless signal, scanning a two-dimensional code, taking a photo, and the like described in this embodiment of the present invention.

Figure 23:
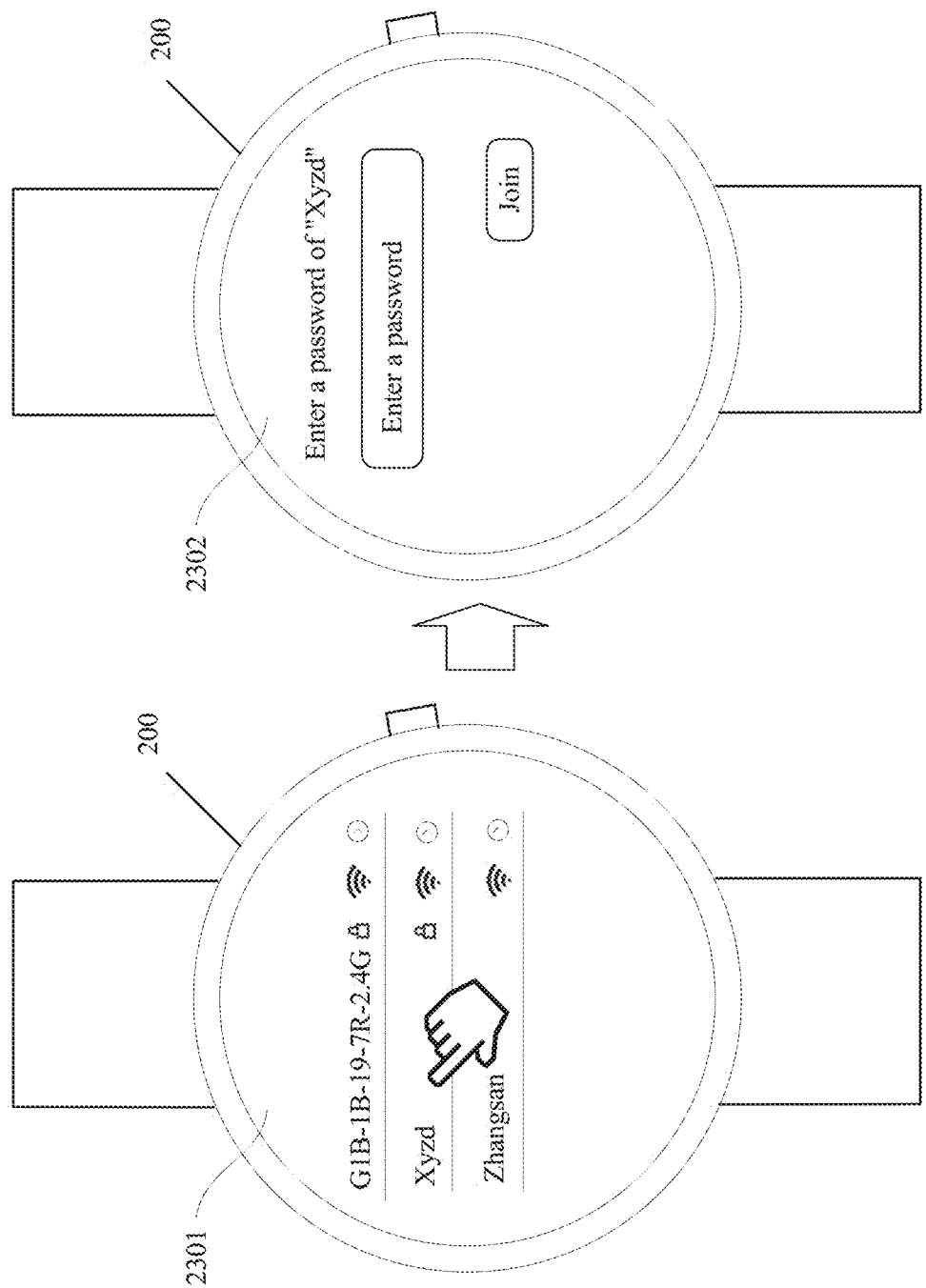
FIG. 23 is a schematic diagram 11 of an example of a display interface of a smart band according to an embodiment of the present invention.

For example, the scenario shown in FIG. 23 is used as an example. Due to limitations of an input function and a size of the display screen of the smartwatch 200, the smartwatch 200 may be incapable of displaying or inconvenient to display a wireless signal scanning result. In this case, the smartwatch 200 may display the wireless signal scanning result by using the mobile phone 220. Specifically, after S604, the second device may not perform S605 (that is, the second device may not send the scanning result of the at least one first wireless signal to the first device). Instead, the second device displays a wireless signal scanning result interface that includes the scanning result of the at least one first wireless signal. To be specific, after S604, the method in this embodiment of the present invention may further include S2401 to S2405.

S2401. The second device displays a wireless signal scanning result, where the wireless signal scanning result includes the scanning result obtained after the second device scans the at least one first wireless signal.

For a wireless signal scanning result interface displayed by the mobile phone 220, refer to the wireless signal scanning result interface displayed by the mobile phone 110 in this embodiment of the present invention, namely, the wireless signal scanning result interface shown in FIG. 14-3.

S2402. The second device detects user selection for the wireless signal scanning result.

For the step in which the second device detects user selection for the wireless signal scanning result, refer to detailed descriptions in S607c and S607d in this embodiment of the present invention.

S2403. The second device instructs, based on a detected scanning result selected by a user, the first device to establish a wireless communication connection to at least one third device corresponding to the scanning result selected by the user.

S2404. In response to the instruction of the second device, the first device sends a wireless connection request to the at least one third device based on the scanning result selected by the user, to establish a wireless communication connection to the at least one third device.

Further, in some embodiments, the wireless signal scanning result in S2401 may further include the scanning result that is of the at least one second wireless signal and that is sent by the first device. For example, for a wireless signal scanning result interface displayed by the mobile phone 220, refer to the wireless signal scanning result interface that is displayed by the mobile phone 110 and that is shown in FIG. 14-4 in this embodiment of the present invention.

In these embodiments, before S2401, the method in this embodiment of the present invention may further include S2501 and S2502.

S2501. The first device sends the scanning result of the at least one second wireless signal to the second device.

S2502. The second device receives the scanning result that is of the at least one second wireless signal and that is sent by the first device.

For example, the scenario shown in FIG. 23 is used as an example. Due to the limitations of the input function and the size of the display screen of the smartwatch 200, the smartwatch 200 may be incapable of entering or inconvenient to enter a Wi-Fi password. In this case, the smartwatch 200 may enter the password of "Xyzd" by using the mobile phone 220. Specifically, after S605 and before S607, the method in this embodiment of the present invention may further include S2601 to S2606.

S2601. The first device sends a first instruction to the second device, where the first instruction is used to instruct the second device to display a second interface.

S2602. The second device receives the first instruction sent by the first device.

S2603. The second device displays the second interface, where the second interface is an information input interface used when the first device establishes a wireless communication connection to the at least one third device.

S2604. In response to user input in the second interface, the second device sends, to the first device, information entered by the user in the second interface.

S2605. The first device receives the information that is sent by the second device and that is entered by the user in the second interface.

S2606. The first device establishes a wireless communication connection to the at least one third device based on the information entered by the user in the second interface.

Figure 24:
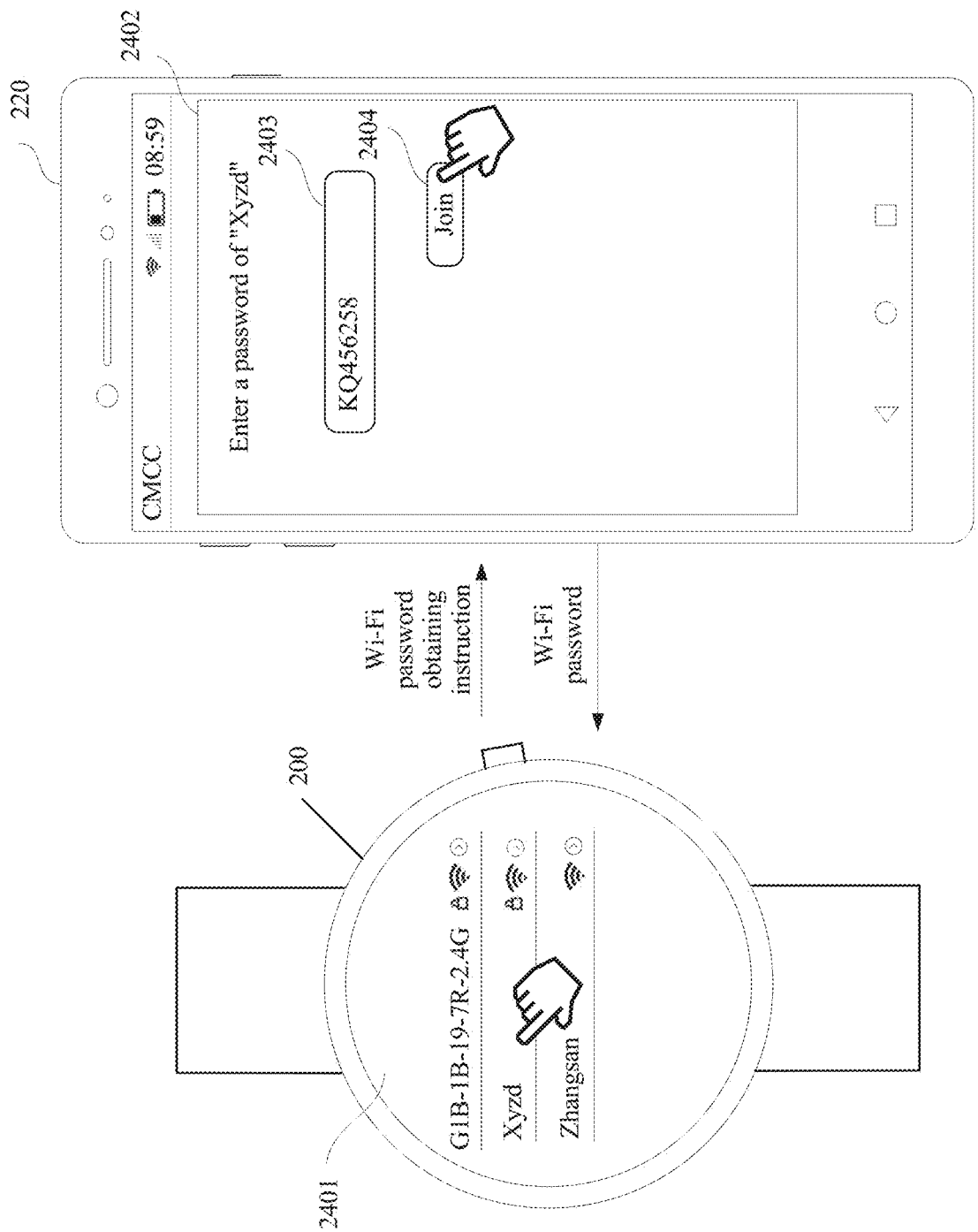
FIG. 24 is a schematic diagram of an example of display interfaces of a smart band and a mobile phone according to an embodiment of the present invention.

For example, when the user selects an SSID "Xyzd" shown in FIG. 24A, as shown in FIG. 24, the smartwatch 200 may send a Wi-Fi password obtaining instruction to the mobile phone 220. After receiving the Wi-Fi password obtaining instruction (that is, performing S2601 of receiving the first instruction), the mobile phone 220 may display a display interface 2402 shown in FIG. 24B (that is, perform S2602 of displaying the second interface). The display interface 2402 includes a "password input box" 2403 and a "join" button 2404. When the user enters, in the "password input box" 2403, a Wi-Fi password "KQ456258" of a Wi-Fi network corresponding to "Xyzd", and then taps the "join" button 2404 shown in FIG. 24B, the mobile phone 220 sends, to the smartwatch 200, the Wi-Fi password "KQ456258" entered by the user (that is, performs S2603). After receiving the Wi-Fi password sent by the mobile phone 220, the smartwatch 200 may request to establish a Wi-Fi connection to a Wi-Fi hotspot whose SSID is "Xyzd" (that is, perform S2604 and S2605).

The foregoing mainly describes the solutions provided in the embodiments of this application from a perspective of interaction between the first device and each of the second device and the third device. It may be understood that, to implement the foregoing functions, the first device and the second device each include a corresponding function module for performing each function. A person skilled in the art should be easily aware that, the first device and algorithms steps in the examples described with reference to the embodiments disclosed in this specification may be implemented in a form of hardware or in a form of a combination of hardware and computer software in this application. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

The first device provided in the embodiments of this application is configured to implement the foregoing method embodiments. Specifically, the first device may be divided based on the foregoing method examples. For example, each module or unit may be obtained through division for each corresponding function, or two or more functions may be integrated into one processing module. The integrated module may be implemented in a form of hardware, or may be implemented in a form of a software module or unit. In the embodiments of this application, the module or unit division is an example, is merely a logical function division, and may be other division in actual implementation.

Figure 25:
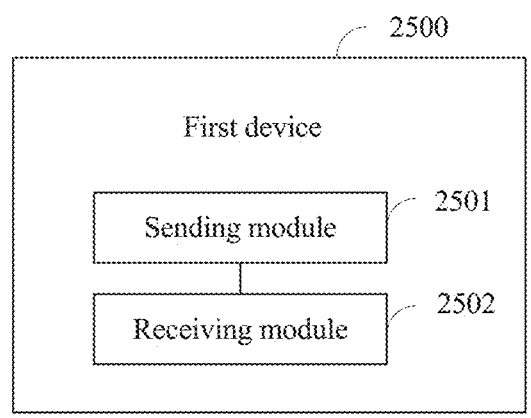
FIG. 25 is a schematic structural composition diagram 1 of a first device according to an embodiment of the present invention.

FIG. 25 is a possible schematic structural diagram of a first device in the foregoing embodiments. As shown in FIG. 25, the first device 2500 may include a sending module 2501 and a receiving module 2502.

The sending module 2501 is configured to support S602, S607, S607', S607d, S2404. S2501, S2601, and S2606 in the method embodiments, and/or is configured to perform another technical process described in this specification. The receiving module 2502 is configured to support S606 and S2605 in the method embodiments, and/or is configured to perform another technical process described in this specification.

Further, the first device 2500 may further include an establishment module. The establishment module is configured to support S601 in the method embodiments, and/or is configured to perform another technical process described in this specification.

Figure 26:
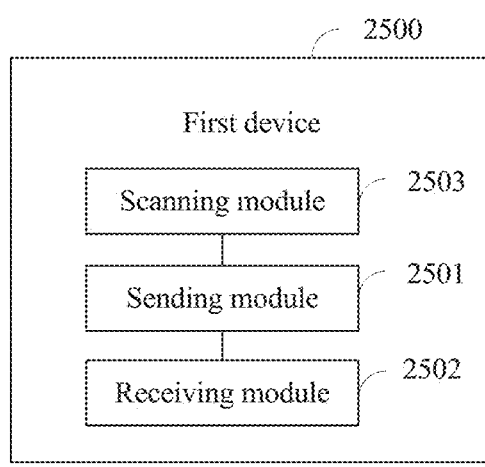
FIG. 26 is a schematic structural composition diagram 2 of a first device according to an embodiment of the present invention.

Further, as shown in FIG. 26, the first device 2500 may further include a scanning module 2503. The scanning module 2503 is configured to support S607a in the method embodiments, and/or is configured to perform another technical process described in this specification.

Figure 27:
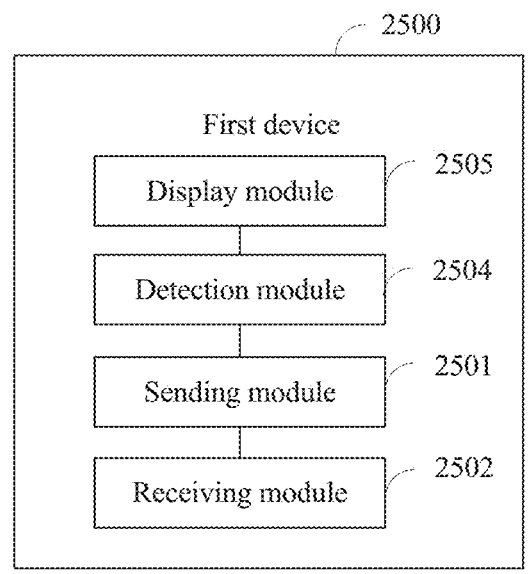
FIG. 27 is a schematic structural composition diagram 3 of a first device according to an embodiment of the present invention.

Further, as shown in FIG. 27, the first device 2500 may further include a display module 2504 and a detection module 2505. The scanning module 2504 is configured to support S607b, S1101a, and S1101b in the method embodiments, and/or is configured to perform another technical process described in this specification. The detection module 2505 is configured to support S607c in the method embodiments, and/or is configured to perform another technical process described in this specification.

Further, the first device 2500 may further include a control module. The control module is configured to control the scanning module to stop scanning at least one first wireless signal. For example, the control module is configured to support S701 and S1102 in the method embodiments, and/or is configured to perform another technical process described in this specification.

Further, the first device 2500 may further include a determining module. The determining module is configured to support S801 in the method embodiments, and/or is configured to perform another technical process described in this specification.

Further, the first device 2500 may further include a storage module. The storage module is configured to store icons of one or more second devices, a first interface, a second interface, and the like, and/or is configured to perform another technical process described in this specification.

Certainly, the first device 2500 includes the unit/modules enumerated above, and this is not limited. In addition, functions that can be specifically implemented by the modules include but are not limited to functions corresponding to the method steps in the examples. For detailed descriptions of another unit of the first device 2500 and each unit of the first device 2500, refer to detailed descriptions of a method step corresponding to the unit. Details are not described again in this embodiment of this application.

When an integrated unit is used, the connection module, the determining module, the control module, and the like may be integrated into one processing unit for implementation. The processing unit may be a processor or a controller, for example, may be a CPU, a graphics processing unit (Graphics Processing Unit, GPU), a general purpose processor, a digital signal processor (Digital Signal Processor, DSP), an application-specific integrated circuit (Application-Specific Integrated Circuit, ASIC), a field programmable gate array (Field Programmable Gate Array, FPGA) or another programmable logic device, a transistor logic device, a hardware component, or any combination thereof. The processing unit may implement or execute various example logical blocks, modules, and circuits described with reference to content disclosed in this application. The processing unit may be a combination implementing a computing function, for example, a combination including one or more microprocessors, or a combination of a DSP and a microprocessor. The storage module may be a memory.

Figure 28:
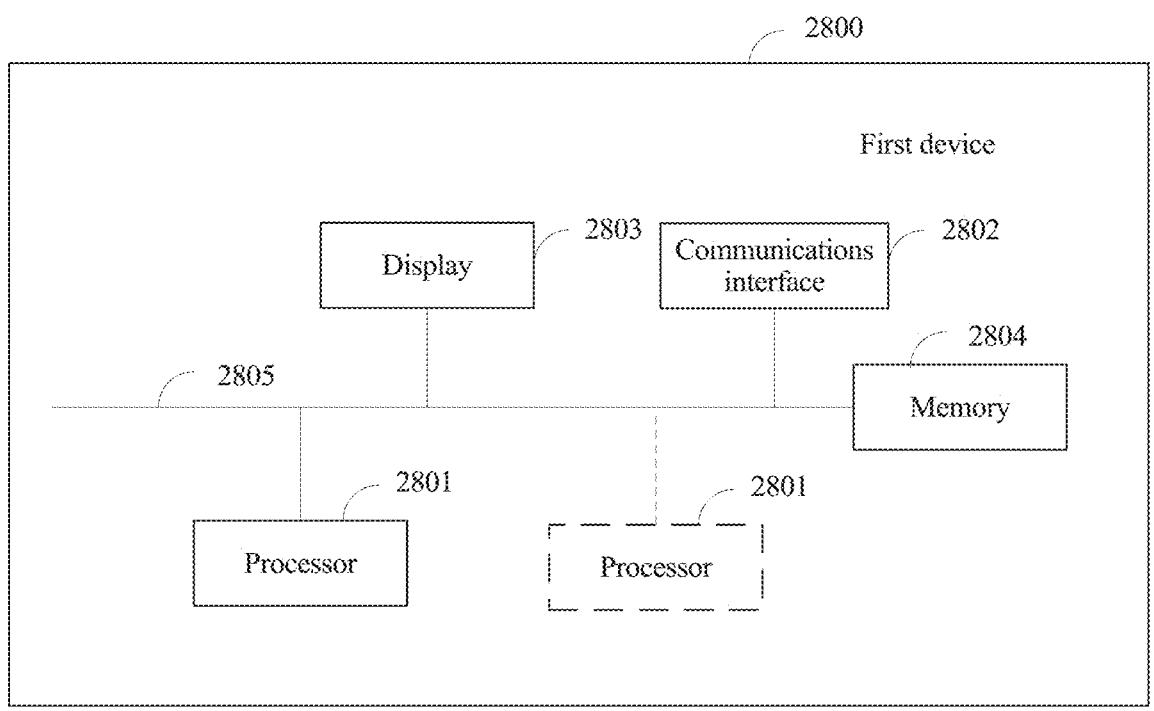
FIG. 28 is a schematic structural composition diagram 4 of a first device according to an embodiment of the present invention.

When the processing unit is a processor and the storage module is a memory, the first device 2500 in this embodiment of this application may be a first device 2800 shown in FIG. 28. As shown in FIG. 28, the first device 2800 includes a processor 2801, a communications interface 2802, a display 2803, and a memory 2804.

The processor 2801, the communications interface 2802, the display 2803, and the memory 2804 are connected to each other through a bus 2805. The communications interface 2802 is configured to communicate with a second device over a short-range wireless communication connection. The display 2803 is configured to display a display interface generated by the processor. The memory 2804 is configured to store computer program code. The computer program code includes an instruction. When the processor 2801 executes the instruction, the first device performs the method for establishing a wireless communication connection shown in any one of FIG. 6A, FIG. 6B, FIG. 6C, FIG. 6D. FIG. 7, FIG. 8, and FIG. 11.

The bus 2805 may be a peripheral component interconnect (Peripheral Component Interconnect, PCI) bus, an extended industry standard architecture (Extended Industry Standard Architecture, EISA) bus, or the like. The bus 2805 may be classified into an address bus, a data bus, a control bus, and the like. For ease of representation, only one thick line is used to represent the bus in FIG. 28, but this does not mean that there is only one bus or only one type of bus.

Optionally, the first device 2800 provided in this application may include one or more processors 2801.

An embodiment of the present invention further provides a computer storage medium. The computer storage medium stores computer program code. When the one or more processors 2801 of the first device 2800 execute the computer program code, the first device 2800 performs related method steps in any one of FIG. 6A, FIG. 6B, FIG. 6C, FIG. 6D, FIG. 7, FIG. 8, and FIG. 11, to implement the method for establishing a wireless communication connection in the foregoing embodiments.

An embodiment of the present invention further provides a computer program product. When the computer program product runs on a computer, the computer is enabled to perform related method steps corresponding to the first device in any one of FIG. 6A, FIG. 6B, FIG. 6C, FIG. 6D, FIG. 7, FIG. 8, and FIG. 11, to implement the method for establishing a wireless communication connection in the foregoing embodiments.

The first device 2500, the first device 2800, the computer storage medium, and the computer program product that are provided in the embodiments of the present invention are all configured to perform a corresponding method provided above. Therefore, for beneficial effects that can be achieved by these devices, refer to beneficial effects in a corresponding method provided above. Details are not described herein again.

Figure 29:
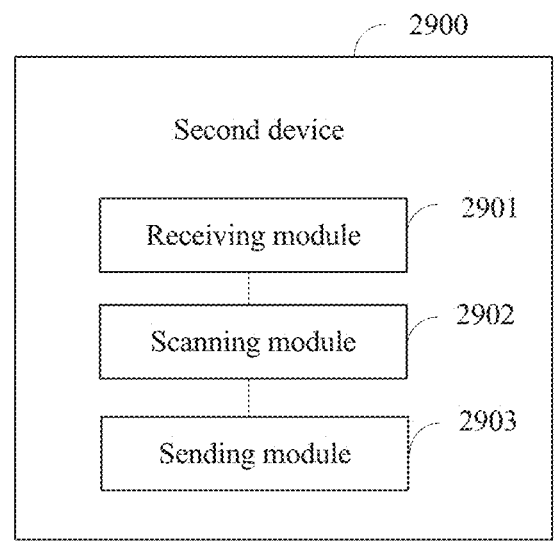
FIG. 29 is a schematic structural composition diagram 1 of a second device according to an embodiment of the present invention.

FIG. 29 is a possible schematic structural diagram of a second device in the foregoing embodiments. As shown in FIG. 29, the second device 2900 may include a receiving module 2901, a scanning module 2902, and a sending module 2903.

The receiving module 2901 is configured to support S603, S2502, and S2602 in the method embodiments, and/or is configured to perform another technical process described in this specification. The scanning module 2902 is configured to support S604 in the method embodiments, and/or is configured to perform another technical process described in this specification. The sending module 2903 is configured to support S605 and S2604 in the method embodiments, and/or is configured to perform another technical process described in this specification.

Further, the second device 2900 may further include an establishment module. The establishment module is configured to support S601 in the method embodiments, and/or is configured to perform another technical process described in this specification.

Further, the second device 2900 may further include a display module, a detection module, and an instruction module. The display module is configured to support S2401 and S2603 in the method embodiments, and/or is configured to perform another technical process described in this specification. The detection module is configured to support S2402 in the method embodiments, and/or is configured to perform another technical process described in this specification. The instruction module is configured to support S2403 in the method embodiments, and/or is configured to perform another technical process described in this specification.

Certainly, the second device 2900 includes the unit/modules enumerated above, and this is not limited. In addition, functions that can be specifically implemented by the modules include but are not limited to functions corresponding to the method steps in the examples. For detailed descriptions of another unit of the second device 2900 and each unit of the second device 2900, refer to detailed descriptions of a method step corresponding to the unit. Details are not described again in this embodiment of this application.

When an integrated unit is used, the scanning module 2902, the establishment module, and the like may be integrated into one processing unit for implementation. The processing unit may be a processor or a controller, for example, may be a CPU, a GPU, a general purpose processor, a DSP, an ASIC, an FPGA or another programmable logic device, a transistor logic device, a hardware component, or any combination thereof. The processing unit may implement or execute various example logical blocks, modules, and circuits described with reference to content disclosed in this application. The processing unit may be a combination implementing a computing function, for example, a combination including one or more microprocessors, or a combination of a DSP and a microprocessor. The storage module may be a memory.

Figure 30:
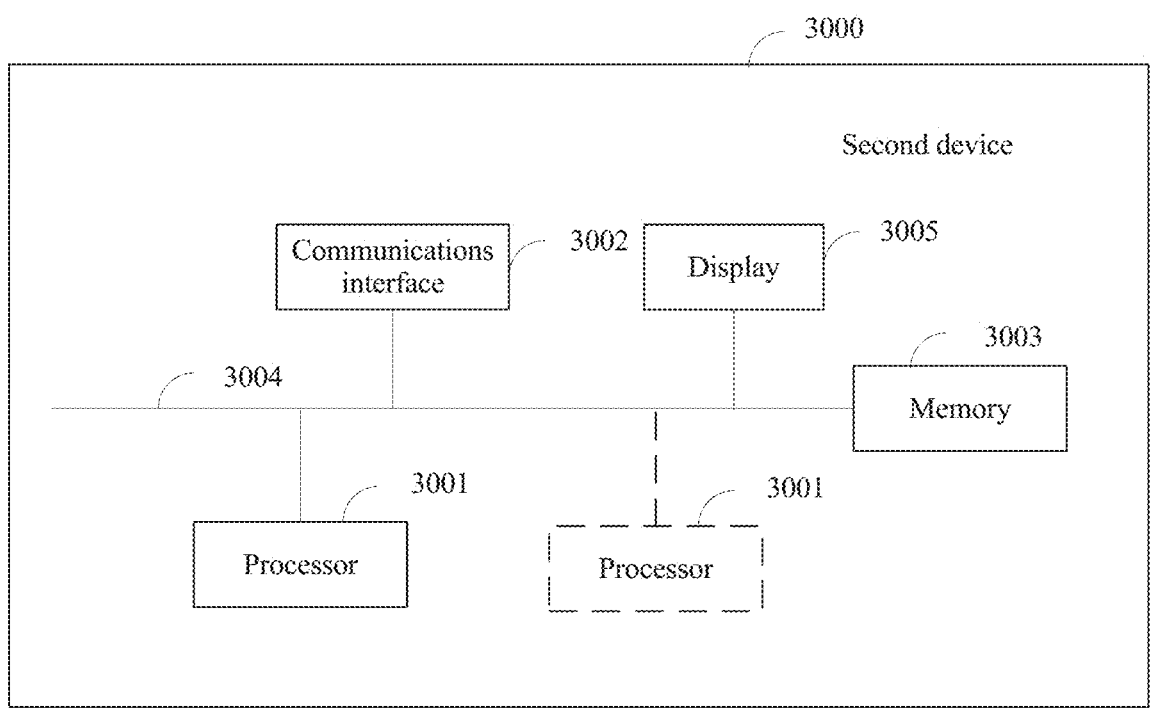
FIG. 30 is a schematic structural composition diagram 2 of a second device according to an embodiment of the present invention.

When the processing unit is a processor and the storage module is a memory, the second device 2900 in this embodiment of this application may be a second device 3000 shown in FIG. 30. As shown in FIG. 30, the second device 3000 includes a processor 3001, a communications interface 3002, a memory 3003, and a display 3005.

The processor 3001, the communications interface 3002, the display 3005, and the memory 3003 are connected to each other through a bus 3004. The communications interface 3002 is configured to communicate with the second device over a short-range wireless communication connection. The display 3005 is configured to display a display interface generated by the processor 3001. The memory 3003 is configured to store computer program code. The computer program code includes an instruction. When the processor 3001 executes the instruction, the second device performs the method for establishing a wireless communication connection shown in any one of FIG. 6A, FIG. 6B, FIG. 6C, FIG. 6D, FIG. 7. FIG. 8, and FIG. 11.

The bus 3004 may be a PCI bus, an EISA bus, or the like. The bus 2805 may be classified into an address bus, a data bus, a control bus, and the like. For ease of representation, only one thick line is used to represent the bus in FIG. 30, but this does not mean that there is only one bus or only one type of bus.

Optionally, the second device 3000 provided in this application may include one or more processors 3001.

An embodiment of the present invention further provides a computer storage medium. The computer storage medium stores computer program code. When the one or more processors 3001 of the second device 3000 execute the computer program code, the second device 3000 performs related method steps in any one of FIG. 6A, FIG. 6B, FIG. 6C, FIG. 6D, FIG. 7, FIG. 8, and FIG. 11, to implement the method for establishing a wireless communication connection in the foregoing embodiments.

An embodiment of the present invention further provides a computer program product. When the computer program product runs on a computer, the computer is enabled to perform related method steps corresponding to the second device in any one of FIG. 6A. FIG. 6B, FIG. 6C, FIG. 6D, FIG. 7. FIG. 8, and FIG. 11, to implement the method for establishing a wireless communication connection in the foregoing embodiments.

Based on the descriptions of the foregoing implementations, a person skilled in the art may clearly understand that, for the purpose of convenient and brief description, division of the foregoing function modules is only used as an example for description. In actual application, the foregoing functions can be allocated to different function modules and implemented as required, that is, an inner structure of an apparatus is divided into different function modules to implement all or some of the functions described above. For a detailed working process of the foregoing system, apparatus, and unit, refer to a corresponding process in the foregoing method embodiments. Details are not described herein again.

In the several embodiments provided in this application, it should be understood that the disclosed system, apparatus, and method may be implemented in other manners. For example, the described apparatus embodiment is merely an example. For example, the module or unit division is merely logical function division, and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, function units in the embodiments of this application may be integrated into one processing unit, or each of the units may exist alone physically, or two or more units may be integrated into one unit. The integrated unit may be implemented in a form of hardware, or may be implemented in a form of a software function unit.

When the integrated unit is implemented in the form of a software function unit and sold or used as an independent product, the integrated unit may be stored in a computer readable storage medium. Based on such an understanding, the technical solutions of this application essentially, or the part contributing to the prior art, or all or some of the technical solutions may be implemented in a form of a software product. The computer software product is stored in a storage medium, and includes several instructions for instructing a computer device (which may be a personal computer, a server, a network device, or the like) to perform all or some of the steps of the methods described in the embodiments of this application. The foregoing storage medium includes: any medium that can store program code, such as a flash memory, a removable hard disk, a read-only memory, a random access memory, a magnetic disk, or an optical disc.

The foregoing descriptions are merely specific implementations of this application, but are not intended to limit the protection scope of this application. Any variation or replacement within the technical scope disclosed in this application shall fall within the protection scope of this application. Therefore, the protection scope of this application shall be subject to the protection scope of the claims.

What is claimed is:

1. A wireless communication connection method implemented by a first device, wherein the wireless communication connection method comprises:
    stopping scanning a first wireless signal, wherein stopping the scanning comprises:
        displaying a first interface in response to a first user input, wherein the first interface is a display interface of a first application, and wherein the first interface comprises a wireless control option; and
        stop scanning the first wireless signal in response to a second user input for the wireless control option;
    sending, in response to stopping the scanning, a network scanning request to a second device over a short-range wireless communication connection between the first device and the second device, wherein the network scanning request instructs the second device to scan the first wireless signal;
    receiving a first scanning result of the first wireless signal from the second device;
    scanning a second wireless signal to obtain a second scanning result, wherein the second wireless signal is of a different type and/or a frequency band than the first wireless signal; and
    sending a wireless connection request to a third device to establish a wireless connection to the third device based on one or more wireless signal scanning results,
    wherein the one or more wireless signal scanning results comprise the first scanning result and the second scanning result.

2. The wireless communication connection method of claim 1, wherein before sending the wireless connection request to the third device, the wireless communication connection method further comprises displaying the one or more wireless signal scanning results, wherein the one or more wireless signal scanning results comprise either the first scanning result, or both the first scanning result and the second scanning result, and wherein sending the wireless connection request to the third device based on the one or more wireless signal scanning results further comprises:
    detecting a user selection for the one or more wireless signal scanning results; and sending the wireless connection request to the third device corresponding to the user selection.

3. The wireless communication connection method of claim 1, wherein stopping the scanning of the first wireless signal further comprises:
stopping the scanning of the first wireless signal when remaining battery power of the first device is lower than a first preset threshold; or
stopping the scanning of the first wireless signal in response to a third user input.

4. The wireless communication connection method of claim 1, wherein stopping the scanning of the first wireless signal further comprises displaying the first interface when remaining battery power of the first device is lower than a first preset threshold and, in response to a fourth user input for the wireless control option in the first interface, stopping scanning of the first wireless signal.

5. The wireless communication connection method of claim 4, wherein the first interface further comprises a type indication option, a signal range option, or an object indication option, wherein the type indication option sets a type of a wireless device that transmits the first wireless signal, wherein the signal range option sets a frequency band range of the first wireless signal, and wherein the object indication option sets an identifier of the wireless device that transmits the first wireless signal.

6. The wireless communication connection method of claim 1, wherein the first wireless signal comprises a wireless signal transmitted by a base station, and wherein the second wireless signal comprises a Wi-Fi signal and/or a BLUETOOTH signal.

7. The wireless communication connection method of claim 1, wherein the first scanning result comprises an identifier of the first device.

8. The wireless communication connection method of claim 1, wherein the first scanning result comprises an identifier of the first wireless signal.

9. A first device comprising:
a processor; and
a memory coupled to the processor and storing instructions that, when executed by the processor, cause the first device to be configured to:
stop scanning a first wireless signal, wherein to stop scanning the first wireless signal, the instructions further cause the first device to be configured to:
display a first interface in response to a first user input, wherein the first interface is a display interface of a first application, and wherein the first interface comprises a wireless control option; and
stop scanning the first wireless signal in response to a second user input for the wireless control option;
send, in response to stopping scanning of the first wireless signal, a network scanning request to a second device over a short-range wireless communication connection between the first device and the second device, wherein the network scanning request instructs the second device to scan the first wireless signal;
receive a first scanning result of the first wireless signal from the second device;
scan a second wireless signal to obtain a second scanning result, wherein the second wireless signal is of a different type and/or a frequency band than the first wireless signal; and
send a wireless connection request to a third device to establish a wireless connection to the third device based on a one or more wireless signal scanning results,
wherein the one or more wireless signal scanning results comprise the first scanning result and the second scanning result.

10. The first device of claim 9, wherein before sending the wireless connection request to the third device, the instructions further cause the first device to be configured to display the one or more wireless signal scanning results, wherein the one or more wireless signal scanning results comprise either the first scanning result, or both the first scanning result and the second scanning result, and wherein the instructions are configured to cause the first device to send the wireless connection request to the third device by causing the third device to:
detect user selection for the one or more wireless signal scanning results; and
send the wireless connection request to the third device corresponding to the user selection.

11. The first device of claim 9, wherein to stop scanning the first wireless signal, the instructions further cause the first device to be configured to:
stop scanning the first wireless signal when remaining battery power of the first device is lower than a first preset threshold; or
stop scanning the first wireless signal in response to a third user input.

12. The first device of claim 9, wherein to stop scanning the first wireless signal, the instructions further cause the first device to be configured to display the first interface when remaining battery power of the first device is lower than a first preset threshold, and stop scanning the first wireless signal in response to the second user input for the wireless control option.

13. The first device of claim 12, wherein the first interface further comprises a type indication option, a signal range option, or an object indication option, wherein the type indication option sets a type of a wireless device that transmits the first wireless signal, wherein the signal range option sets a frequency band range of the first wireless signal, and wherein the object indication option sets an identifier of the wireless device that transmits the first wireless signal.

14. The first device of claim 9, wherein the first wireless signal comprises a wireless signal transmitted by a base station, and wherein the second wireless signal comprises a Wi-Fi signal and/or a BLUETOOTH signal.

15. A computer program product comprising computer-executable instructions stored on a non-transitory computer-readable medium that, when executed by a first device, cause the first device to:
stop scanning a first wireless signal, wherein to stop scanning the first wireless signal, the computer-executable instructions further cause the first device to:
display a first interface in response to first user input, wherein the first interface is a display interface of a first application, and wherein the first interface comprises a wireless control option; and
stop scanning the first wireless signal in response to second user input for the wireless control option;
send, in response to stopping scanning the first wireless signal, a network scanning request to a second device over a short-range wireless communication connection between the first device and the second device, wherein the network scanning request instructs the second device to scan the first wireless signal;

receive a first scanning result of the first wireless signal from the second device;

scan a second wireless signal to obtain a second scanning result, wherein the second wireless signal is of a different type and/or a frequency band than the first wireless signal; and send a wireless connection request to a third device to establish a wireless connection based on one or more wireless signal scanning results, wherein the one or more wireless signal scanning results comprise the first scanning result and the second scanning result.

16. The computer program product of claim 15, wherein before sending the wireless connection request to the third device, computer-executable instructions further cause the first device to display the one or more wireless signal scanning results, wherein the one or more wireless signal scanning results comprise either the first scanning result, or the first scanning result and the second scanning result, and wherein to send the wireless connection request to the third device, the computer-executable instructions further cause the first device to:

detect user selection for the one or more wireless signal scanning results; and send the wireless connection request to the third device corresponding to the user selection.

17. The computer program product of claim 15, wherein to stop scanning the first wireless signal, the computer-executable instructions further cause the first device to stop scanning the first wireless signal when remaining battery power of the first device is lower than a first preset threshold.

18. The computer program product of claim 15, wherein the first interface further comprises a type indication option, a signal range option, or an object indication option, wherein the type indication option sets a type of a wireless device that transmits the first wireless signal, wherein the signal range option sets a frequency band range of the first wireless signal, and wherein the object indication option sets an identifier of the wireless device that transmits the first wireless signal.

19. The computer program product of claim 15, wherein to stop scanning the first wireless signal, the computer-executable instructions further cause the first device to:

display a first interface when remaining battery power of the first device is lower than a first preset threshold; and stop scanning the first wireless signal in response to a fourth user input for the wireless control option.

20. The computer program product of claim 15, wherein the first wireless signal comprises a wireless signal transmitted by a base station, and wherein the second wireless signal comprises a Wi-Fi signal and/or a BLUETOOTH signal.

* * * * *